US011273011B2

(12) United States Patent
Shanjani et al.

(10) Patent No.: US 11,273,011 B2
(45) Date of Patent: Mar. 15, 2022

(54) PALATAL EXPANDERS AND METHODS OF EXPANDING A PALATE

(71) Applicant: Align Technology, Inc., San Jose, CA (US)

(72) Inventors: Yaser Shanjani, Sunnyvale, CA (US); Jeremy Riley, Mountain View, CA (US); Ryan Kimura, San Jose, CA (US); Jun Sato, San Jose, CA (US); Norman Su, San Jose, CA (US); Jihua Cheng, San Jose, CA (US); Fuming Wu, Pleasanton, CA (US)

(73) Assignee: Align Technology, Inc., San Jose, CA (US)

( * ) Notice: Subject to any disclaimer, the term of this patent is extended or adjusted under 35 U.S.C. 154(b) by 319 days.

(21) Appl. No.: 15/831,159

(22) Filed: Dec. 4, 2017

(65) Prior Publication Data
US 2018/0153648 A1 Jun. 7, 2018

Related U.S. Application Data

(60) Provisional application No. 62/542,750, filed on Aug. 8, 2017, provisional application No. 62/429,692, filed on Dec. 2, 2016.

(51) Int. Cl.
A61C 7/10 (2006.01)
A61C 7/08 (2006.01)
(Continued)

(52) U.S. Cl.
CPC ............... A61C 7/10 (2013.01); A61C 7/002 (2013.01); A61C 7/023 (2013.01); A61C 7/08 (2013.01);
(Continued)

(58) Field of Classification Search
CPC .......... A61C 7/10; A61C 7/002; A61C 7/023; A61C 7/08; A63B 71/085; A61F 2005/563; A61F 5/566
See application file for complete search history.

(56) References Cited

U.S. PATENT DOCUMENTS 2,098,867 A 11/1937 Baxter
2,171,695 A 9/1939 Harper
(Continued)

FOREIGN PATENT DOCUMENTS

AU 517102 B 11/1977
AU 3031677 A 11/1977
(Continued)

OTHER PUBLICATIONS

US 8,553,966 B1, 10/2013, Alpern et al. (withdrawn)
(Continued)

Primary Examiner — Heidi M Eide
(74) Attorney, Agent, or Firm — Shay Glenn LLP

(57) ABSTRACT

Palatal expander apparatuses for expanding a patient's palate ("palatal expanders") and methods of using and making them. These palatal expanders may be configured to have a variable surface smoothness on one side (e.g., the lingual-facing surface) compared to the opposite side (e.g., the palatal-facing surface). These palatal expanders may be configured to have a varying thickness in the palatal region. These palatal expanders may be adapted for ease in removal by the patient or caregiver (e.g., including a hinged region and/or detachment region, and/or including a thinner buccal side then occlusal side, etc.).

28 Claims, 48 Drawing Sheets

(51) Int. Cl.
  *A61C 7/02* (2006.01)
  *A61C 9/00* (2006.01)
  *B33Y 50/02* (2015.01)
  *B33Y 80/00* (2015.01)
  *B33Y 10/00* (2015.01)
  *B29C 64/393* (2017.01)
  *A61C 7/00* (2006.01)

(52) U.S. Cl.
  CPC .............. *A61C 9/00* (2013.01); *B29C 64/393* (2017.08); *B33Y 10/00* (2014.12); *B33Y 50/02* (2014.12); *B33Y 80/00* (2014.12)

(56) References Cited

U.S. PATENT DOCUMENTS

| | | |
|---|---|---|
| 2,194,790 A | 3/1940 | Gluck |
| 2,467,432 A | 4/1949 | Kesling |
| 2,531,222 A | 11/1950 | Kesling |
| 2,818,065 A | 12/1957 | Freed |
| 3,089,487 A | 5/1963 | Enicks et al. |
| 3,092,907 A | 6/1963 | Traiger |
| 3,178,820 A | 4/1965 | Kesling |
| 3,211,143 A | 10/1965 | Grossberg |
| 3,277,892 A | 10/1966 | Tepper |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling |
| 3,738,005 A | 6/1973 | Cohen et al. |
| 3,797,115 A | 3/1974 | Silverman et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | McNall |
| 3,983,628 A | 10/1976 | Acevedo |
| 4,014,096 A | 3/1977 | Dellinger |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger |
| 4,195,046 A | 3/1980 | Kesling |
| 4,204,325 A | 5/1980 | Kaelble |
| 4,253,828 A | 3/1981 | Coles et al. |
| 4,255,138 A | 3/1981 | Frohn |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | von Weissenfluh |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,901,737 A | 2/1990 | Toone |
| 4,932,866 A | 6/1990 | Guis |
| 4,935,635 A | 6/1990 | O'Harra |
| 4,936,862 A | 6/1990 | Walker et al. |
| 4,937,392 A | 6/1990 | Imanari et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,971,557 A | 11/1990 | Martin |
| 4,975,052 A | 12/1990 | Spencer et al. |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,055,039 A | 10/1991 | Abbatte et al. |
| 5,061,839 A | 10/1991 | Matsuno et al. |
| 5,083,919 A | 1/1992 | Quach |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |

(56) References Cited

U.S. PATENT DOCUMENTS

| | | | |
|---|---|---|---|
| 5,278,756 A | 1/1994 | Lemchen et al. | |
| 5,306,144 A | 4/1994 | Hibst et al. | |
| 5,312,247 A | 5/1994 | Sachdeva et al. | |
| 5,314,335 A | 5/1994 | Fung | |
| 5,324,186 A | 6/1994 | Bakanowski | |
| 5,328,362 A | 7/1994 | Watson et al. | |
| 5,335,657 A | 8/1994 | Terry et al. | |
| 5,338,198 A | 8/1994 | Wu et al. | |
| 5,340,309 A | 8/1994 | Robertson | |
| 5,342,202 A | 8/1994 | Deshayes | |
| 5,344,315 A | 9/1994 | Hanson | |
| 5,354,201 A * | 10/1994 | Wilson | A61C 13/24 433/177 |
| 5,368,478 A | 11/1994 | Andreiko et al. | |
| 5,372,502 A | 12/1994 | Massen et al. | |
| D354,355 S | 1/1995 | Hilgers | |
| 5,382,164 A | 1/1995 | Stern | |
| 5,395,238 A | 3/1995 | Andreiko et al. | |
| 5,415,542 A | 5/1995 | Kesling | |
| 5,431,562 A | 7/1995 | Andreiko et al. | |
| 5,440,326 A | 8/1995 | Quinn | |
| 5,440,496 A | 8/1995 | Andersson et al. | |
| 5,447,432 A | 9/1995 | Andreiko et al. | |
| 5,449,703 A | 9/1995 | Mitra et al. | |
| 5,452,219 A | 9/1995 | Dehoff et al. | |
| 5,454,717 A | 10/1995 | Andreiko et al. | |
| 5,456,600 A | 10/1995 | Andreiko et al. | |
| 5,474,448 A | 12/1995 | Andreiko et al. | |
| 5,487,662 A | 1/1996 | Kipke et al. | |
| RE35,169 E | 3/1996 | Lemchen et al. | |
| 5,499,633 A | 3/1996 | Fenton | |
| 5,522,725 A | 6/1996 | Jordan et al. | |
| 5,528,735 A | 6/1996 | Strasnick et al. | |
| 5,533,895 A | 7/1996 | Andreiko et al. | |
| 5,540,732 A | 7/1996 | Testerman | |
| 5,542,842 A | 8/1996 | Andreiko et al. | |
| 5,543,780 A | 8/1996 | McAuley et al. | |
| 5,549,476 A | 8/1996 | Stern | |
| 5,562,448 A | 10/1996 | Mushabac | |
| 5,570,182 A | 10/1996 | Nathel et al. | |
| 5,575,655 A | 11/1996 | Darnell | |
| 5,583,977 A | 12/1996 | Seidl | |
| 5,587,912 A | 12/1996 | Andersson et al. | |
| 5,588,098 A | 12/1996 | Chen et al. | |
| 5,605,459 A | 2/1997 | Kuroda et al. | |
| 5,607,305 A | 3/1997 | Andersson et al. | |
| 5,614,075 A | 3/1997 | Andre | |
| 5,621,648 A | 4/1997 | Crump | |
| 5,626,537 A | 5/1997 | Danyo et al. | |
| 5,636,736 A | 6/1997 | Jacobs et al. | |
| 5,645,420 A | 7/1997 | Bergersen | |
| 5,645,421 A | 7/1997 | Slootsky | |
| 5,651,671 A | 7/1997 | Seay et al. | |
| 5,655,653 A | 8/1997 | Chester | |
| 5,659,420 A | 8/1997 | Wakai et al. | |
| 5,683,243 A | 11/1997 | Andreiko et al. | |
| 5,683,244 A | 11/1997 | Truax | |
| 5,691,539 A | 11/1997 | Pfeiffer | |
| 5,692,894 A | 12/1997 | Schwartz et al. | |
| 5,711,665 A | 1/1998 | Adam et al. | |
| 5,711,666 A | 1/1998 | Hanson | |
| 5,725,376 A | 3/1998 | Poirier | |
| 5,725,378 A | 3/1998 | Wang | |
| 5,730,151 A | 3/1998 | Summer et al. | |
| 5,737,084 A | 4/1998 | Ishihara | |
| 5,740,267 A | 4/1998 | Echerer et al. | |
| 5,742,700 A | 4/1998 | Yoon et al. | |
| 5,769,631 A | 6/1998 | Williams | |
| 5,774,425 A | 6/1998 | Ivanov et al. | |
| 5,790,242 A | 8/1998 | Stern et al. | |
| 5,799,100 A | 8/1998 | Clarke et al. | |
| 5,800,162 A | 9/1998 | Shimodaira et al. | |
| 5,800,174 A | 9/1998 | Andersson | |
| 5,813,854 A | 9/1998 | Nikodem | |
| 5,816,800 A | 10/1998 | Brehm et al. | |
| 5,818,587 A | 10/1998 | Devaraj et al. | |
| 5,823,778 A | 10/1998 | Schmitt et al. | |
| 5,848,115 A | 12/1998 | Little et al. | |
| 5,857,853 A | 1/1999 | van Nifterick et al. | |
| 5,866,058 A | 2/1999 | Batchelder et al. | |
| 5,876,199 A | 3/1999 | Bergersen | |
| 5,879,158 A | 3/1999 | Doyle et al. | |
| 5,880,961 A | 3/1999 | Crump | |
| 5,880,962 A | 3/1999 | Andersson et al. | |
| 5,882,192 A | 3/1999 | Bergersen | |
| 5,886,702 A | 3/1999 | Migdal et al. | |
| 5,890,896 A | 4/1999 | Padial | |
| 5,904,479 A | 5/1999 | Staples | |
| 5,934,288 A | 8/1999 | Avila et al. | |
| 5,957,686 A | 9/1999 | Anthony | |
| 5,964,587 A | 10/1999 | Sato | |
| 5,971,754 A | 10/1999 | Sondhi et al. | |
| 5,975,893 A | 11/1999 | Chishti et al. | |
| 5,975,906 A | 11/1999 | Knutson | |
| 5,980,246 A | 11/1999 | Ramsay et al. | |
| 5,989,023 A | 11/1999 | Summer et al. | |
| 6,002,706 A | 12/1999 | Staver et al. | |
| 6,018,713 A | 1/2000 | Coli et al. | |
| 6,044,309 A | 3/2000 | Honda | |
| 6,049,743 A | 4/2000 | Baba | |
| 6,053,731 A | 4/2000 | Heckenberger | |
| 6,068,482 A | 5/2000 | Snow | |
| 6,070,140 A | 5/2000 | Tran | |
| 6,099,303 A | 8/2000 | Gibbs et al. | |
| 6,099,314 A | 8/2000 | Kopelman et al. | |
| 6,102,701 A | 8/2000 | Engeron | |
| 6,120,287 A | 9/2000 | Chen | |
| 6,123,544 A | 9/2000 | Cleary | |
| 6,152,731 A | 11/2000 | Jordan et al. | |
| 6,154,676 A | 11/2000 | Levine | |
| 6,183,248 B1 | 2/2001 | Chishti et al. | |
| 6,183,249 B1 | 2/2001 | Brennan et al. | |
| 6,186,780 B1 | 2/2001 | Hibst et al. | |
| 6,190,165 B1 | 2/2001 | Andreiko et al. | |
| 6,200,133 B1 | 3/2001 | Kittelsen | |
| 6,201,880 B1 | 3/2001 | Elbaum et al. | |
| 6,210,162 B1 | 4/2001 | Chishti et al. | |
| 6,212,435 B1 | 4/2001 | Lattner et al. | |
| 6,213,767 B1 | 4/2001 | Dixon et al. | |
| 6,217,334 B1 | 4/2001 | Hultgren | |
| 6,227,850 B1 | 5/2001 | Chishti et al. | |
| 6,230,142 B1 | 5/2001 | Benigno et al. | |
| 6,231,338 B1 | 5/2001 | de Josselin de Jong et al. | |
| 6,238,745 B1 | 5/2001 | Morita et al. | |
| 6,239,705 B1 | 5/2001 | Glen | |
| 6,243,601 B1 | 6/2001 | Wist | |
| 6,263,234 B1 | 7/2001 | Engelhardt et al. | |
| 6,283,761 B1 | 9/2001 | Joao | |
| 6,288,138 B1 | 9/2001 | Yamamoto | |
| 6,299,438 B1 | 10/2001 | Sahagian et al. | |
| 6,299,440 B1 | 10/2001 | Phan et al. | |
| 6,309,215 B1 | 10/2001 | Phan et al. | |
| 6,313,432 B1 | 11/2001 | Nagata et al. | |
| 6,315,553 B1 | 11/2001 | Sachdeva et al. | |
| 6,328,745 B1 | 12/2001 | Ascherman | |
| 6,332,774 B1 | 12/2001 | Chikami | |
| 6,334,073 B1 | 12/2001 | Levine | |
| 6,350,120 B1 | 2/2002 | Sachdeva et al. | |
| 6,364,660 B1 | 4/2002 | Durbin et al. | |
| 6,382,975 B1 | 5/2002 | Poirier | |
| 6,386,878 B1 | 5/2002 | Pavlovskaia et al. | |
| 6,394,802 B1 | 5/2002 | Hahn | |
| 6,402,510 B1 | 6/2002 | Williams | |
| 6,402,707 B1 | 6/2002 | Ernst | |
| 6,405,729 B1 | 6/2002 | Thornton | |
| 6,406,292 B1 | 6/2002 | Chishti et al. | |
| 6,409,504 B1 | 6/2002 | Jones et al. | |
| 6,413,086 B1 | 7/2002 | Womack | |
| 6,414,264 B1 | 7/2002 | von Falkenhausen | |
| 6,414,708 B1 | 7/2002 | Carmeli et al. | |
| 6,435,871 B1 | 8/2002 | Inman | |
| 6,436,058 B1 | 8/2002 | Krahner et al. | |
| 6,441,354 B1 | 8/2002 | Seghatol et al. | |
| 6,450,167 B1 | 9/2002 | David et al. | |

(56) References Cited

U.S. PATENT DOCUMENTS

| | | |
|---|---|---|
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 | 6/2003 | Phan et al. |
| 6,573,998 B2 | 6/2003 | Cohen Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 * | 3/2007 | McSurdy, Jr. ........... A61C 7/10 433/24 |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |

(56) References Cited

U.S. PATENT DOCUMENTS

| | | |
|---|---|---|
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,841,464 B2 | 11/2010 | Cinader et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,160,334 B2 | 4/2012 | Thiel et al. |
| 8,172,569 B2 | 5/2012 | Matty et al. |
| 8,197,252 B1 | 6/2012 | Harrison |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,886,702 B2 | 11/2014 | Hering et al. |
| 8,899,976 B2 | 12/2014 | Chen et al. |
| 8,936,463 B2 | 1/2015 | Mason et al. |
| 8,944,812 B2 | 2/2015 | Kuo |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |

(56) References Cited

U.S. PATENT DOCUMENTS

| | | |
|---|---|---|
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,214,014 B2 | 12/2015 | Levin |
| 9,220,580 B2 | 12/2015 | Borovinskih et al. |
| 9,241,774 B2 | 1/2016 | Li et al. |
| 9,242,118 B2 | 1/2016 | Brawn |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,381,810 B2 | 7/2016 | Nelson et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,675,427 B2 | 6/2017 | Kopelman |
| 9,675,430 B2 | 6/2017 | Verker et al. |
| 9,693,839 B2 | 7/2017 | Atiya et al. |
| 9,744,006 B2 | 8/2017 | Ross |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,853 B2 | 11/2018 | Moss et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,258,432 B2 | 4/2019 | Webber |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1* | 8/2005 | Abolfathi .............. A61C 7/10 433/7 |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |

(56) References Cited

U.S. PATENT DOCUMENTS

| | | |
|---|---|---|
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0037111 A1 | 2/2007 | Mailyn |
| 2007/0037112 A1 | 2/2007 | Mailyn |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Raising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0062429 A1 | 3/2008 | Liang et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254402 A1* | 10/2008 | Hilliard ............... G05B 19/4097 433/24 |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kaneko et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Belski et al. |
| 2009/0218514 A1 | 9/2009 | Klunder et al. |
| 2009/0246726 A1 | 10/2009 | Chelnokov et al. |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0047732 A1 | 2/2010 | Park |
| 2010/0062394 A1 | 3/2010 | Jones et al. |
| 2010/0068676 A1 | 3/2010 | Mason et al. |
| 2010/0075268 A1 | 3/2010 | Duran Von Arx |
| 2010/0086890 A1 | 4/2010 | Kuo |
| 2010/0138025 A1* | 6/2010 | Morton .................. A61C 7/002 700/104 |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0027743 A1 | 2/2011 | Cinader, Jr. et al. |
| 2011/0045428 A1 | 2/2011 | Boltunov et al. |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |

(56) References Cited

U.S. PATENT DOCUMENTS

| | | |
|---|---|---|
| 2011/0159452 A1 | 6/2011 | Huang |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0240064 A1 | 10/2011 | Wales et al. |
| 2011/0262881 A1 | 10/2011 | Mauclaire |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286114 A1 | 10/2013 | Ito et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0100495 A1 | 4/2014 | Haseley |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0186794 A1 | 7/2014 | Deichmann et al. |
| 2014/0220520 A1 | 8/2014 | Salamini |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342299 A1* | 11/2014 | Jung ............... A61C 7/08 433/6 |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0031940 A1 | 1/2015 | Floyd |
| 2015/0079530 A1 | 3/2015 | Bergersen |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0132708 A1 | 5/2015 | Kuo |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Iowe et al. |
| 2015/0182303 A1 | 7/2015 | Abraham et al. |
| 2015/0216626 A1 | 8/2015 | Ranjbar |
| 2015/0216716 A1 | 8/2015 | Anitua Aldecoa |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüuttel |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0022185 A1 | 1/2016 | Agarwal et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0157962 A1* | 6/2016 | Kim ............... A61F 5/566 433/6 |
| 2016/0163115 A1 | 6/2016 | Furst |
| 2016/0217708 A1 | 7/2016 | Levin et al. |
| 2016/0220105 A1 | 8/2016 | Durent |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242811 A1 | 8/2016 | Sadiq et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0328843 A1 | 11/2016 | Graham et al. |
| 2016/0338799 A1 | 11/2016 | Wu et al. |
| 2016/0346063 A1 | 12/2016 | Schulhof et al. |
| 2016/0367188 A1 | 12/2016 | Malik et al. |
| 2016/0367339 A1 | 12/2016 | Khardekar et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0049311 A1 | 2/2017 | Borovinskih et al. |
| 2017/0049326 A1 | 2/2017 | Alfano et al. |
| 2017/0056131 A1 | 3/2017 | Alauddin et al. |
| 2017/0071705 A1 | 3/2017 | Kuo |
| 2017/0079747 A1 | 3/2017 | Graf et al. |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0215739 A1 | 8/2017 | Miyasato |

(56) References Cited

U.S. PATENT DOCUMENTS

| | | |
|---|---|---|
| 2017/0251954 A1 | 9/2017 | Lotan et al. |
| 2017/0258555 A1 | 9/2017 | Kopelman |
| 2017/0265967 A1 | 9/2017 | Hong |
| 2017/0265970 A1 | 9/2017 | Verker |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2017/0340415 A1 | 11/2017 | Choi et al. |
| 2018/0000563 A1 | 1/2018 | Shanjani et al. |
| 2018/0000565 A1 | 1/2018 | Shanjani et al. |
| 2018/0028063 A1 | 2/2018 | Elbaz et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071054 A1 | 3/2018 | Ha |
| 2018/0071055 A1 | 3/2018 | Kuo |
| 2018/0085059 A1 | 3/2018 | Lee |
| 2018/0096465 A1 | 4/2018 | Levin |
| 2018/0168788 A1 | 6/2018 | Fernie |
| 2018/0228359 A1 | 8/2018 | Meyer et al. |
| 2018/0280125 A1 | 10/2018 | Longley et al. |
| 2018/0318042 A1* | 11/2018 | Baek .......................... A61C 7/02 |
| 2018/0318043 A1 | 11/2018 | Li et al. |
| 2018/0368944 A1 | 12/2018 | Sato et al. |
| 2019/0026599 A1 | 1/2019 | Salah et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076216 A1 | 3/2019 | Moss et al. |
| 2019/0090983 A1 | 3/2019 | Webber et al. |
| 2019/0314119 A1 | 10/2019 | Kopelman et al. |
| 2020/0046463 A1 | 2/2020 | Kimura et al. |
| 2021/0068926 A1 | 3/2021 | Wu et al. |

FOREIGN PATENT DOCUMENTS

| | | |
|---|---|---|
| AU | 5598894 A | 6/1994 |
| CA | 1121955 A1 | 4/1982 |
| CN | 1655732 A | 8/2005 |
| CN | 1655733 A | 8/2005 |
| CN | 101442953 A | 5/2009 |
| CN | 101677842 A | 3/2010 |
| CN | 201609421 U | 10/2010 |
| CN | 102017658 A | 4/2011 |
| CN | 203369975 U | 1/2014 |
| CN | 103889364 A | 6/2014 |
| CN | 204092220 U | 1/2015 |
| CN | 104379087 A | 2/2015 |
| CN | 204863317 U | 12/2015 |
| CN | 105496575 A | 4/2016 |
| CN | 105997274 A | 10/2016 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 202010017014 U1 | 3/2011 |
| DE | 102011051443 A1 | 1/2013 |
| DE | 202012011899 U1 | 1/2013 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2211753 A1 | 8/2010 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| EP | 2848229 A1 | 3/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 4028359 A | 1/1992 |
| JP | 08-508174 A | 9/1996 |
| JP | 09-19443 A | 1/1997 |
| JP | 2003245289 A | 9/2003 |
| JP | 2000339468 A | 9/2004 |
| JP | 2005527320 A | 9/2005 |
| JP | 2005527321 A | 9/2005 |
| JP | 2006043121 A | 2/2006 |
| JP | 2007151614 A | 6/2007 |
| JP | 2007260158 A | 10/2007 |
| JP | 2007537824 A | 12/2007 |
| JP | 2008067732 A | 3/2008 |
| JP | 2008523370 A | 7/2008 |
| JP | 04184427 B1 | 11/2008 |
| JP | 2009000412 A | 1/2009 |
| JP | 2009018173 A | 1/2009 |
| JP | 2009078133 A | 4/2009 |
| JP | 2009101386 A | 5/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 10-20020062793 A | 7/2002 |
| KR | 10-20070108019 A | 11/2007 |
| KR | 10-20090065778 A | 6/2009 |
| KR | 10-1266966 B1 | 5/2013 |
| KR | 10-2016-041632 A | 4/2016 |
| KR | 10-2016-0071127 A | 6/2016 |
| KR | 10-1675089 B1 | 11/2016 |
| TW | 480166 B | 3/2002 |
| WO | WO91/004713 A1 | 4/1991 |
| WO | WO92/03102 A1 | 3/1992 |
| WO | WO94/010935 A1 | 5/1994 |
| WO | WO96/23452 A1 | 8/1996 |
| WO | WO98/032394 A1 | 7/1998 |
| WO | WO98/044865 A1 | 10/1998 |
| WO | WO01/08592 A1 | 2/2001 |
| WO | 0180762 A2 | 11/2001 |
| WO | WO01/85047 A2 | 11/2001 |
| WO | WO02/017776 A2 | 3/2002 |
| WO | WO02/062252 A1 | 8/2002 |
| WO | WO02/095475 A1 | 11/2002 |
| WO | WO03/003932 A2 | 1/2003 |
| WO | WO2006/096558 A2 | 9/2006 |
| WO | WO2006/100700 A1 | 9/2006 |
| WO | WO2006/133548 A1 | 12/2006 |
| WO | WO2007/019709 A2 | 2/2007 |
| WO | WO2007/071341 A1 | 6/2007 |
| WO | WO2007/103377 A2 | 9/2007 |
| WO | WO2008/115654 A1 | 9/2008 |
| WO | WO2009/016645 A2 | 2/2009 |
| WO | WO2009/085752 A2 | 7/2009 |
| WO | WO2009/089129 A1 | 7/2009 |
| WO | WO2009/146788 A1 | 12/2009 |
| WO | WO2009/146789 A1 | 12/2009 |
| WO | WO2010/059988 A1 | 5/2010 |
| WO | WO2010/123892 A2 | 10/2010 |
| WO | WO2012/007003 A1 | 1/2012 |
| WO | 2012042547 A1 | 4/2012 |
| WO | WO2012/064684 A2 | 5/2012 |
| WO | WO2012/074304 A2 | 6/2012 |
| WO | WO2012/078980 A2 | 6/2012 |
| WO | WO2012/083968 A1 | 6/2012 |
| WO | WO2012/140021 A2 | 10/2012 |
| WO | WO2013/058879 A2 | 4/2013 |
| WO | WO2013/176444 A1 | 11/2013 |
| WO | WO2014/068107 A1 | 5/2014 |
| WO | WO2014/091865 A1 | 6/2014 |

(56) References Cited

FOREIGN PATENT DOCUMENTS

| | | | |
|---|---|---|---|
| WO | WO2014/143911 A1 | 9/2014 | |
| WO | WO2015/015289 A2 | 2/2015 | |
| WO | WO2015/063032 A1 | 5/2015 | |
| WO | WO2015/112638 A1 | 7/2015 | |
| WO | WO2015/176004 A1 | 11/2015 | |
| WO | WO2016/004415 A1 | 1/2016 | |
| WO | WO-2016028106 A1 * | 2/2016 | ............... A61C 7/08 |
| WO | WO2016/042393 A1 | 3/2016 | |
| WO | WO2016/061279 A1 | 4/2016 | |
| WO | WO2016/084066 A1 | 6/2016 | |
| WO | WO2016/099471 A1 | 6/2016 | |
| WO | WO2016/113745 A1 | 7/2016 | |
| WO | WO2016/116874 A1 | 7/2016 | |
| WO | 2016149007 A1 | 9/2016 | |
| WO | WO2016/200177 A1 | 12/2016 | |
| WO | WO201 7/006176 A1 | 1/2017 | |
| WO | WO2017/182654 A1 | 10/2017 | |
| WO | WO2018/057547 A1 | 3/2018 | |
| WO | WO2018/085718 A2 | 5/2018 | |
| WO | WO2018/232113 A1 | 12/2018 | |
| WO | WO2019/018784 A1 | 1/2019 | |

OTHER PUBLICATIONS

Machine translation of WO 2016/028106 retreived from WIPO (Year: 2016).*
Arakawa et al.; Mouthguard biosensor with telemetry system for monitoring of saliva glucose: A novel cavitas sensor; Biosensorsand Bioelectronics; 84; pp. 106-111; Oct. 2016.
O'Leary et al.; U.S. Appl. No. 16/195,701 entitled "Orthodontic retainers," filed Nov. 19, 2018.
Shanjani et al., U.S. Appl. No. 16/206,894 entitled "Sensors for monitoring oral appliances," filed Nov. 28, 2019.
Shanjani et al., U.S. Appl. No. 16/231,906 entitled "Augmented reality enhancements for dental practitioners." Dec. 24, 2018.
Kopleman et al., U.S. Appl. No. 16/220,381 entitled "Closed loop adaptive orthodontic treatment methods and apparatuses," Dec. 14, 2018.
Bernabe et al.; Are the lower incisors the best predictors for the unerupted canine and premolars sums? An analysis of Peruvian sample; The Angle Orthodontist; 75(2); pp. 202-207; Mar. 2005.
Collins English Dictionary; Teeth (definition); 9 pages; retrieved from the internet (https:www.collinsdictionary.com/us/dictionary/english/teeth) on May 13, 2019.
Dental Monitoring; Basics: How to put the cheek retractor?; 1 page (Screenshot); retrieved from the interenet (https://www.youtube.com/watch?v=6K1HXw4Kq3c); May 27, 2016.
Dental Monitoring; Dental monitoring tutorial; 1 page (Screenshot); retrieved from the internet (https:www.youtube.com/watch?v=Dbe3udOf9_c); Mar. 18, 2015.
dictionary.com; Plural (definition); 6 pages; retrieved from the internet ( https://www.dictionary.com/browse/plural#) on May 13, 2019.
dictionary.com; Quadrant (definition); 6 pages; retrieved from the internet ( https://www.dictionary.com/browse/quadrant?s=t) on May 13, 2019.
Ecligner Selfie; Change your smile; 1 page (screenshot); retrieved from the internet (https:play.google.com/store/apps/details?id=parklict.ecligner); on Feb. 13, 2018.
Martinelli et al.; Prediction of lower permanent canine and premolars width by correlation methods; The Angle Orthodontist; 75(5); pp. 805-808; Sep. 2005.
Nourallah et al.; New regression equations for prediciting the size of unerupted canines and premolars in a contemporary population; The Angle Orthodontist; 72(3); pp. 216-221; Jun. 2002.
Paredes et al.; A new, accurate and fast digital method to predict unerupted tooth size; The Angle Orthodontist; 76(1); pp. 14-19; Jan. 2006.
Levin; U.S. Appl. No. 16/282,431 entitled "Estimating a surface texture of a tooth," filed Feb. 2, 2019.

Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Alves et al.; New trends in food allergens detection: toward biosensing strategies; Critical Reviews in Food Science and Nutrition; 56(14); pp. 2304-2319; doi: 10.1080/10408398.2013.831026; Oct. 2016.
CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.
Di Muzio et al.; Minimum intensity projection (MinIP); 6 pages; retrieved from the internet (https://radiopaedia.org/articles/minimum-intensity-projection-minip) on Sep. 6, 2018.
Ellias et al.; Proteomic analysis of saliva identifies potential biomarkers for orthodontic tooth movement; The Scientific World Journal; vol. 2012; Article ID 647240; dio:10.1100/2012/647240; 7 pages; (year of pub. sufficiently earlier than effective US filing date and any foreign priority date) 2012.
Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.
Sirona Dental Systems GmbH, CEREC 3D, Manuel utiiisateur, Version 2.0X (in French); 114 pages; (English translation of table of contents included); (year of pub. sufficiently earlier than effective US filing date and any foreign priority date); 2003.
Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.
Watson et al.; Pressures recorded at te denture base-mucosal surface interface in complete denture wearers; Journal of Oral Rehabilitation 14(6); pp. 575-589; Nov. 1987.
Wolf; Three-dimensional structure determination of semitransparent objects from holographic data; Optics Communications; 1(4); pp. 153-156; Sep. 1969.
Riley et al.; U.S. Appl. No. 16/003,841 entitled Palatal expander with skeletal anchorage devices, filed Jun. 8, 2018.
Shanjani et al.; U.S. Appl. No. 16/019,037 entitled "Biosensor performance indicator for intraoral appliances," filed Jun. 26, 2018.
Sato et al.; U.S. Appl. No. 16/041,606 entitled "Palatal contour anchorage," filed Jul. 20, 2018.
Xue et al.; U.S. Appl. No. 16/010,087 entitled "Automatic detection of tooth type and eruption status," filed Jun. 15, 2018.
Sato et al.; U.S. Appl. No. 16/048,054 entitled "Optical coherence tomography for orthodontic aligners," filed Jul. 27, 2018.
Miller et al.; U.S. Appl. No. 16/038,088 entitled "Method and apparatuses for interactive ordering of dental aligners," filed Jul. 17, 2018.
Moalem et al.; U.S. Appl. No. 16/046,897 entitled Tooth shading, transparency and glazing filed Jul. 26, 2018.
Nyukhtikov et al.; U.S. Appl. No. 15/998,883 entitled "Buccal corridor assessment and computation," filed Aug. 15, 2018.
Bandodkar et al.; All-printed magnetically self-healing electrochemical devices; Science Advances; 2(11); 11 pages; e1601465; Nov. 2016.
Bandodkar et al.; Self-healing inks for autonomous repair of printable electrochemical devices; Advanced Electronic Materials; 1(12); 5 pages; 1500289; Dec. 2015.
Bandodkar et al.; Wearable biofuel cells: a review; Electroanalysis; 28 (6); pp. 1188-1200; Jun. 2016.
Bandodkar et al.; Wearable chemical sensors: present challenges and future prospects; Acs Sensors; 1(5); pp. 464-482; May 11, 2016.
Imani et al.; A wearable chemical-electrophysiological hybrid biosensing system for real-time health and fitness monitoring; Nature Communications; 7; 11650. doi 1038/ncomms11650; 7 pages; May 23, 2016.
Jia et al.; Epidermal biofuel cells: energy harvesting from human perspiration; Angewandle Chemie International Edition; 52(28); pp. 7233-7236; Jul. 8, 2013.

(56) References Cited

OTHER PUBLICATIONS

Jia et al.; Wearable textile biofuel cells for powering electronics; Journal of Materials Chemistry A; 2(43); p. 18184-18189; Oct. 14, 2014.
Jeerapan et al.; Stretchable biofuel cells as wearable textile-based self-powered sensors; Journal of Materials Chemistry A; 4(47); p. 18342-18353; Dec. 21, 2016.
Kim et al.; Advanced materials for printed wearable electrochemical devices: A review; Advanced Electronic Materials; 3(1); 15 pages; 1600260; Jan. 2017.
Kim et al.; Noninvasive alcohol monitoring using a wearable tatto-based iontophoretic-biosensing system; Acs Sensors; 1(8); pp. 1011-1019; Jul. 22, 2016.
Kim et al.; Non-invasive mouthguard biosensor for continuous salivary monitoring of metabolites; Analyst; 139(7); pp. 1632-1636; Apr. 7, 2014.
Kim et al.; A wearable fingernail chemical sensing platform: pH sensing at your fingertips; Taianta; 150; pp. 622-628; Apr. 2016.
Kim et al.Wearable salivary uric acid mouthguard biosensor with integrated wireless electronics; Biosensors and Bioelectronics; 74; pp. 1061-1068; 19 pages; (Author Manuscript); Dec. 2015.
Kumar et al.; All-printed, stretchable Zn—Ag2o rechargeable battery via, hyperelastic binder for self-powering wearable electronics; Advanced Energy Materials; 7(8); 8 pages; 1602096; Apr. 2017.
Kumar et al.; Biomarkers in orthodontic tooth movement; Journal of Pharmacy Bioallied Sciences; 7(Suppl 2); pp. S325-S330; 12 pages; (Author Manuscript); Aug. 2015.
Parrilla et al.; A textile-based stretchable multi-ion potentiometric sensor; Advanced Healthcare Materials; 5(9); pp. 996-1001; May 2016.
Windmiller et al.; Wearable electrochemical sensors and biosensors: a review; Electroanalysis; 25(1); pp. 29-46; Jan. 2013.
Zhou et al.; Bio-logic analysis of injury biomarker patterns in human serum samples; Taianta; 83(3); pp. 955-959; Jan. 15, 2011.
Zhou et al.; Biofuel cells for self-powered electrochemical biosensing and logic biosensing: A review; Electroanalysis; 24(2); pp. 197-209; Feb. 2012.
Kopelman et al.; U.S. Appl. No. 16/152,281 entitled "Intraoral appliances for sampling soft-tissue," filed Oct. 4, 2018.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
Elbaz et al.,; U.S. Appl. No. 16/198,488 entitled "Intraoral scanner with dental diagnostics capabilities," filed Nov. 21, 2018.
Elbaz et al.; U.S. Appl. No. 16/188,262 entitled "Intraoral scanner with dental diagnostics capabilities," filed Nov. 12, 2018.
AADR. American Association for Dental Research; Summary of Activities; Los Angeles, CA; p. 195; Mar. 20-23,(year of pub. sufficiently earlier than effective US filing date and any foreign priority date) 1980.
Alcaniz et al.; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Alexander et al.; The DigiGraph Work Station Part 2 Clinical Management; J. Clin. Orthod.; pp. 402-407; (Author Manuscript); Jul. 1990.
Allesee Orthodontic Appliance: Important Tip About Wearing the Red White & Blue Active Clear Retainer System; Allesee Orthodontic Appliances-Pro Lab; 1 page; (year of pub. sufficiently earlier than effective US filing date and any foreign priority date); 1998.
Allesee Orthodontic Appliances: DuraClearTM; Porduct information; 1 page; (year of pub. sufficiently earlier than effective US filing date and any foreign priority date) 1997.
Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; p(roduct information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment; (Patient Information); retrieved from the internet (http://ormco.com/aoa/appliancesservices/RWB/patients.html); 2 pages on May 19, 2003.
Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.
Altschuler et al.; Laser Electro-Optic System for Rapid Three-Dimensional (3D) Topographic Mapping of Surfaces; Optical Engineering; 20(6); pp. 953-961; Dec. 1981.
Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub. sufficiently earlier than effective US filing date and any foreign priority date) 1980.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al., "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
Bernard et al.; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988,.
Bhatia et al.; A Computer-Aided Design for Orthognathic Surgery; British Journal of Oral and Maxillofacial Surgery; 22(4); pp. 237-253; Aug. 1, 1984.

(56) References Cited

OTHER PUBLICATIONS

Biggerstaff et al.; Computerized Analysis of Occlusion in the Postcanine Dentition; American Journal of Orthodontics; 61(3); pp. 245-254; Mar. 1972.
Biostar Operation & Training Manual. Great Lakes Orthodontics, Ltd. 199 Fire Tower Drive.Tonawanda, New York. 14150-5890, 20 pages; (year of pub. sufficiently earlier than effective US filing date and any foreign priority date) 1990.
Bourke, Coordinate System Transformation; 1 page; retrived from the internet (http://astronomy.swin.edu.au/' pbourke/prolection/coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on the Uses of the Computer in Orthodontic Practice (Part 1); Journal of Clinical Orthodontics; 13(7); pp. 442-453; (interview); Jul. 1979.
Burstone; Dr. Charles J. Burstone on the Uses of the Computer in Orthodontic Practice (Part 2); journal of Clinical Orthodontics; 13(8); pp. 539-551 (interview); Aug. 1979.
Cardinal Industrial Finishes; Powder Coatings; 6 pages; retrieved from the internet (http://www.cardinalpaint.com) on Aug. 25, 2000.
Carnaghan, An Alternative to Holograms for the Portrayal of Human Teeth; 4th Int'l. Conf. on Holographic Systems, Components and Applications; pp. 228-231; Sep. 15, 1993.
Chaconas et al.,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
Cottingham; Gnathologic Clear Plastic Positioner; American Journal of Orthodontics; 55(1); pp. 23-31; Jan. 1969.
Crawford; CAD/CAM in the Dental Office: Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret' A Man With A Vision, Part 3: The Computer Gives New Vision- Literally, Part 4: Bytes N Bites The Computer Moves From the Front Desk to the Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
Cureton; Correcting Malaligned Mandibular Incisors with Removable Retainers; Journal of Clinical Orthodontics; 30(7); pp. 390-395; Jul. 1996.
Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.
Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.
DCS Dental AG; The CAD/CAM 'DCS Titan System' for Production of Crowns/Bridges; DSC Production; pp. 1-7; Jan. 1992.
Defranco et al.; Three-Dimensional Large Displacement Analysis of Orthodontic Appliances; Journal of Biomechanics; 9(12); pp. 793-801; Jan. 1976.
Dental Institute University of Zurich Switzerland; Program for International Symposium on Computer Restorations: State of the Art of the CEREC-Method; 2 pages; May 1991.
Dentrac Corporation; Dentrac document; pp. 4-13; (year of pub. sufficiently earlier than effective US filing date and any foreign priority date) 1992.
Dent-X; Dentsim . . . Dent-x's virtual reality 3-D training simulator . . . A revolution in dental education; 6 pages; retrieved from the internet (http://www.dent-x.com/DentSim.htm); on Sep. 24, 1998.
Doyle; Digital Dentistry; Computer Graphics World; pp. 50-52 andp. 54; Oct. 2000.
Duret et al.; CAD/CAM Imaging in Dentistry; Current Opinion in Dentistry; 1(2); pp. 150-154; Apr. 1991.
Duret et al.; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Felton et al.; A Computerized Analysis of the Shape and Stability of Mandibular Arch Form; American Journal of Orthodontics and Dentofacial Orthopedics; 92(6); pp. 478-483; Dec. 1987.
Friede et al.; Accuracy of Cephalometric Prediction in Orthognathic Surgery; Journal of Oral and Maxillofacial Surgery; 45(9); pp. 754-760; Sep. 1987.
Futterling et al.; Automated Finite Element Modeling of a Human Mandible with Dental Implants; JS WSCG '98 -Conference Program; 8 pages; retrieved from the Internet (https://dspace5.zcu.ez/bitstream/11025/15851/1/Strasser_98.pdf); on Aug. 21, 2018.
Gim-Alldent Deutschland, "Das DUX System: Die Technik," 3 pages; (English Translation Included); (year of pub. sufficiently earlier than effective US filing date and any foreign priority date); 2002.
Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.
Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.
Guess et al.; Computer Treatment Estimates in Orthodontics and Orthognathic Surgery; Journal of Clinical Orthodontics; 23(4); pp. 262-268; 11 pages; (Author Manuscript); Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa..); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Inclused); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.

(56) References Cited

OTHER PUBLICATIONS

Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
JCO Interviews; Craig Andreiko, DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jerrold; The Problem, Electronic Data Transmission and the Law; American Journal of Orthodontics and Dentofacial Orthopedics; 113(4); pp. 478-479; 5 pages; (Author Manuscript); Apr. 1998.
Jones et al.; An Assessment of the Fit of a Parabolic Curve to Pre- and Post-Treatment Dental Arches; British Journal of Orthodontics; 16(2); pp. 85-93; May 1989.
Kesling et al.; The Philosophy of the Tooth Positioning Appliance; American Journal of Orthodontics and Oral surgery; 31(6); pp. 297-304; Jun. 1945.
Kesling; Coordinating the Predetermined Pattern and Tooth Positioner with Conventional Treatment; American Journal of Orthodontics and Oral Surgery; 32(5); pp. 285-293; May 1946.
Kleeman et al.; The Speed Positioner; J. Clin. Orthod.; 30(12); pp. 673-680; Dec. 1996.
Kuroda et al.; Three-Dimensional Dental Cast Analyzing System Using Laser Scanning; American Journal of Orthodontics and Dentofacial Orthopedics; 110(4); pp. 365-369; Oct. 1996.
Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.
Leinfelder et al.; A New Method for Generating Ceramic Restorations: a CAD-CAM System; Journal of the American Dental Association; 118(6); pp. 703-707; Jun. 1989.
Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.
McCann; Inside the ADA; J. Amer. Dent. Assoc, 118:286-294; Mar. 1989.
McNamara et al.; Invisible Retainers; J. Clin Orthod.; pp. 570-578; 11 pages; (Author Manuscript); Aug. 1985.
McNamara et al.; Orthodontic and Orthopedic Treatment in the Mixed Dentition; Needham Press; pp. 347-353; Jan. 1993.
Moermann et al., Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.
Moles; Correcting Mild Malalignments—As Easy as One, Two, Three; AOA/Pro Corner; 11 (2); 2 pages; (year of pub. sufficiently earlier than effective US filing date and any foreign priority date) 2002.
Mormann et al.; Marginale Adaptation von adhasuven Porzellaninlays in vitro; Separatdruck aus:Schweiz. Mschr. Zahnmed.; 95; pp. 1118-1129; 8 pages; (Macine Translated English Abstract); (year of pub. sufficiently earlier than effective US filing date and any foreign priority date); 1985.
Nahoum; The Vacuum Formed Dental Contour Appliance; N. Y. State Dent. J.; 30(9); pp. 385-390; Nov. 1964.
Nash; CEREC CAD/CAM Inlays: Aesthetics and Durability in a Single Appointment; Dentistry Today; 9(8); pp. 20, 22-23 and 54; Oct. 1990.
Ogawa et al.; Mapping, profiling and clustering of pressure pain threshold (PPT) in edentulous oral muscosa; Journal of Dentistry; 32(3); pp. 219-228; Mar. 2004.
Ogimoto et al.; Pressure-pain threshold determination in the oral mucosa; Journal of Oral Rehabilitation; 29(7); pp. 620-626; Jul. 2002.
Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.
Pinkham; Foolish Concept Propels Technology; Dentist, 3 pages, Jan./Feb. 1989.
Pinkham; Inventor's CAD/CAM May Transform Dentistry; Dentist; pp. 1 and 35, Sep. 1990.
Ponitz; Invisible retainers; Am. J. Orthod.; 59(3); pp. 266-272; Mar. 1971.
Procera Research Projects; Procera Research Projects 1993 ' Abstract Collection; 23 pages; (year of pub. sufficiently earlier than effective US filing date and any foreign priority date) 1993.
Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.
Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & Ars Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.
Rekow et al.; CAD/CAM for Dental Restorations—Some of the Curious Challenges; IEEE Transactions on Biomedical Engineering; 38(4); pp. 314-318; Apr. 1991.
Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.
Rekow; A Review of the Developments in Dental CAD/CAM Systems; Current Opinion in Dentistry; 2; pp. 25-33; Jun. 1992.
Rekow; CAD/CAM in Dentistry: A Historical Perspective and View of the Future; Journal Canadian Dental Association; 58(4); pp. 283, 287-288; Apr. 1992.
Rekow; Computer-Aided Design and Manufacturing in Dentistry: A Review of the State of the Art; Journal of Prosthetic Dentistry; 58(4); pp. 512-516; Dec. 1987.
Rekow; Dental CAD-CAM Systems: What is the State of the Art?; The Journal of the American Dental Association; 122(12); pp. 43-48; Dec. 1991.
Rekow; Feasibility of an Automated System for Production of Dental Restorations, Ph.D. Thesis; Univ. of Minnesota, 250 pages, Nov. 1988.
Richmond et al.; The Development of a 3D Cast Analysis System; British Journal of Orthodontics; 13(1); pp. 53-54; Jan. 1986.
Richmond; Recording the Dental Cast in Three Dimensions; American Journal of Orthodontics and Dentofacial Orthopedics; 92(3); pp. 199-206; Sep. 1987.
Rudge; Dental Arch Analysis: Arch Form, A Review of the Literature; The European Journal of Orthodontics; 3(4); pp. 279-284; Jan. 1981.
Sakuda et al.; Integrated Information-Processing System in Clinical Orthodontics: An Approach with Use of a Computer Network System; American Journal of Orthodontics and Dentofacial Orthopedics; 101(3); pp. 210-220; 20 pages; (Author Manuscript) Mar. 1992.
Schellhas et al.; Three-Dimensional Computed Tomography in Maxillofacial Surgical Planning; Archives of Otolaryngology—Head and Neck Surgery; 114(4); pp. 438-442; Apr. 1988.

(56) References Cited

OTHER PUBLICATIONS

Schroeder et al.; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.
Shilliday; Minimizing finishing problems with the mini-positioner; American Journal of Orthodontics; 59(6); pp. 596-599; Jun. 1971.
Shimada et al.; Application of optical coherence tomography (OCT) for diagnosis of caries, cracks, and defects of restorations; Current Oral Health Reports; 2(2); pp. 73-80; Jun. 2015.
Siemens; Cerec—Computer-Reconstruction, High Tech in der Zahnmedizin; 15 pagesl; (Includes Machine Translation); (year of pub. sufficiently earlier than effective US filing date and any foreign priority date); 2004.
Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.
The American Heritage, Stedman's Medical Dictionary; Gingiva; 3 pages; retrieved from the interent (http:/reference.com/search/search?q=gingiva) on Nov. 5, 2004.
The Dental Company Sirona: Cere omnicam and cerec bluecam brochure: The first choice in every case; 8 pages; (year of pub. sufficiently earlier than effective US filing date and any foreign priority date) 2014.
Thorlabs; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-28; Sep.-Oct. 1992.
Tru-Tatn Orthodontic & Dental Supplies, Product Brochure, Rochester, Minnesota 55902, 16 pages; (year of pub. sufficiently earlier than effective US filing date and any foreign priority date) 1996.
U.S. Department of Commerce, National Technical Information Service, Holodontography: An Introduction to Dental Laser Holography; School of Aerospace Medicine Brooks AFB Tex; Mar. 1973, 40 pages; Mar. 1973.
U.S. Department of Commerce, National Technical Information Service; Automated Crown Replication Using Solid Photography SM; Solid Photography Inc., Melville NY,; 20 pages; Oct. 1977.
Van Der Linden et al.; Three-Dimensional Analysis of Dental Casts by Means of the Optocom; Journal of Dental Research; 51(4); p. 1100; Jul.-Aug. 1972.
Van Hilsen et al.; Comparing potential early caries assessment methods for teledentistry; BMC Oral Health; 13(16); doi: 10.1186/1472-6831-13-16; 9 pages; Mar. 2013.
Varady et al.; Reverse Engineering of Geometric Models'An Introduction; Computer-Aided Design; 29(4); pp. 255-268; 20 pages; (Author Manuscript); Apr. 1997.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23 (10); pp. 694-700; Oct. 1989.
Wells; Application of the Positioner Appliance in Orthodontic Treatment; American Journal of Orthodontics; 58(4); pp. 351-366; Oct. 1970.
Williams; The Switzerland and Minnesota Developments in CAD/CAM; Journal of Dental Practice Administration; 4(2); pp. 50-55; Apr./Jun. 1987.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Yamamoto et al.; Optical Measurement of Dental Cast Profile and Application to Analysis of Three-Dimensional Tooth Movement in Orthodontics; Front. Med. Biol. Eng., 1 (2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Begole et al.; A Computer System for the Analysis of Dental Casts; The Angle Orthodontist; 51(3); pp. 252-258; Jul. 1981.
Biggerstaff; Computerized Diagnostic Setups and Simulations; Angle Orthodontist; 40(I); pp. 28-36; Jan. 1970.
Blu et al.; Linear interpolation revitalized; IEEE Transactions on Image Processing; 13(5); pp. 710-719; May 2004.
Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.
Gao et al.; 3-D element Generation for Multi-Connected Complex Dental and Mandibular Structure; IEEE Proceedings International Workshop in Medical Imaging and Augmented reality; pp. 267-271; Jun. 12, 2001.
Kamada et.al.; Case Reports On Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.
Kanazawa et al.; Three-Dimensional Measurements of the Occlusal Surfaces of Upper Molars in a Dutch Population; Journal of Dental Research; 63(11); pp. 1298-1301; Nov. 1984.
Kochanek; Interpolating Splines with Local Tension, Continuity and Bias Control; Computer Graphics; 18(3); pp. 33-41; Jan. 1, 1984.
Kunii et al.; Articulation Simulation for an Intelligent Dental Care System; Displays; 15(3); pp. 181-188; Jul. 1994.
Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.
Richmond et al.; The Development of the PAR Index (Peer Assessment Rating): Reliability and Validity.; The European Journal of Orthodontics; 14(2); pp. 125-139; Apr. 1992.

(56) References Cited

OTHER PUBLICATIONS

Sturman; Interactive Keyframe Animation of 3-D Articulated Models; Proceedings Graphics Interface '84; vol. 86; pp. 35-40; May-Jun. 1984.
Van Der Linden; A New Method to Determine Tooth Positions and Dental Arch Dimensions; Journal of Dental Research; 51(4); p. 1104; Jul.-Aug. 1972.
Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.
Verstreken et al.; An Image-Guided Planning System for Endosseous Oral Implants; IEEE Transactions on Medical Imaging; 17(5); pp. 842-852; Oct. 1998.
Williams; Dentistry and CAD/CAM: Another French Revolution; J. Dent. Practice Admin.; 4(1); pp. 2-5 Jan./Mar. 1987.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998,.
Cramer; U.S. Appl. No. 15/937,569 entitled "Apparatuses and methods assisting in dental therapies," filed Mar. 27, 2018.
Cramer et al.; U.S. Appl. No. 15/942,341 entitled "Orthodontic appliances including at least partially un-erupted teeth and method of forming them," filed Mar. 30, 2018.
Yamada et al.; Simulation of fan-beam type optical computed-tomography imaging of strongly scattering and weakly absorbing media; Applied Optics; 32(25); pp. 4808-4814; Sep. 1, 1993.
Doruk et al.; The role of the headgear timer in extraoral co-operation; European Journal of Orthodontics; 26; pp. 289-291; Jun. 1, 2004.
Friedrich et al.; Measuring system for in vivo recording offeree systems in orthodontic treatment-concept and analysis of accuracy; J. Biomech.; 32(1); pp. 81-85; (Abstract Only) Jan. 1999.
Grest, Daniel; Marker-Free Human Motion Capture in Dynamic Cluttered Environments from a Single View-Point, PhD Thesis; 171 pages; Dec. 2007.
Invisalign; "You were made to move. There's never been a better time to straighten your teeth with the most advanced clear aligner in the world"; Product webpage; 2 pages; retrieved from the internet (www.invisalign.com/) on Dec. 28, 2017.
Kumar et al.; Rapid maxillary expansion: A unique treatment modality in dentistry; J. Clin. Diagn. Res.; 5(4); pp. 906-911; Aug. 2011.
Nedelcu et al.; "Scanning Accuracy and Precision in 4 Intraoral Scanners: An In Vitro Comparison Based on 3-Dimensional Analysis"; J. Prosthet. Dent.; 112(6); pp. 1461-1471; Dec. 2014.
Sahm et al.; "Micro-Electronic Monitoring of Functional Appliance Wear"; Eur J Orthod.; 12(3); pp. 297-301; Aug. 1990.
Sahm; Presentation of a wear timer for the clarification of scientific questions in orthodontic orthopedics; Fortschritte der Kieferorthopadie; 51 (4); pp. 243-247; (Translation Included) July 19990.
Schafer et al.; "Quantifying patient adherence during active orthodontic treatment with removable appliances using microelectronic wear-time documentation"; Eur J Orthod.; 37(1)pp. 1-8; doi:10.1093/ejo/cju012; Jul. 3, 2014.
Thera Mon; "Microsensor"; "2 pages"; retrieved from the interent (www.english.thera-mon.com/the-product/transponder/index.html); on Sep. 19, 2016.
Wikipedia; Palatal expansion; 3 pages; retrieved from the internet (https://en.wikipedia.org/wiki/Palatal_expansion) on Mar. 5, 2018.
Wireless Sensor Networks Magazine; Embedded Teeth for Oral Activity Recognition; 2 pages; retrievedon Sep. 19, 2016 from the internet (www.wsnmagazine.com/embedded-teeth/); Jul. 29, 2013.
Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.
Carrier et al.; U.S. Appl. No. 15/803,718 entitled "Methods and apparatuses for dental images," filed Nov. 3, 2017.
Kuo; U.S. Appl. No. 15/829,504 entitled "Dental appliance features for speech enhancement," filed Dec. 1, 2017.
Atiya et al.; U.S. Appl. No. 15/859,010 entitled "Compact confocal dental scanning apparatus," filed Dec. 29, 2017.
Wu et al.; U.S. Appl. No. 15/831,262 entitled "Methods and apparatuses for customizing a rapid palatal expander," filed Dec. 4, 2017.
Grove et al.; U.S. Appl. No. 15/726,243 entitled "Interproximal reduction templates," filed Oct. 5, 2017.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new features; 2 pages; retrieved from the internet (http://www.dentrix.com/g3/new_features/index.asp); on Jun. 6, 2008.
Di Giacomo et al.; Clinical application of sterolithographic surgical guides for implant placement: Preliminary results; Journal Periodontolgy; 76(4); pp. 503-507; Apr. 2005.
Gansky; Dental data mining: potential pitfalls and practical issues; Advances in Dental Research; 17(1); pp. 109-114; Dec. 2003.
GEOMAGIC; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/7geom/OBB/OBBT.html); relieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide; journal of Oral and Maxillofacial Implants; 118(4); pp. 571-577; Jul. 2003.

(56) References Cited

OTHER PUBLICATIONS

Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.
Szeliski; Introduction to computer vision: Structure from motion; 64 pages; retrieved from the internet (http://robots.stanford.edu/cs223b05/notes/CS%20223-B%20L10%structurefrommotion1b.ppt, on Feb. 3, 2005.
Vevin et al.; Pose estimation of teeth through crown-shape matching; In Medical Imaging: Image Processing of International Society of Optics and Photonics; vol. 4684; pp. 955-965; May 9, 2002.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Wiedmann; According to the laws of harmony to find the right tooth shape with assistance of the computer; Digital Dental News; 2nd vol.; pp. 0005-0008; (English Version Included); Apr. 2008.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.
Yaltara Software; Visual planner; 1 page; retrieved from the internet (http://yaltara.com/vp/) on Jun. 6, 2008.
Zhang et al.; Visual speech features extraction for improved speech recognition; 2002 IEEE International conference on Acoustics, Speech and Signal Processing; vol. 2; 4 pages; May 13-17, 2002.
Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.
Farooq et al.; Relationship between tooth dimensions and malocclusion; JPMA: The Journal of the Pakistan Medical Association; 64(6); pp. 670-674; Jun. 2014.
Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.
ormco.com; Increasing clinical performance with 3D interactive treatment planning and patient-specific appliances; 8 pages; retrieved from the internet (http://www.konsident.com/wp-content/files_mf/1295385693http_ormco.com_index_cmsfilesystemaction_fileOrmcoPDF_whitepapers.pdf) on Feb. 27, 2019.
Video of DICOM to Surgical Guides; [Copy Not Enclosed], Can be viewed at <URL:https://youtu.be/47KtOmCEFQk; Published Apr. 4, 2016.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
Li et al.; U.S. Appl. No. 16/171,159 entitled "Alternative bite adjustment structures," filed Oct. 25, 2018.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
3 Shape Trios 3, Insane speed-scanning with 3shape trios 3 intracral canner, (Screenshot), 2 pages, retrieved from the internet at You Tube (https//www.youtube.com/watch? v=X5CviUZ5DpQ&feature=youtu.be, available as of Sep. 18, 2015.
Sobral De A Gular et al., The Gingival Crevicular Fluid as a Source of Biomarkers to Enhance Efficiency of Orthodontic and Functional Treatment of Growing Patients, Bio. Med. Research International, 2017, 7 Pages, Article ID 3257235, 2017.

\* cited by examiner

ATTACHMENT TEMPLATE

ACTIVE EXPANDERS

PASSIVE HOLDER (RETAINER)

HOLDER (PASSIVE EXPANDER)

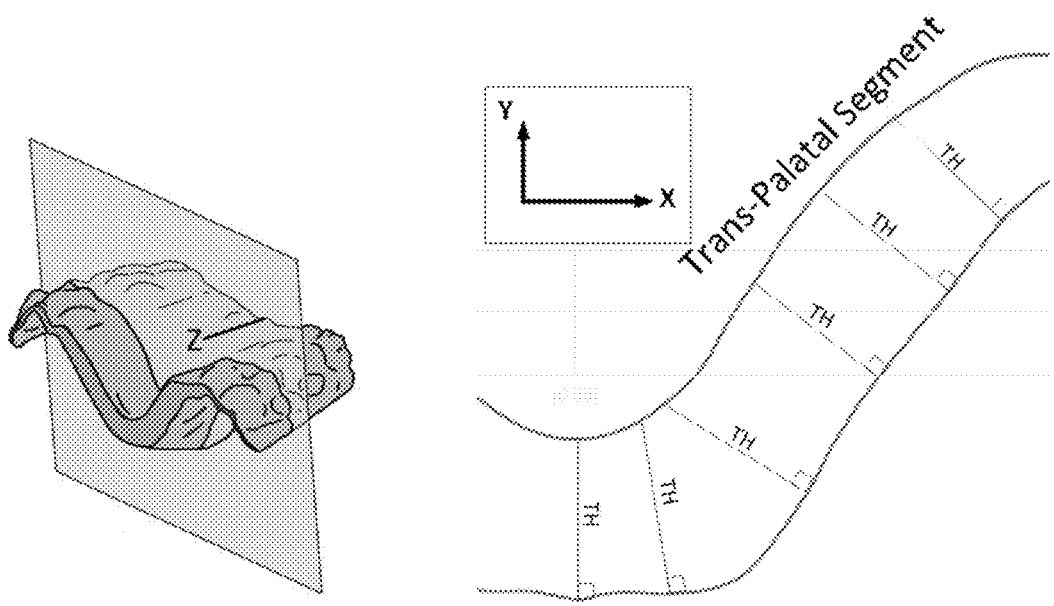
FIG. 9A  FIG. 9B
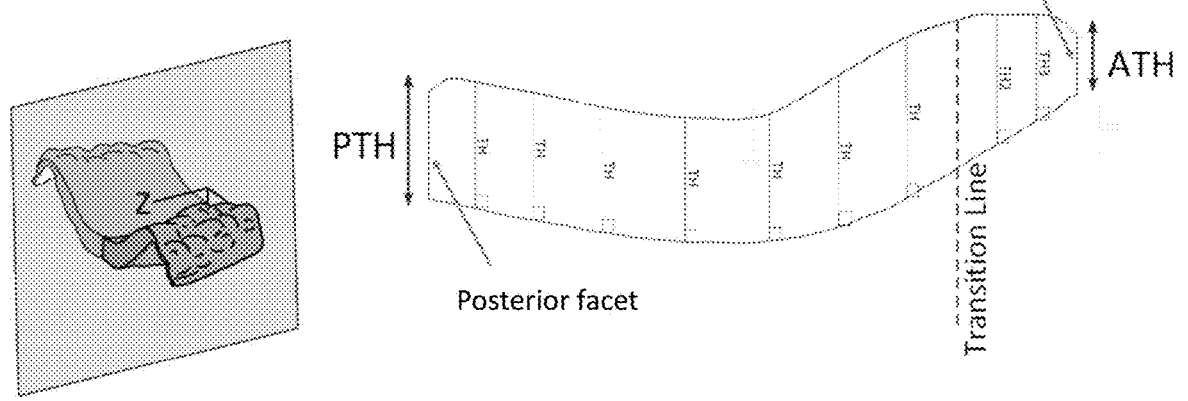
FIG. 10A  FIG. 10B

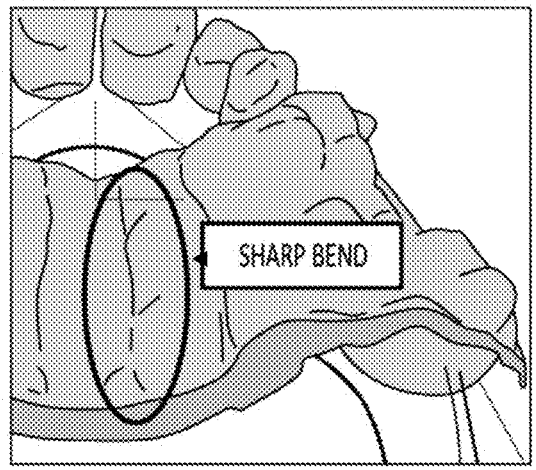
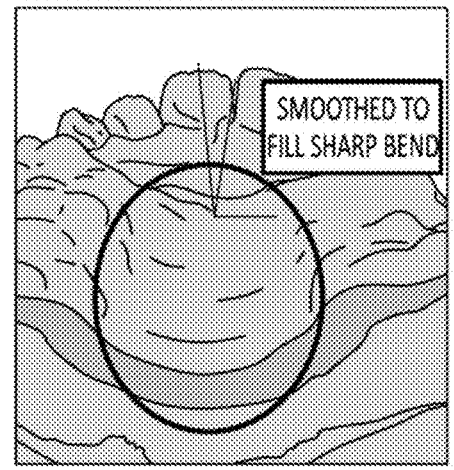
FIG. 14A  FIG. 14B
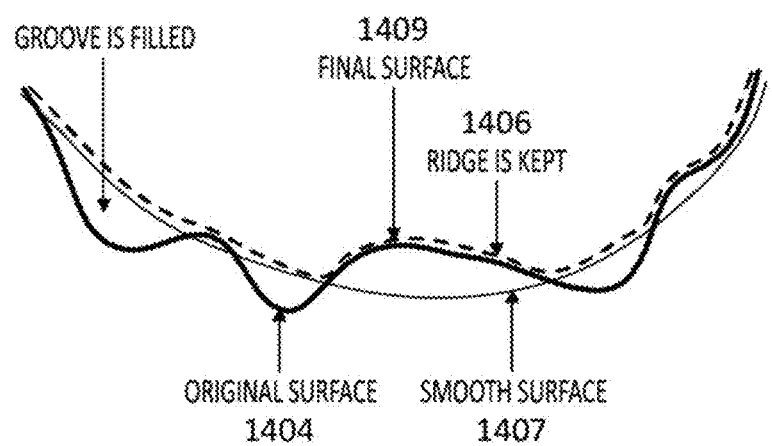
FIG. 14C

1 CYLINDER CASTING
2 CYLINDER CORE
3 KEYWAY
4 CORE PIN
5 DRIVER PIN
6 PIN SPRING
7 TAIL PIECE
8 THREADED BORE HOLE

MECHANICAL INTERLOCKING

MECHANICAL LATCHING

PALATAL EXPANDERS AND METHODS OF EXPANDING A PALATE

CROSS REFERENCE TO RELATED APPLICATIONS

This patent application claims priority to U.S. Provisional Patent Application No. 62/429,692, filed on Dec. 2, 2016 (titled "METHODS OF FABRICATING PALATAL EXPANDERS"), and U.S. Provisional Patent Application No. 62/542,750, filed on Aug. 8, 2017 (titled "PALATAL EXPANDERS AND METHODS OF EXPANDING A PALATE"), each of which is herein incorporated by reference in its entirety. This patent application may also be related to U.S. patent application Ser. No. 15/831,262, titled "METHODS AND APPARATUSES FOR CUSTOMIZING A RAPID PALATAL EXPANDER" by Wu et al, concurrently filed herewith, which is also herein incorporated by reference in its entirety.

This application may be related to US Patent Application Publication No. 2016/0081768 (titled "ARCH EXPANDING APPLIANCE") and U.S. Patent Application Publication No. 2016/0081769 (titled "ARCH ADJUSTMENT APPLIANCE"), each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are palatal expanders, methods of making and methods of using them. For example, described herein are series' of palatal expanders that are ordered to provide incremental palatal expansion (including rapid or gradual palatal expansion) and methods of fabricating series of palatal expanders that are customized to a patient.

BACKGROUND

A variety of orthodontic problems are linked with a narrow palate. In certain circumstances the maxilla the size to accommodate the upper teeth. In other cases there is room for the upper teeth but the palate is so narrow that speech is impaired or made difficult. In other cases the palate is so high that it cuts down on the amount of air that can pass through the nose, so that deep breathing, without opening the mouth, is almost impossible. In all of these cases, palate expansion, that is separating and spreading the maxilla, may be helpful.

Described herein are palatal expander apparatuses and methods that may be used to easily and efficiently expand a patient's palate.

SUMMARY OF THE DISCLOSURE

Apparatuses (including devices and systems) and method for progressively expanding the palate of a patient may include one or a series of palatal expanders. Provided herein are methods and apparatuses (including systems and devices) for progressive palatal expansion. These palatal expanders may be adapted for comfort, efficacy and/or for ease of removal. For example described herein are systems for palatal expansion that may include a series of incremental expanders including a first incremental expander having a geometry selected to expand the palate, one or more intermediate expanders having geometries selected to progressively expand the palate to a target desired breadth. These systems may also include a template for positioning one or more attachments for holding the palatal expander on the subject's teeth and and/or a holder or retainer for maintaining the expanded palate following active treatment.

Typically, expanders have been described as pre-formed devices having a first molar-engaging region adapted to engage upper molars on a first side of the upper jaw, a second molar-engaging region adapted to engage upper molars on a second side of the upper jaw and palatal region with a geometry selected to fit against the shape of the palate while providing pressure to incrementally expand the palate. Each of the expanders in a series of expanders may comprise two molar regions, one on each side, each with one or more cavities, each cavity being adapted to fit over one of the patient's molars. In an especially preferred embodiment each molar region comprises two cavities, such that each molar region fits over two posterior molars or premolars. Each expander may further comprise a palatal region, which separates the two molar regions and fits against the patient's palate. Typically, the distance between the molar regions in the series of expanders is sequentially greater.

The palatal region of the device may provide force to stretch or expand the midpalatal region. Although energy-enhancing features may be placed in this region (e.g., springs and thermally active materials), in addition, this region may include one or more adaptations, such as struts, supports, cross-beams, ribs, gaps/windows, attachments, and the like which may distribute the forces applied in a more nuanced manner than previously described. For example, these devices may be configured so that the forces applied are distributed in a predetermined and/or desired pattern by arranging one or more points of contact between the palatal expander and the patient's mouth (e.g., in the gingiva and/or preferably along an upper or lower lateral portion of the patient's teeth, including their molars). The curvature (e.g., concavity) of the device may also be adjusted, to distribute the forces applied, while allowing clearance between the palate and the device, and/or allowing clearance for the user's tongue.

A series of palatal expanders as described herein may be configured to expand the patient's palate by a predetermined distance (e.g., the distance between the molar regions of one expander may differ from the distance between the molar regions of the prior expander by not more than 2 mm, by between 0.1 and 2 mm, by between 0.25 and 1 mm, etc.) and/or by a predetermined force (e.g., limiting the force applied to less than 180 Newtons (N), to between 8-200 N, between 8-90 N, between 8-80 N, between 8-70 N, between 8-60 N, between 8-50 N, between 8-40 N, between 8-30 N, between 30-60N, between 30-70N, between 40-60N, between 40-70 N, between 60-200 N, between 70-180N, between 70-160N, etc., including any range there between).

In any of the apparatuses described herein (and methods of fabricating them), the expanders may be formed out of a polymeric (e.g., acrylic, thermoplastics, thermosets, etc.) and/or a metal material, including stainless steel, nickel titanium, copper nickel titanium, etc. Any of these apparatuses may be formed by 3D printing and/or by a lamination process, in which the apparatuses are formed for layers of material that may be formed and/or adhered together (e.g., to form a unitary device); different layers may have different mechanical and/or chemical properties, and may include different thicknesses or regions of thickness. For example, an apparatus may include laminated materials that are bonded together.

Also described herein are apparatuses and method of forming them by direct fabrication techniques. For example, an apparatus (including a series of palatal expanders) may be digitally designed and fabricated by a direct printing (e.g., 3D printing); alternatively or additionally the fabrication method may include 3D printing of models of the teeth, gingiva and palate that have been digitally configured to form one or more of the series applying the palatal expansion.

Also described herein are methods of expanding the palate of a patient using any of the apparatuses described herein, which may include positioning each expander in a series of expanders in position to expand the palate, leaving the expander in position for a period of time and replacing the expander with the next expander in the series until the desired palatal expansion has occurred and then applying a palatal expander that is configured to retain the palate in the final position at the target desired breadth.

Any of the apparatuses described herein may be adapted to make removing the palatal expander without reducing the retention or the ability of the palatal expander to remain held in position on the patient. For example, any of these palatal expanders may include detachment region on one or both buccal side of the palatal expander. The detachment region (which may be referred to as a removal grip, a removal cavity, a removal handle, a removal attachment, removal slot, etc.) may include a gap, slot, opening, etc., on an upward- or downward-facing side that may be adapted to allow a user to insert a fingernail and/or removal tool therein to remove the palatal expander from the teeth. The detachment region may be configured to deform and release the palatal expander from the patient's teeth. The detachment region may be configured as a lip, ledge, or protrusion on the buccal side of the palatal expander. Any of these palatal expanders may include a hinge region that is between the occlusal surface and the buccal side, so that operating the detachment region may pull the buccal side of the palatal expander away from the patient's teeth and/or off of any attachment so that it may be removed. Any of these palatal expanders may include a slit, slot, gap, etc. that extends upward from the edge of the palatal expander toward the occlusal surface on the buccal side permitting all or a portion of the palatal expander to pull upward and disengage from the teeth.

Also described herein are palatal expanders that are adapted for comfort to have a thickness that varies. For example, in any of these variations, the palatal expander may include an inner bottom surface in the palatal arch portion of the palatal expander that faces the patient' tongue when worn that is smooth or flattened compared to the opposite surface (matching the patient's palate where the palatal expander is worn. This tongue-facing side may have a surface that is rounded and does not include any rapid transitions in topology compared with the patient's actual palate. In any of these examples, the apparatuses described herein may have a different (including variable) thickness. In some variations, the apparatus may include a palatal region that is narrower toward the anterior of the palatal expander apparatus. In any of these variations, the poster portion of the palatal expander may be thinner and/or cut away (removed from) the palatal expander, which may prevent or limit gagging.

Any of the palatal expanders described herein may also or alternatively include occlusal thicknesses that may be customized by the dental professional and/or may be different from the patient's normal occlusal topography. For example, the exposed occlusal surface of the palatal expander when worn may be configured to have a surface that is configured to mate with the occlusive surface of the opposite jaw (e.g., the mandibular arch) to apply forces to adjust the patient's jaw positon when worn. Alternatively or additional, the thickness of the occlusal surface may be flatter, or may include a ramp or other structure to adjust the patient's bite. In some variations the occlusive surface may be thinner or at least partially removed, so as to minimally interfere with the patient's bite. In some variations, the occlusive surface of the retainer may be thin or partially (or completely) removed, while in the palatal expander series used to actively expand the patient's palate the occlusive surface may be thicker.

Also described herein are palatal expanders that are marked on a flat surface, e.g., a surface on the back or posterior edge of the palatal expander apparatus, with a code that indicates one or more of the series number (e.g., first, second, third, fourth, etc., holder, etc.), a patient code (e.g., identify the patient with specificity), a time and/or date, a copy number, etc. The identifying code or part number may be configured so that it may read by the user (e.g. patient) to assist in performing the palatal expansion in the proper sequence, as well as distinguishing between palatal expander and holder.

Also described herein are methods for forming one or a series of palatal expanders and methods of making and using them in which the palatal expander is configured to include one or more gaps or spacing regions between the patient's upper arch and the upper (e.g., palate-facing) surface of the palatal expander. For example, any of these apparatuses may be configured to include a gap or concave channel or region to prevent impingement near the gingival line (e.g., on the buccal and/or on the lingual side of the apparatus. Any of these apparatuses may be configured to include a gap between the upper (e.g., palate-facing) surface of the palatal expander and the palate.

Methods and apparatuses for performing palatal expansion using any of these apparatuses are also described. For example, described herein are methods an apparatuses for scanning a patient's intraoral cavity (including in particular the upper arch) sufficiently so that the palatal expander apparatuses described herein may be formed.

Methods of applying or attaching the palatal expanders described herein are described, including methods for the patient to apply the palatal expander to her/his own teeth. Also described herein are attachments (which may alternatively be referred to as retaining attachments, retaining posts, etc.) and templates for attaching the attachments to a patient's teeth that may be configured to releasably secure the palatal expander to the patient's teeth. Methods of forming the attachment template, and/or attaching the attachments to the teeth are also described.

Also described herein are methods and apparatuses for removing the palatal expanders from a patient's teeth. For example, described herein are removal tools to assist a person (and particularly, but not limited to, the patient) in removing the palatal expander when secured onto the patient's teeth.

Also described herein are methods of making any of the apparatuses described herein.

For example, described herein are palatal expander apparatuses for expanding a patient's palate. A palatal expander apparatus may include: a pair of tooth engagement regions connected by a palatal region and two or more attachment regions each configured to couple to an attachment bonded to the patient's teeth, wherein the palatal region is configured to apply between 8 and 160 N of force between the pair of tooth engagement regions when worn by the patient; wherein the tooth engagement regions each comprise an occlusal side and a buccal side, further wherein the occlusal side is thinner than the palatal region, and the buccal side is thinner than the occlusal side.

The palatal region may be between about 1-5 mm thick (e.g., between 1.5 to 3 mm, between 2 and 2.5 mm thick, etc.). The occlusal side may have a thickness of between about 0.5-2 mm (e.g., between 0.5 to 1.75 mm, between 0.75 to 1.7 mm, etc.). The buccal side may have a thickness of between about 0.25-1 mm (e.g., between 0.35 and 0.85 mm, between about 0.4 and 0.8 mm, etc.).

Any of these apparatuses may include a hinge (e.g., hinge region) on the buccal side or between the buccal side and the occlusal side that is configured permit bending at the hinge which may make removing the apparatus easier.

Any of these apparatuses may include a visible identification marking on a flat posterior surface of the palatal expander apparatus, wherein the identification marking encodes one or more of: a patient number, a revision indicator, an indicator that the apparatus is a palatal expander or a retainer, and the stage of treatment.

Any of these apparatuses may include a detachment region on a buccal side of the apparatus to help remove the device once attached to the patient's teeth. Since the forces being applied to widen the palate may make it difficult to easily remove the apparatus, a buccally-located detachment region (e.g., a notch, gap, handle, tab, slot, etc.) may be used to more easily remove the apparatus from the teeth, particularly when attachments are used to hold the apparatus on the teeth. The detachment region may be on or extend from the buccal side(s) and may be spaced from the patient's gingiva by at least 0.25 to 1 mm when the apparatus is being worn and may be near the bottom edge (or extending from the bottom edge, or over the bottom edge) of the buccal side of the apparatus. For example, the bottom edge of the buccal side may be configured as a detachment region extending from the buccal side of the device, along all or a side (e.g., between 1 mm and 5 cm, e.g. 1 mm to 4 cm, 1 mm to 3 cm, 5 mm to 4 cm, etc.) of the buccal region. The extension may be configured to extend below and away from the patient's gingiva, e.g., to form a gap of between about 0.25-1 mm when the apparatus is worn by a patient. Any of these apparatuses may include one or a plurality of vertical slots or slits extending from a bottom of the buccal side toward the occlusal side. In particular, these slots or slits may be on either side of the detachment region.

Any of these apparatuses may be smoothed on the tongue-facing side of the apparatus. For example, the palatal region may comprise an upper convex surface having a first surface curvature comprising a plurality of grooves and ridges that align with grooves and ridges in the patient's palate; further wherein the palatal region comprises a lower, concave surface having a second surface curvature that is smoother than the first surface curvature. Smoother may mean having fewer and/or less extensive (deep, high) grooves and/or ridges.

Also described herein are methods of making a palatal expander apparatus, the method comprising: receiving a model of a patient's upper arch (e.g., a digital model, a manual model, etc.); and forming a palatal expander having a pair of tooth engagement regions connected by a palatal region and two or more attachment regions each configured to couple to an attachment bonded to the patient's teeth, wherein the tooth engagement regions are each configured to fit over the patient's teeth and each comprise an occlusal side and a buccal side, further wherein the occlusal side comprises a detachment region configured to engage with the patient's fingernail to disengage at least one of the attachment regions from an attachment on the patient's teeth. Forming the apparatus may include forming any of the features described herein, including detachment regions, slits/slots, smoothing the tongue-facing side, forming an opening in the apparatus, varying the thickness of the different regions relative to each other and/or within each region, etc. For example, forming may comprise forming the palatal region by smoothing a bottom surface of the palatal region relative to an opposite top surface of the palatal region.

For example, a method of making a palatal expander apparatus may include: receiving a model of a patient's upper arch; forming a palatal expander having a pair of tooth engagement regions connected by a palatal region and two or more attachment regions each configured to couple to an attachment bonded to the patient's teeth; wherein the tooth engagement regions are each configured to fit over the patient's teeth and each comprise an occlusal side and a buccal side; and a detachment region on the buccal side having a gap that is configured to engage with the patient's fingernail or an elongate tool and to disengage at least one of the attachment regions from an attachment on the patient's teeth.

In any of these methods and apparatuses, the detachment region may comprises a projection extending from the buccal side of the tooth engagement region. The palatal expander may be configured not to contact either or both the gingiva adjacent to a lingual side of the patient's teeth when worn by the patient and the midline of the patient's palate.

In any of these methods, the tooth engagement region may comprise an extension of the buccal side of the tooth engagement region that extends from the patient's gingiva to form a gap of between about 0.25-1 mm when the apparatus is worn by a patient. The tooth engagement region may comprise a projection extending from the buccal side of the tooth engagement region. The palatal expander may be configured to contact a lingual side of the patient's teeth when worn by the patient and to apply between 8 and 160 N of force between the tooth engagement regions. The palatal expander may be configured not to contact either or both the gingiva adjacent to a lingual side of the patient's teeth when worn by the patient and the midline of the patient's palate.

The apparatus may be formed in any appropriate manner, including forming comprises forming by three-dimensional (3D) printing. For example, receiving a model of the patient's upper arch may comprise receiving a digital model of the patient's teeth, gingiva and palatal region.

Any of these methods may also include forming a retainer and/or forming a template for placing attachments. Any of these methods may also include sending and/or providing these apparatuses to a dental provider and/or patient.

Also described herein are palatal expander apparatuses for expanding a patient's palate including: a pair of tooth engagement regions connected by a palatal region and two or more attachment regions each configured to couple to an attachment bonded to the patient's teeth; wherein the tooth engagement regions each comprise an occlusal side and a buccal side, further wherein at least one of the occlusal sides comprises a detachment region on the buccal side configured to be grabbed and pulled to disengage at least one of the attachment regions from an attachment on the patient's teeth.

A palatal expander apparatus for expanding a patient's palate may include: a pair of tooth engagement regions connected by a palatal region and two or more attachment regions each configured to couple to an attachment bonded to the patient's teeth; wherein the tooth engagement regions each comprise an occlusal side and a buccal side, further wherein the occlusal side is thinner than the palatal region, and the buccal side is thinner than the occlusal side; and a hinge region on the buccal side before the occlusal side.

For example, described herein are palatal expander apparatus (and series or sequences of palatal expanders); any of these palatal expanders may be patient- or patient caregiver-removable. For example, a palatal expander apparatus for expanding a patient's palate may include: a pair of tooth engagement regions connected by a palatal region, wherein the palatal region is configured to apply between 8 and 160 N of force between the pair of tooth engagement regions when the apparatus is worn by the patient; wherein the tooth engagement regions each comprise an occlusal side and a buccal side, further wherein the occlusal side is thinner than the palatal region, and the buccal side is thinner than the occlusal side.

In general, any of these palatal expanders may be configured so that all or a portion (e.g., the mid-palatal region, e.g., configured to be positioned opposite of the suture) is spaced apart from the patient's palate when the device is worn, by some minimum distance, e.g., between 0.01 and 5 mm (e.g., 0.02 mm or greater, 0.03 mm or greater, 0.04 mm or greater, than 0.05 mm or greater, 0.06 mm or greater, 0.07 mm or greater, 0.1 mm or greater, 0.15 mm mm or greater, 0.2 mm or greater, 0.25 mm or greater, etc.) This minimum distance may be determined when forming the palatal expander by modeling (e.g., from a digital model) the patient's dental arch, including the palatal region. Including this minimal distance may be particularly helpful, for example, to prevent sores or irritation of the soft and/or hard palate when wearing the palatal expander(s).

This space between the palatal-facing surface of the palatal region of the palatal expander and the patient's palate may be referred to as clearance. This spacing may be positive (e.g., forming a gap) or, in some areas of the palate region, negative, e.g., impinging on the patient's palate, in order to provide force to expand the palate. Negative clearance may be identified by comparing an actual or predicted (e.g., for later stages of the expansion treatment) model of the patient's palate with the palatal expander outer (palate-facing) surface. Actual or predated models may be digital (virtual) or casts of the patient's dental arch. In later stages of treatment, the clearance may be estimated from a digital model in which the patient's palatal region morphology is predicted by morphing the palatal region r to reflect the treatment progression.

For example, contact with soft palate regions of the patient's palate may be avoided by include positive clearance of greater than some minimum (e.g., see above, such as 0.1 mm, 0.2 mm, etc.) in regions configured to be worn opposite of the soft palatal region). In general, any of these apparatuses may be configured so that the mid palatal regions (e.g., opposite the mid palatal suture) are offset from the patient's palate when worn. In some variations the separation distance may be at a maximum in this mid palatal region. In some variations the separation distance may decrease laterally, and negative clearance (e.g., force-applying contact) may be present laterally. The clearance may vary over a sequence or series of aligners. For example, the initial (early) stages may be configured to have a lower maximum positive clearance than later stages, which may have greater maximum clearance. Any of these apparatuses may have greater positive clearance posterior than anteriorly. In some variations, the maximum positive clearance may taper from a maximum at the mid-palatal region towards the teeth.

For example, in some variations, the palatal region may be configured to have a clearance of greater than 0.1 mm from the patient's mid-palatal region when the device is worn by the patient.

Any of these apparatuses may include two or more attachment regions each configured to couple to an attachment bonded to the patient's teeth. Attachment regions may be openings, pits, slots, channels, or the like for securing to an attachment bonded to the patient's teeth. The attachment regions may be configured to secure to the patient's teeth, but to allow removal of the apparatus from the attachment by flexing a portion (e.g., a detachment region) of the palatal expander, which may be on the buccal side, including extending from the buccal side.

In general, as mentioned above, any of the palatal expanders described herein may include a variable thickness (e.g., transverse thickness perpendicularly between the opposite upper and lower surfaces). For example, the average and/or maximum thickness of the palatal region may be greater than the average or maximum thickness of the occlusal surface (e.g., the side worn against the occlusal surface of the teeth); the average or maximum thickness of the buccal surface (e.g., the side worn against the buccal surface of the teeth) may be less than the average or maximal thickness of the occlusal surface and/or the palatal surface. Alternatively or additionally, in some variations all or a portion of the occlusal surface may be cut away. In general, an anterior portion of the palatal region may have a different average thickness than a posterior portion of the palatal region. For example, the anterior portion of the palatal region may be thinner than a posterior portion of the palatal region; alternatively, the anterior portion of the palatal expander may be thicker than the posterior portion.

As mentioned, any of these apparatuses may include a hinge region on the buccal side or between the buccal side and the occlusal side configured to bend and release the tooth engagement region from the patient's teeth. The hinge region may be a local region in which the thickness and/or stiffness of the palatal expander is less than the nearby adjacent regions, so that when force is applied, e.g., pulling on the distal edge of the buccal side of the palatal expander, this hinge region will preferentially flex so that the attachment region may disengage from an attachment on the patient's teeth.

In general, any of the apparatuses described herein may include a visible identification marking on a surface of the palatal expander apparatus (including, but not limited to a posterior edge or surface), wherein the identification marking encodes one or more of: a patient number, a revision indicator, an indicator that the apparatus is a palatal expander or a retainer, and the stage of treatment.

As mentioned, any of these apparatuses may include an extension extending from the buccal side of the apparatus, wherein the extension is configured to extend adjacent and away from the patient's gingiva to form a gap of between about 0.25 and 1 mm when the apparatus is worn by a patient. The length of the extension may be determined so that it does not contact the inner cheek surface.

Any of these apparatuses may include a palatal region that has an upper convex surface (palatal-facing surface) having a first surface curvature, and a lower, concave (tongue-facing/lingual facing) surface having a second surface curvature that is smoother than the first surface curvature. The thickness of the palatal region may therefore across the different portions of the palatal region. In some variations, as described herein, the upper convex surface may have a first surface curvature comprising a plurality of grooves and ridges that correspond with grooves and ridges in the patient's palate (although they may be positively/negatively offset from them when worn, as discussed above). The lower, concave surface may have a second surface curvature that is smoother than the first surface curvature.

For example, a palatal expander apparatus for expanding a patient's palate may include: a pair of tooth engagement regions connected by a palatal region, wherein the palatal region is configured to apply between 8 and 160 N of force between the pair of tooth engagement regions when the apparatus is worn by the patient; and an extension extending from the buccal side, wherein the extension is configured to extend adjacent and away from the patient's gingiva when the apparatus is worn by the patient to form a gap of between about 0.25 mm and 1 mm; wherein the tooth engagement regions each comprise an occlusal side and a buccal side, further wherein the occlusal side is thinner than the palatal region, and the buccal side is thinner than the occlusal side, further wherein the palatal region is configured to have a clearance of greater than 0.1 mm from the patient's mid-palatal region when the device is worn by the patient.

A palatal expander apparatus for expanding a patient's palate may include: a pair of tooth engagement regions configured to attach over the patient's molars, wherein the tooth engagement regions are connected by a palatal region that is configured to apply between 8 and 160 N of force between the pair of tooth engagement regions when the apparatus is worn by the patient; further wherein the tooth engagement regions each comprise an occlusal side and a buccal side, further wherein the occlusal side is thinner than the palatal region, and the buccal side is thinner and more flexible than the occlusal side; and wherein the palatal region comprises an upper convex surface having a first surface topography; further wherein the palatal region comprises a lower, concave surface having a second surface topography that is smoother than the first surface topography.

The topography of the upper or lower surfaces of the palatal expander may refer to the surface contour. The smoothness of the topography may refer to the relative rate of change in height of the surface along the surface; smoother surfaces typically have a much rate of change of height compared to less smooth surfaces. The smoothness may be average or overall smoothness of all or regions of the surface.

In general, the first surface topography (e.g., the topography of the palatal-facing surface) may be configured to increase the structural integrity of the palatal region and provide between 8 and 160 N of force between the pair of tooth engagement regions when the device is worn by the patient. For example, the first surface topography may comprises a plurality of grooves and ridges configured to correspond to the grooves and ridges of the patient's palate. Alternatively or additionally, having the first surface topography correspond to the surface of the patient's palate may allow the palatal expander to sit on or adjacent (but offset from) the palatal expander more comfortably and/or closer than surface topographies with greater tongue clearance for an equivalent thickness of the palatal region than otherwise possible.

In some variations, the first surface topography comprises one or more lengths of increased thickness of the palatal region extending between the tooth engagement regions. For example, the palatal expander may include one or more full or partial struts extending laterally between the tooth engagement regions. In some variations the first surface topography comprises one or more lengths of increased thickness of the palatal region extending anterior to posterior.

For example, a palatal expander apparatus for expanding a patient's palate may include: a pair of tooth engagement regions connected by a palatal region and two or more attachment regions each configured to couple to an attachment bonded to the patient's teeth; wherein the tooth engagement regions each comprise an occlusal side and a buccal side, further wherein at least one of the buccal sides comprises a detachment region configured to be flexed to disengage at least one of the attachment regions from an attachment on the patient's teeth.

A palatal expander apparatus for expanding a patient's palate may include: a pair of tooth engagement regions connected by a palatal region and two or more attachment regions each configured to couple to an attachment bonded to the patient's teeth; wherein the tooth engagement regions each comprise an occlusal side and a buccal side, further wherein the occlusal side is thinner than the palatal region, and the buccal side is thinner than the occlusal side; and a hinge region on the buccal side or between the buccal side and the occlusal side configured to flex to disengage at least one of the attachment regions from an attachment on the patient's teeth.

Also described herein are palatal expander systems for expanding a patient's palate. These systems may include any of the palatal expanders described herein. Thus, described herein are systems including any of these apparatuses (and series of these apparatuses). For example, described herein are palatal expander systems for expanding a patient's palate, the system comprising: a template for positioning a plurality of attachments on the patient's teeth; a plurality of attachments configured to be held in the template; a plurality of palatal expanders forming a sequence of progressively increasing widths. In some variations, each palatal expander comprises a pair of tooth engagement regions connected by a palatal region and two or more attachment regions each configured to couple to one of the attachments, wherein the palatal region is configured to apply between 8 and 160 N of force between the pair of tooth engagement regions when worn by the patient, further wherein the tooth engagement regions each comprise an occlusal side and a buccal side, further wherein the occlusal side is thinner than the palatal region, and the buccal side is thinner than the occlusal side. Each of the plurality of palatal expanders may include a detachment region on a buccal side of at least one of the attachment regions, wherein the detachment region is configured to be grabbed and pulled to disengage at least one of the attachment regions from an attachment on the patient's teeth.

A system may include: a template for positioning a plurality of attachments on the patient's teeth; a plurality of attachments configured to be held in the template; a plurality of palatal expanders forming a sequence of progressively increasing widths, wherein each palatal expander comprises a pair of tooth engagement regions connected by a palatal region and two or more attachment regions each configured to couple to one of the attachments, wherein the palatal region is configured to apply between 8 and 160 N of force between the pair of tooth engagement regions when worn by the patient, further wherein the tooth engagement regions each comprise an occlusal side and a buccal side, further wherein the occlusal side is thinner than the palatal region, and the buccal side is thinner than the occlusal side; wherein each of the plurality of palatal expanders includes a detachment region on a buccal side of at least one of the attachment regions, wherein the detachment region is configured to be flexed to disengage at least one of the attachment regions from an attachment on the patient's teeth.

Also described herein are methods of expanding a patient's palate using a series of patient-removable palatal expanders, the method comprising: sequentially wearing each of a plurality of palatal expanders except a last palatal expander from the series of patient-removable palatal expanders in a predetermined sequence of progressively increasing widths, wherein: each palatal expander comprises a pair of tooth engagement regions connected by a palatal region and two or more attachment regions, wherein the tooth engagement regions are worn over the patient's teeth with the attachment regions coupled to attachments on the patient's teeth, wherein the palatal region applies between 8 and 160 N of force between the pair of tooth engagement regions when worn by the patient, further wherein the tooth engagement regions each comprise an occlusal side and a buccal side; each palatal expander is worn for between 0.5 and 14 days; and each palatal expander is removed by pulling a disengagement region extending at least 0.25 mm from the patient's gingiva on the buccal side to disengage at least one of the attachment regions from the attachment on the patient's teeth; and wearing a holder palatal expander corresponding to the last palatal expander for greater than 14 days. The phrase "wearing the palatal expander for . . . days" typically does not require continuous (e.g., uninterrupted) wear, but may include removing the palatal expander for routine cleaning (e.g., disinfection of the apparatus, washing of the apparatus, tooth brushing, etc.). Thus wearing the apparatus may include removing the apparatus for less than some percentage (e.g., 2%, 5%, 7%, 10%, etc.) of the time worn during that period (e.g., for a few minutes to an hour a day, etc.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1A is a front perspective view of a bottom side (tongue-facing side) of the palatal expander, shown attached on a model of a patient's upper dental arch. FIG. 1B is a back perspective view of the palatal expander of FIG. 1A. FIG. 1C is another back perspective view of the palatal expander of FIG. 1A. FIG. 1D is a front side perspective view of the palatal expander of FIG. 1A. FIG. 1E is a side perspective view of the palatal expander of FIG. 1A. FIG. 1F is another back perspective view of the palatal expander of FIG. 1A. FIG. 1G is a top perspective view of the palatal expander of FIG. 1A, showing the tooth-receiving cavities and the palate-facing top surface.

In FIG. 8B, a hinged region is shown between the occlusal region and the buccal end of the palatal expander, preferentially bending when force is applied to pull the buccal segment (e.g., the detachment region on the buccal segment) to pull the apparatus away from the teeth.

FIG. 9A shows another example of a palatal expander with a section through an xy plane, as shown in FIG. 8A. FIG. 9B shows the trans-palatal region of the palatal expander in the xy plane, showing different thicknesses (TH) perpendicular to the palatal-facing side of the device.

FIG. 10A is an example of a palatal expander with a section through a zy plane (midline section). FIG. 10B shows an example of a cross-section through the zy plane section of the palatal expander in the zy plane of FIG. 10A, showing the thickness through the palatal expander between the posterior end (posterior facet) and the anterior end (anterior facet).

FIG. 14A is an example of a portion of a patient's palate surface, showing a region having a channel with a relatively sharp bend. A palatal expander may be formed so that the thickness of the palatal expander over the central palate-spanning region may be smoothed to eliminate the sharp bends in the surface, smoothing the surface, as shown in FIG. 14B. FIG. 14C shows profile views comparing the original palatal surface with smooth surface, and a composite final surface that includes some of the ridges/channels, but smooths them.

In FIG. 17A, the side perspective view of the subject's teeth shows two attachments. These attachments may be generally sectioned, truncated and sectioned cylindrical attachments for retaining the palatal expander to the teeth. Four attachments (two per side) are included in this example. FIG. 17B is a side perspective view of the attachments and teeth, showing the pitch angle of the top surface of the attachment. FIG. 17C is a side view of the tooth and attachment, showing the global angulation angle (the angle of the bottom portion of the attachment and the tooth (or a mid-plane through the tooth). FIG. 17D is an example of a side perspective view, showing the prominence of the attachment (e.g., the distance from the surface of the tooth that the attachment extends). FIG. 17E is another side perspective view, showing the distance from the gingiva to the attachment on the tooth. The dimensions shown in FIGS. 17A-17E are exemplary and approximately only; these distance may be +/−5%, 10%, 15%, 20%, 30%, 40%, 50%, etc.

In FIG. 18A, the scan includes at least 2-3 cm beyond the distal edge of the permanent molars; this distance is missing in the scan of FIG. 18B.

In FIG. 19A, at least 3×3 mm of the lateral wall is scanned; in FIG. 19B, less than 3×3 square regions are digitally scanned.

In FIG. 20A, at least 5 mm of the gingival region below the cementoenamel junction (CEJ) line. FIG. 20B shows a scan that does not include as much of the gingival region, particularly in the posterior region, e.g., around the molars.

FIG. 31B shows a section through line A-A of FIG. 31A.

in FIG. 40, the method uses a single lamination layer.

DETAILED DESCRIPTION

Figure 1A:
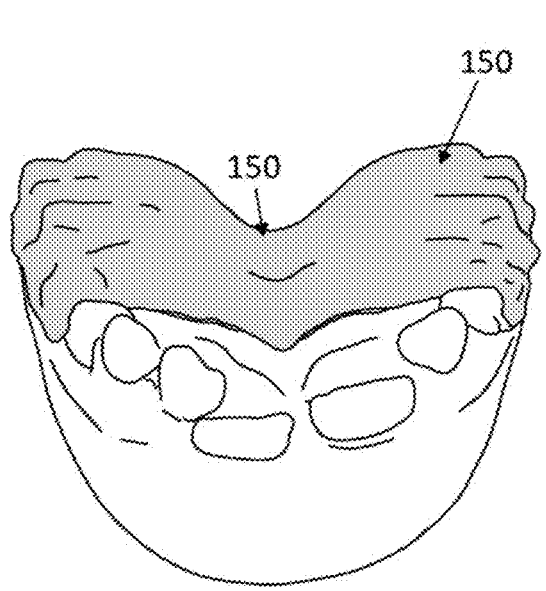
FIGS. 1A-1G illustrate an example of a palatal expander that may be part of a series of palatal expanders used to expand a patient's palate.
Figure 1B:
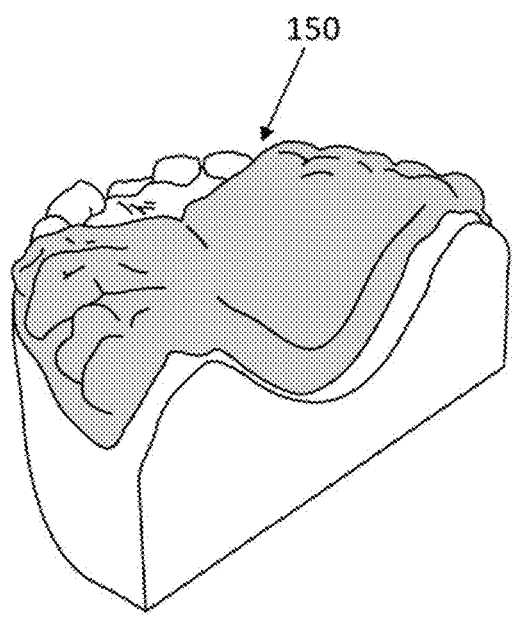
Figure 1C:
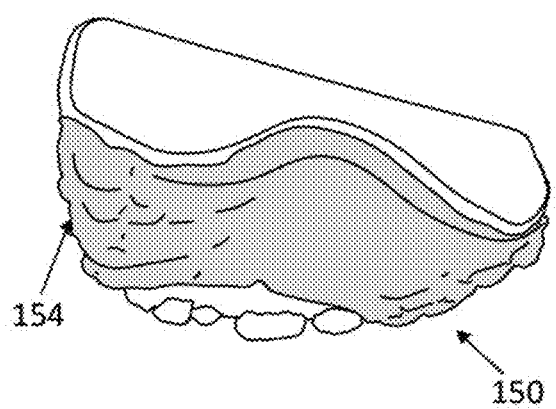
Figure 1D:
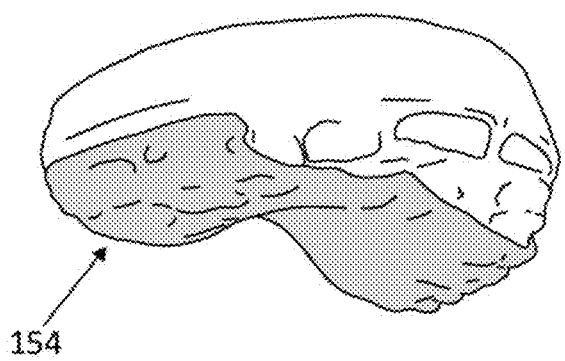
Figure 1E:
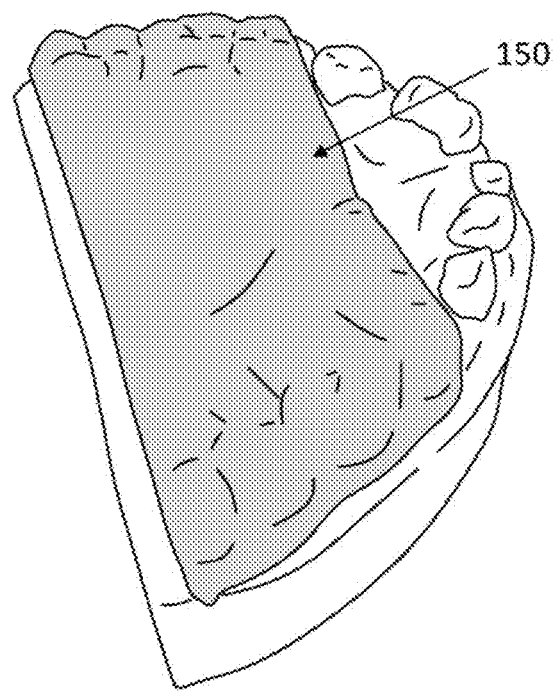
Figure 1F:
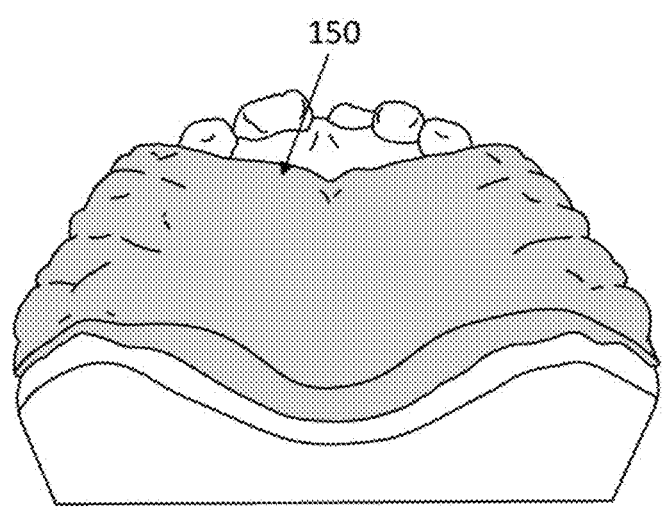
Figure 1G:
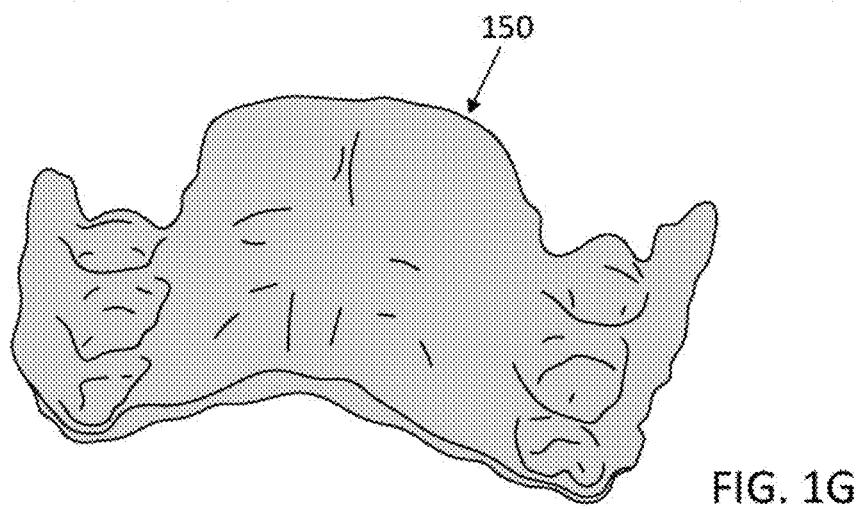

In general, the palatal expansion apparatuses described herein are worn as a series of expanders by a patient. These palatal expanders may be configured to apply force within the patient's mouth to expand the patient's maxilla. The patients may be any appropriate patient, and particularly children from ages 7 to 9 years old, e.g., following eruption of the first permanent molars. These apparatuses may be used to expand the patient's palate between 4 and 12 mm or more. In use, the series of palatal expanders may be applied and/or removed by the patient (or a caregiver, e.g., parent) and may be adapted for securely attaching to the patent's teeth securely, having sufficient strength to move the patient's teeth, while being removable without excessive force or difficulty (e.g., using a finger and/or tool to remove). The apparatus may attach over the patient's last three teeth (e.g., first permanent molar and first and second primary molars). In general, the apparatus should be strong enough to create sufficient force to open the patient's suture, e.g., apply between 8 N and 120 N (or greater than 8 N, greater than 9 N, greater than 10 N, greater than 20 N, greater than 30 N, greater than 40 N, greater than 50 N, greater than 60 N, etc.) against either side of the upper palate and/or lingual side of the teeth.

In any of the apparatuses and methods described herein, the apparatus may be configured so that it may be both securely attached to the patient's teeth, either with or without connecting to attachments bonded to the patient's teeth, while still being readily removable by the patient and/or caregiver. For example, the buccal sides of the apparatus may be flexible, e.g., by being thinner than the occlusal side and palatal region, and/or by including a hinge region that is configured to be pulled away from the teeth and/or attachments on the teeth to disengage the apparatus. In some variations, the apparatus may include slots or slits on either side of the attachment mating regions extending up from the bottom edge of the apparatus. In some variations the apparatus may include a hinge region between the buccal side and the occlusal side (or on the buccal side above the attachment mating region).

Any of the apparatuses described herein may be configured so that the upper, convex surface of the palatal region matches the patient's palate, e.g., including any grooves, ridges, troughs, etc. that are present in the patient's particular anatomy. The upper convex surface may match the patient's palate, but may be configured to be separated or offset from it, e.g., by 0.5 mm or more, particularly at the more central region (e.g., opposite from the palatal midline suture). In some variations the apparatus may be offset from the patient's palate, and force may be applied primarily against the lingual sides of the teeth (e.g., molars); alternatively or additionally, the apparatus may be configured to apply force against the lateral side regions of the palate, above the molars; in this case, the upper convex surface of the palatal region may be configured to have a negative offset, e.g., may push against the palate, when worn.

The bottom, concave, surface of the palatal region may have a different surface profile compared to the upper surface. In particular, apparatuses in which the bottom, concave, surface if smooth compared to the upper surface may be much more comfortable. For example, the bottom, concave surface, which faces the patient's tongue, may lack the grooves, ridges and/or troughs present on the opposite, upper surface. Instead, the bottom, concave, surface may be substantially free from perceptible projections, lumps, or indentations. In some variations, the bottom, concave surface can be considered a filtered version of the top, convex surface that is opposite to the bottom surface; the bottom surface is smoothed (e.g., by a smoothing function) compared to the opposite, top surface, in order to avoid any rapid changes in surface due to, for example, grooves, ridges, etc. Smoothing the bottom surface in this manner may enhance patient comfort while avoiding speech problems.

The palatal expanders described herein may be formed of a single, monolithic material (e.g., by a 3D printing technique, etc.) or they may be formed in parts, e.g., by layering, thermosetting, etc. The apparatuses (e.g., devices, systems, etc.) may have a variable thickness, particularly in the palatal region and/or the tooth-receiving portions. For example, the palatal region may be thinner in more anterior regions (e.g., the anterior half) compared to more posterior regions (e.g., the posterior half). This may allow a more comfortable fit, allowing room for the patient's tongue. Alternatively, the posterior half of the apparatus may be thinner than the anterior half. The posterior portion may be curved inward (e.g., toward the anterior region), or may include a cut-out region in the posterior end.

In particular, described herein are palatal expansion apparatuses and methods of using (applying them, removing them, treating a patient to expand the patient's palate, etc.) and forming them. These apparatuses may be configured to apply either 'slow' expansion (e.g., around 8-10 N of force between the molars on either side of the upper jaw of the mouth), or 'rapid' expansion (e.g., greater than about 60 N for higher speed expansion, including between 70-160 N, etc.). In some variations, the apparatuses may be configured to drive displaced and/or force. For example, any of these apparatuses may be configured to drive displacement of between about 0.25 mm/day (when worn for a 24 hour wear time). These apparatuses (e.g., devices) may form a series of devices that may be used to displace the palate, expanding it and causing transverse force between the molars on either side of the mouth.

Any of these palatal expander apparatuses described herein may include a gap or offset between the upper surface of the mouth (the palatal surface) and the palatal expander. This offset may be, for example, between 0.1 mm and 10 mm (e.g., between 0.2 mm and 9 mm, between 0.3 mm and 9 mm, between 0.5 mm and 8 mm, between 1 mm and 7 mm, between 2 mm and 5 mm, etc., including any region or sub-regions there between). This gap may prevent soft tissue irritation. The gap may extend over 50% of the portion of the apparatuses that are positioned opposite of the patient's palate, when worn by the patient (e.g., over 60%, over 70%, over 80%, over 90%, over 95%, etc.). In some variations, the shape of the palatal portion of the expander (e.g., the portion opposite the patient's palate when worn by the subject) may be contoured on the patient-facing side) to match the contour of the patient's palate (either with or without an offset, as just described).

As will be described in greater detail below, the shape of the apparatus (e.g., the expander), and therefore the load applied by the apparatus when worn, may be controlled and selected during the fabrication process. It may be particularly advantageous to provide a digital planning process in which a digital model of the patients upper jaw (e.g., teeth, palate and gingiva), and in some cases the subject's lower jaw (e.g., teeth and/or gingiva) may be modified to plan the series of expanders that morph between the patient's initial anatomy to an expanded configuration in which the final expanded configuration is described. Previous attempts to digitally design palatal expanders have been hampered by the inability to accurately model the palatal expansion and the teeth movement/position, and therefore have been unable to rigorously model the overall effects on the teeth and palate as well as the resulting forces applied to the various portions of the patient's mouth. These attempts have also ignored the effect on the lower jaw, and in particular the interaction between the lower and upper jaw. Superior results may be achieved by accurate digital modeling of the teeth, gingiva and palate (and in some variations the lower jaw), and by controlling the planned movement (e.g., expansion of the palate, which may be expressed as the separation between the molars) and the forces acting on one or more of the teeth, palate and/or gingiva. In addition, the expander may also be digitally modeled, including modeling both the shape (dimensions, including thickness, curvature, attachment points, etc.) and the material(s) used. Thus, the expander(s) in a series of expanders may be accurately and in some cases automatically, configured so that they achieve the desired palatal expansion within predetermined (or user/physician/technician) adjustable parameters such applied expansion force (e.g., between x and y N, less than y N, etc., where x is about 5, 6, 7, 8, 9, 10. 15, 20, 25, 30, 35, 40, 45, 50, etc. and y is about 10, 20, 30, 40, 50, 60, 70, 80, 90, 100, etc.), the location of applied forces in the patient's mouth (e.g., upper lateral portion of the molars, mid-lateral portion of the molar, lower lateral portion of the molars, gingiva, palate, etc.) and/or portions of the patient's mouth to avoid contact (e.g., gingiva, palate, mid-palate, lateral palate, etc.).

Expander Features

Figure 23:
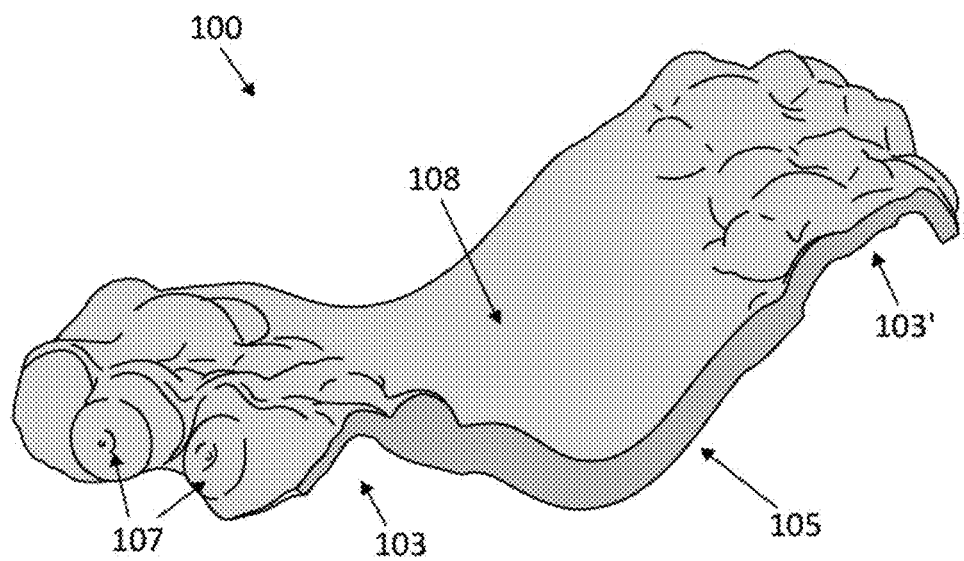
FIG. 23 illustrates one example of a palatal expander including an enclosed attachment that may aid in retention within the oral cavity.

The palatal expanders described herein may include a tooth engagement region for engaging at least a portion of the teeth in the patient's upper jaw, in particular the molars, and a palatal region extending between the tooth engaging region that is configured to be positioned adjacent and opposite from the patient's palate when the device is worn by the patient. For example, FIG. 23 shows an example of a palatal expander 100 that includes a pair of tooth engagement regions 103, 103' on either side of the device, connected by a palatal region 105. In this example, the palatal expander also includes a pair of attachment regions (attachment coupling regions) 107 that may couple with a pair of attachments (e.g., attachment connectors) bonded to the patient's teeth on either side of the device (on a buccal side of the patient's teeth; only one pair is visible). The attachment connectors may also referred to herein as a connectors, pins, attachments, or the like, and may be secured to the teeth in a position that allows it to couple (e.g., removably couple) to the attachment region(s) on the expander. An attachment connector may be bonded (glued, etc.) to the teeth as part of an initial step prior to wearing the series of expanders. In FIG. 23, the bottom, concave surface 108 is shown; the opposite surface is the top, convex surface.

The tooth engagement regions may be formed of the same material(s) as the palatal region, or they may include different materials. The thickness of the tooth engagement regions and the palatal regions may be different or the same. In particular, the palatal region may be thicker than the tooth engagement region. The thickness of the tooth engagement region may be thicker along the lateral (e.g., buccal and/or lingual) sides of the device and thinner (or removed from) across all or a portion of the top of the tooth engagement region. The palatal region may have a non-uniform thickness. For example, the palatal expander may be thicker near the midline of the device. Any of the palatal expanders may include ribs or other supports (e.g., extending transversely between the tooth engagement regions and/or perpendicular to the tooth engagement regions). These ribs may be formed of the same material as the rest of the palatal region (e.g., but be thicker and/or shaped to have a cylindrical cross-sectional profile).

The inner (cavity) portion of the tooth engagement region is typically configured to conform to the outer contour of the patient's teeth, and to rest directly against the teeth and/or a portion of the gingiva (or to avoid the gingiva) to apply force thereto. The upper surface of the palatal region which is positioned adjacent to the palate when worn by the patient may be contoured to match the actual or predicted shape of the patient's palate. As mentioned above, all or a significant portion of the palatal region may be separated or spaced from the patient's palate when worn, which may enhance comfort and minimize disruption of speech.

In some variations, a portion of the palatal region extending between the opposite toot engagement regions on either side of the device (e.g., a portion of the palatal region extending approximately z % of the distance between the tooth engagement regions, where z is greater than about 30%, 40%, 50%, 60%, 70%, 80%, 90%, etc.) may be flat or straight, rather than curved, so that it does not necessarily follow the contour of the patient's mouth. This portion may be one or more transverse ribs, struts or supports, or it may be the flat sheet. Such a flat or straight portion may provide increase force. Alternatively or additionally, the palatal region (e.g., one or more ribs, the sheet, etc.) may be curved in an arc similar to the arc of the patient's palate, but may have a much larger radius of curvature (appearing as a shallower concavity) than the patient's palate.

Any of the palatal expanders described herein may include one or more attachment regions or sites (also referred to herein as attachment opening, attachment couplers, etc.) for coupling to an attachment connector on the patient's teeth. In particular, it may be helpful to use one or more (e.g., a pair) of attachment regions on each side of the device. Furthermore, the attachment sites may preferably be openings through the expander. An open structure (attachment site) on the orthodontic expander may interact with attachments (attachment connectors) located on teeth to improve the overall retention of the appliance and in some cases may be used to generate advantageous force features for teeth alignment, including limiting or preventing rolling of the teeth buccally as the palate is expanded. Such features may be helpful, in particular, when included as part of a directly fabricated (e.g., 3D printed) device for rapid (e.g., phase 1) palatal expansion. Described in FIGS. 23-31 are examples of attachments (e.g., attachment connectors/attachment sites) that may be used as part of any expander. Further, although the attachment connector is typically bonded to one or more teeth and projects into a complimentary opening or cavity on the expander, this configuration may be revered in some or all of these; for example, the protruding attachment connector may be part of the expander which may insert into an opening/cavity bonded to the user's teeth.

Any appropriate attachment region may be used, and in particular any appropriate size and/or shape may be used. As mentioned, the attachment region may preferably be an open structure on the appliance which may improve retention of the appliance over the attachments and possibly include force features for teeth alignment. For example the attachment region may comprise a round, oval, square, rectangular, triangular, etc. opening through the expander (e.g., at a lateral, e.g., buccal, side of the tooth regaining region of the expander. The attachment region may be keyed relative to the attachment connector; in general the attachment connector may be configured to mate with the attachment region in one or a particular orientation.

An open attachment region may reduce non-compliance of the appliance to poorly cured attachments. The open structures may enable complete coverage over a pre-determined attachment shape and size. Any of these attachment region/attachment connector couplings may incorporate biomechanical force features with this appliance/attachment interaction, including, as described above, keyed regions that transmit rotational force in the plane of the opening (e.g., against the surface of the tooth), for example. In some variations the attachment connector may snap or couple into the attachment region in a manner that requires a force to disengage the coupling.

Figure 24:
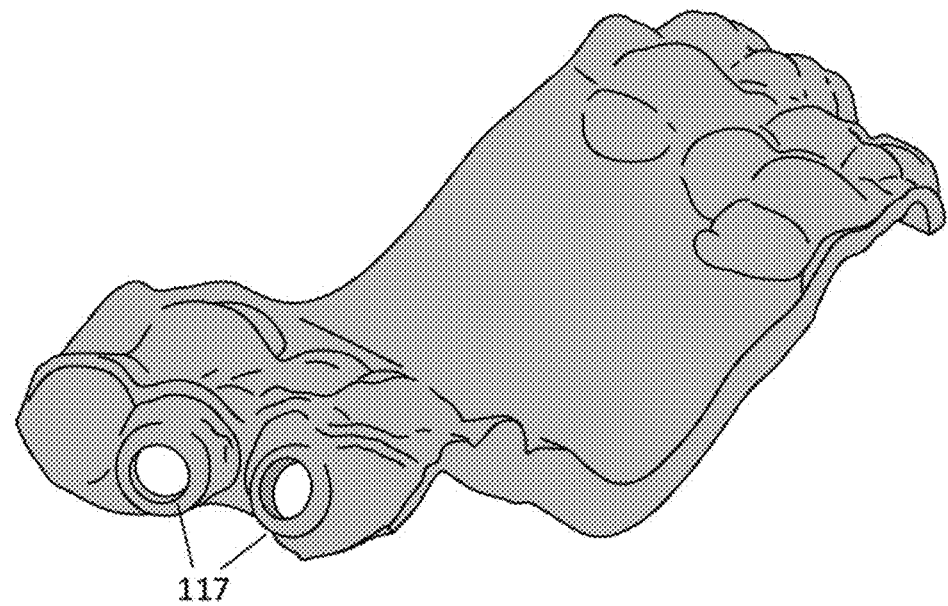
FIG. 24 is an example of a palatal expander having open attachments for retention and application of force.

As shown in FIG. 23, a conventional appliance design may enclose the attachment that helps maintain retention in the oral cavity. Alternatively, the variability in the size of these attachment regions due to appliance fabrication (e.g., thermoforming, direct fabrication, etc.) may be reduced by creating an open structure, as shown in FIG. 24. In FIG. 24, the separator is otherwise quite similar to what is shown in FIG. 23, but includes two open attachment regions 117.

Figure 25:
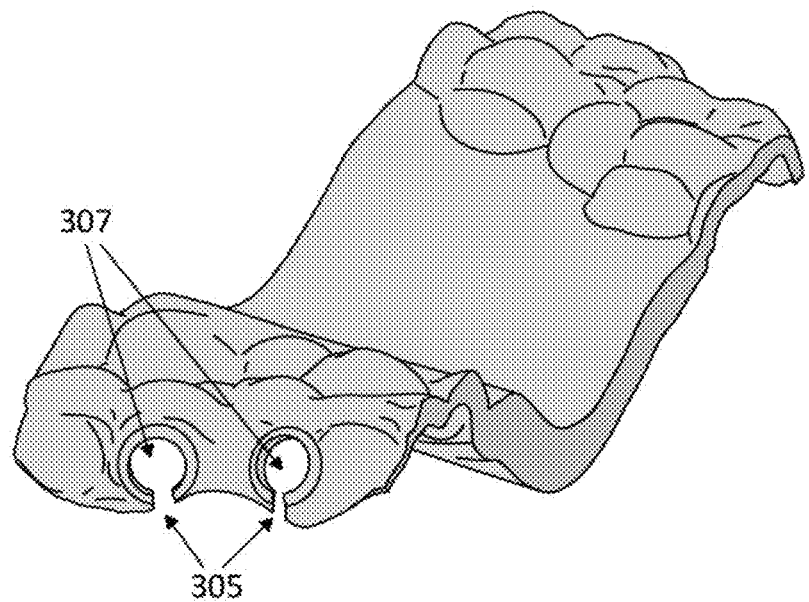
FIG. 25 shows an example of a palatal expander including open attachments and cut-out regions (shown here as slits into the open attachments).

In any of the apparatuses described herein, the device may also include one more cut-out regions in which the cut-out region (e.g., slot, slit, etc.) opens to a side or edge of the apparatus. A cut-out feature such as this may increase the flexibility of the adjacent region, such as the buccal surface. When connected to or adjacent to the attachment region opening, as shown in FIG. 25, this configuration may increase or decrease the retention to the attachment. In FIG. 25 cut-out region (slits 305) have been added to the open structures 307 to increase the flexibility of the appliance over the attachments.

Figure 26:
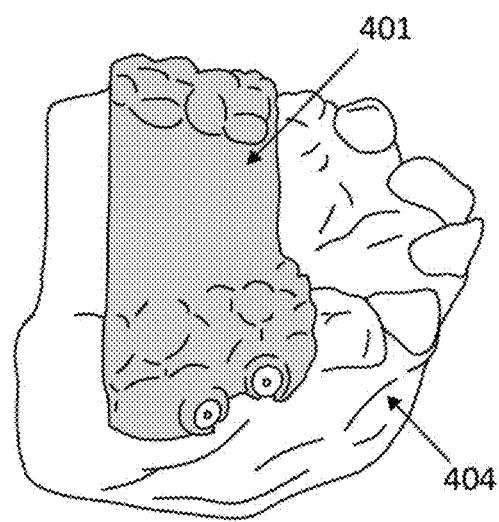
FIG. 26 is another example of an apparatus including slits connected to the open attachments in the expander, shown coupled to attachments (pins) on a mode of a patient's teeth.

FIG. 26 illustrates another example of a cut-out region (slit) between an opening (attachment region) adapted to couple with an attachment connector. In this example the attachment connector and coupling region are connected to secure the expander 401 to a (model of) patient's teeth 404.

Figure 27:
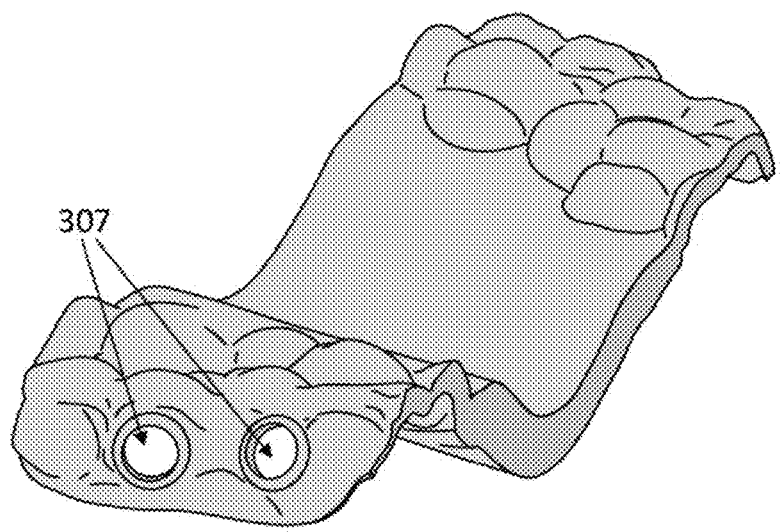
FIG. 27 is an example of an expander having open attachments that are positioned further from the edge of the apparatus (e.g., either by moving the bottom edge, or cut-line, closer to the gingiva or by moving the openings further up the teeth).

Another example of an expander with attachment regions comprising opening through the expander on the buccal side is shown in FIG. 27. The attachment regions may be formed at any location of the expander, including in particular the buccal side of the tooth engaging region. In FIG. 27, the openings are arranged up from the edge region of the buccal side of the tooth engagement region, so that the "cut-line" (when forming as a direct fabrication piece) above or at the gingival edge has been lowered to increase the mechanical strength around the open holes 307 to increase retention.

Figure 6:
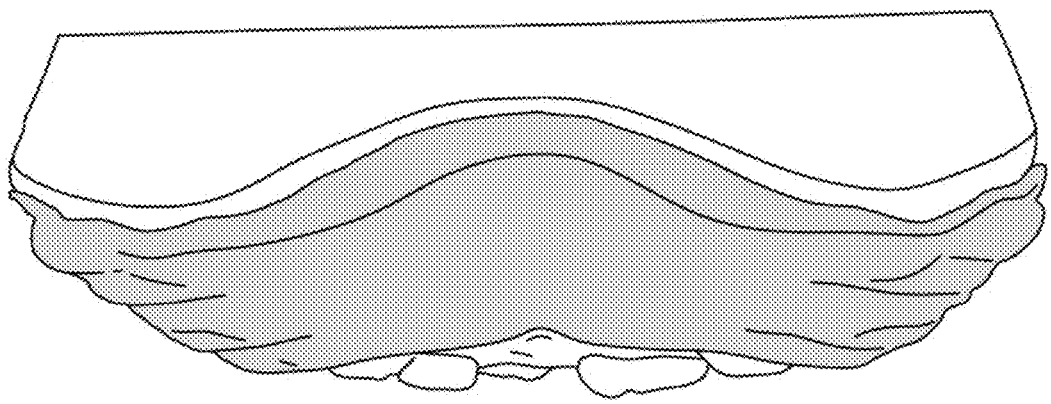
FIG. 6 is an example of a holder (e.g., a passive expander or retainer).
Figure 28:
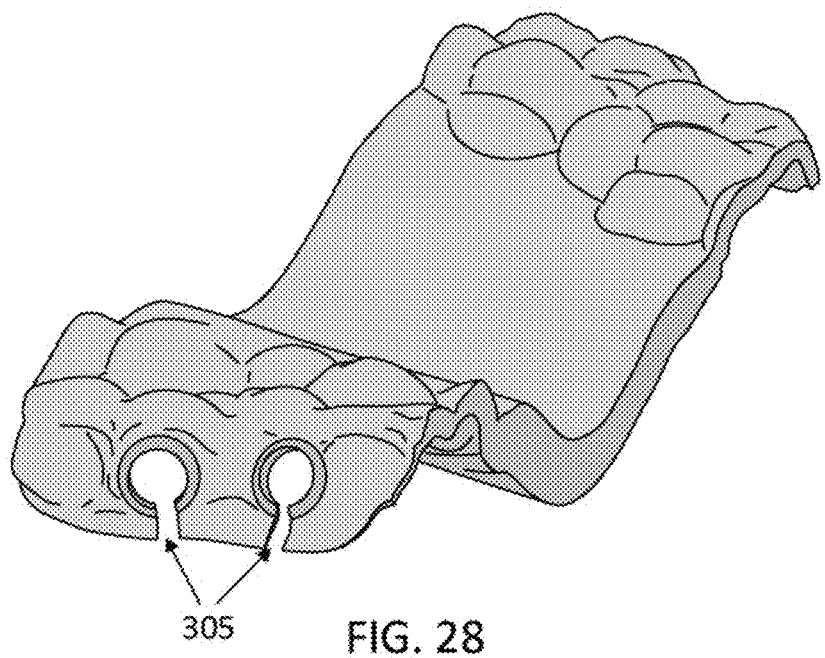
FIG. 28 shows an example of the apparatus of FIG. 5 including cut-out regions that may enhance flexibility and/or ease of application.
Figure 29:
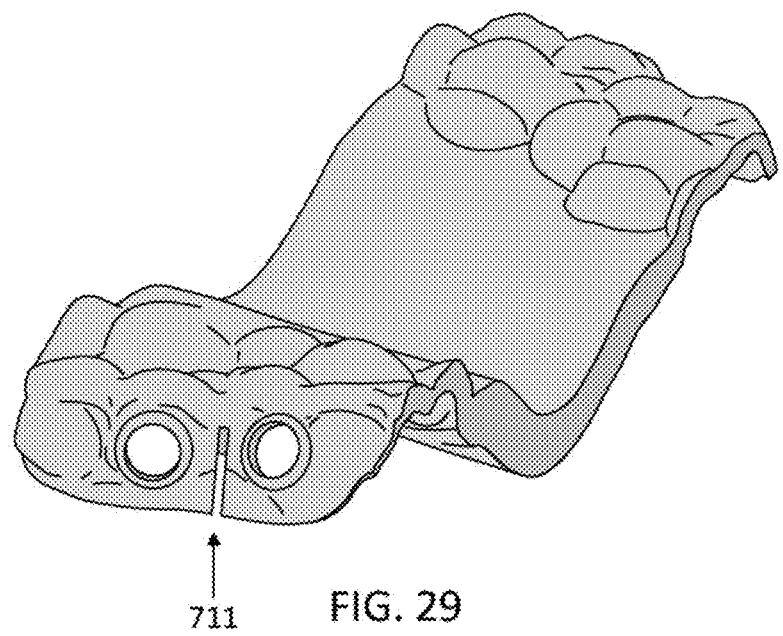
FIG. 29 is an example of an expander including a cut-out region (shown here as a slit) that is not connected to an opening.

FIG. 28 shows the example of FIG. 27 with the addition of slits 305 to increase flexibility of the device at the edges (but not the palatal region) which may make it easier and faster to put on and/or remove. In FIG. 29, a slit between the open holes are added to created another dimension of flexibility that is different from that shown in FIG. 28. In FIG. 29 the slit is located between the two open attachment regions 30; alternative 1 or additionally slits (which typically run perpendicular to the edge of the device) may be located on one or both sides of the opening and/or into the openings, as shown in FIG. 6.

Figure 30A:
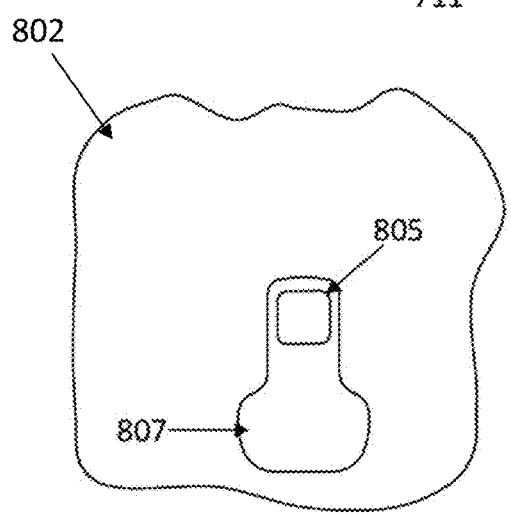
FIGS. 30A-30H illustrate a variety of examples of openings and cut-out regions and attachments between an expander and a patient's teeth or an attachment on a patient's teeth (e.g., connections between the patient's teeth and an expander appliance), including openings having different sizes and/or shapes.
Figure 30B:
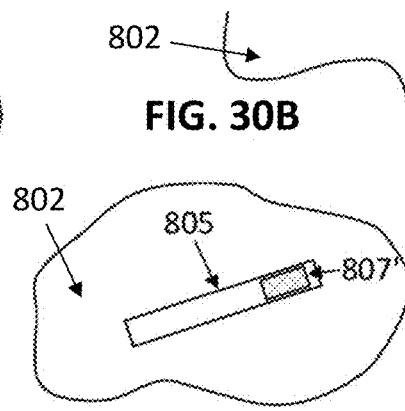
Figure 30C:
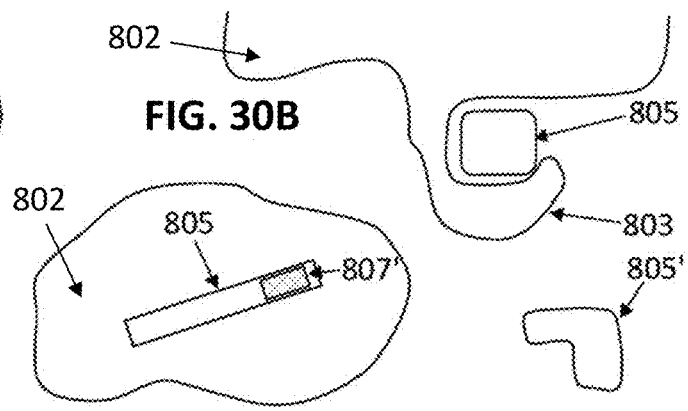
Figure 30D:
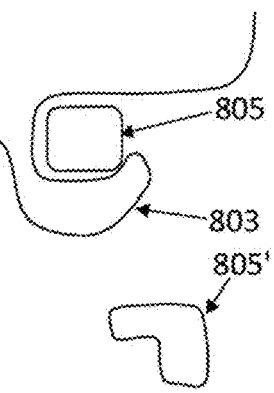
Figure 30E:
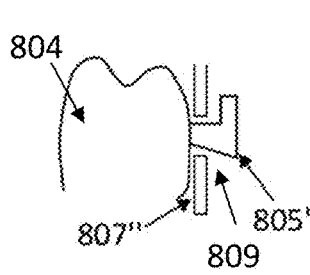
Figure 30F:
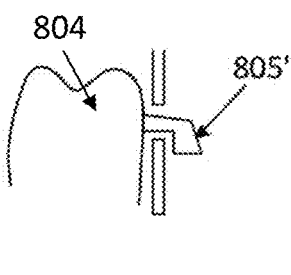
Figure 30G:
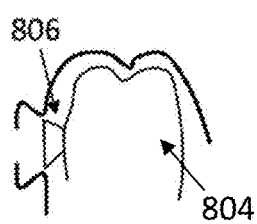
Figure 30H:
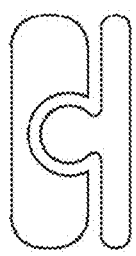
Figure 30I:
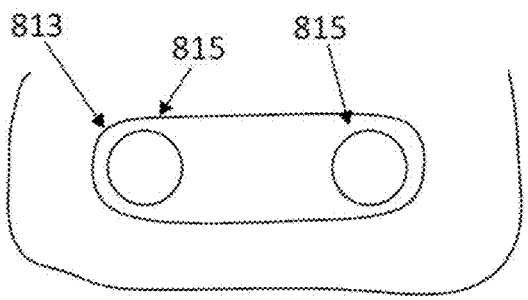
FIGS. 30I-30N illustrates further examples of openings, cut-out regions and attachments on a patient's teeth (e.g., connections between the patient's teeth and an expander appliance).
Figure 30J:
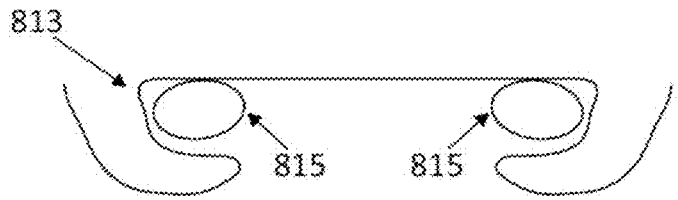
Figure 30K:
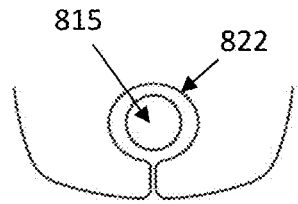
Figure 30L:
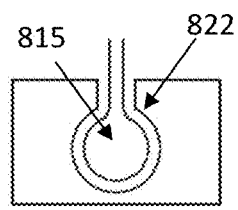
Figure 30M:
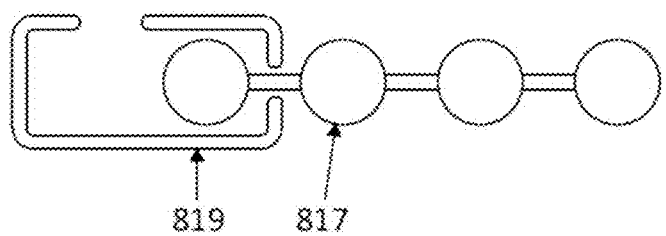
Figure 30N:
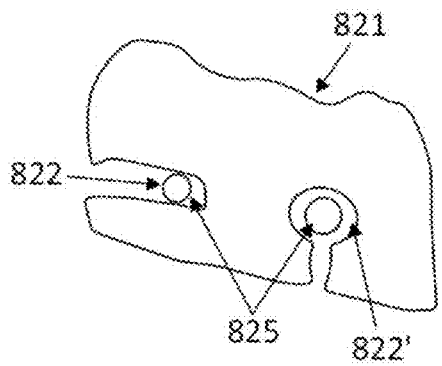

FIGS. 30A to 30N illustrate a variety of examples (unordered) of attachment sites. In some variations the attachment site is configured as a hook 803 (see FIG. 30B) attaching around an attachment connector 805 (e.g. post, protrusion, etc. connected to the tooth 804). Alternatively the attachment site may be a channel 807' (FIG. 30C) or a keyed region 807 (FIG. 30A) in the palatal expander body 802 (e.g., the buccal side of the palatal expander) for engaging the attachment connector 805. Alternatively or additionally, the attachment site 809 on the palatal expander may be configured to snap onto the attachment connector 806 (e.g., FIGS. 30E-30H), which may be tapered as it approaches the tooth surface. Any of the attachment connectors/attachment sites shown maybe configured so that multiple attachment connectors 815 couple with one attachment site 813. In some examples, the attachment site and/or attachment connector may be configured to allow adjustment/readjustment of to tighten/loosen the connection. For example, a plurality of attachment connectors 817 (e.g., FIG. 30M) may connected together in a manner that allows the user or patient to select which of the plurality of attachment connectors engage with the attachment site (or sites) 819. Alternatively or additionally the device 821 may include a plurality of attachment sites 822, 822' (e.g., FIG. 30N) that are oriented with slots/slits in different directions so that the two or more attachment connectors 825 can be inserted and allow a torquing or other directional forces (rotational, etc.) to be applied by the device against the teeth. As shown in FIGS. 30A to 30N, extended open hole structures 813, 807 may be present between attachment connectors, and/or the coupling sites may be configured as dual and single hook 803 systems. In coupling attachments in which the coupling region includes a hole and slit may be modified so that the slit is tapered to increase retention. Examples of key and lock systems in different geometries are also shown. As mentioned, the attachment region may be alternatively positioned on the tooth and the attachment connector may be on the appliance (device). Any of these designs may be used to control moments and forces for teeth movement.

Figure 31A:
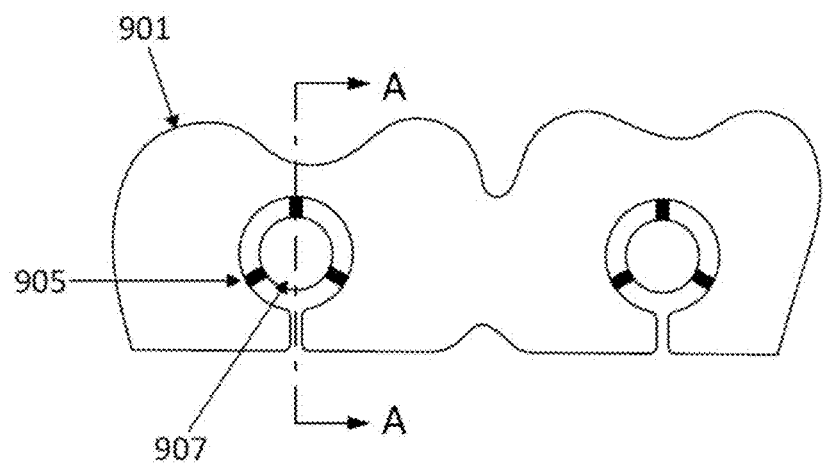
FIGS. 31A and 31B illustrate a portion of a palatal expander including a plurality of openings to connect to attachments on the patient's teeth; in this example the openings of the expander initially include the attachment to be bonded to the patient's teeth, which are connected by one or more tabs that can be disconnected, broken, or removed to leave the tab behind on the patient's tooth. This may be useful for properly attaching the connector attachment to the patient's tooth.
Figure 31B:
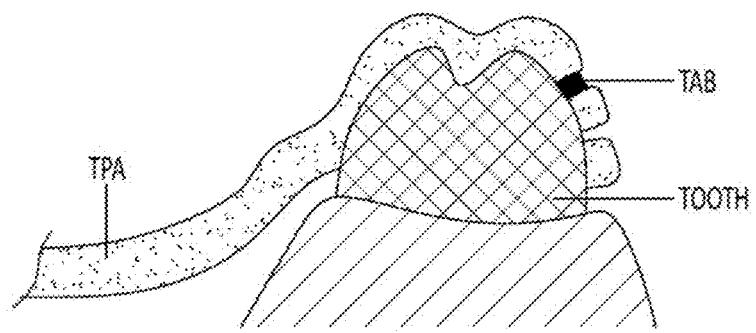
Figure 32:
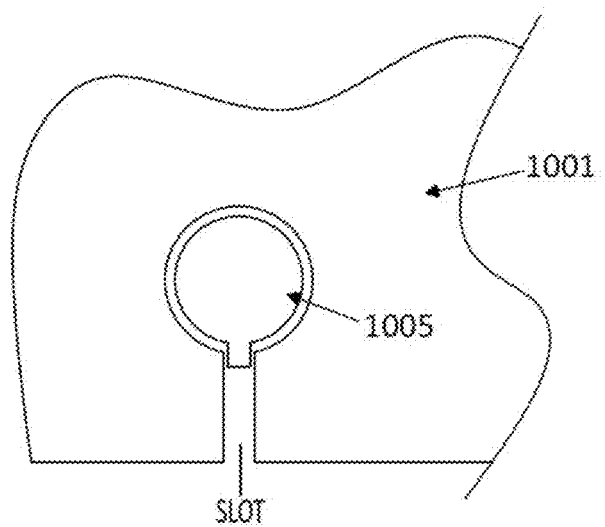
FIG. 32 is another example of an expander including an attachment that can be included as part of the expander (shown here as a separate element held within the opening of the palatal expander) for application to the teeth as a guide or template.

In variations in which the attachment connector (e.g. post) is bonded to the patient's tooth, the connector may be attached using an exemplary expander (the expander maybe provided as a "zero" expander in the sequence, in which the palate is not yet being expanded). This expander may act as a template to position the attachment connectors on the teeth, as illustrated in FIGS. 31 and 32. In FIG. 31, the attachment connector(s) are included together with the palatal expander 901 which may be used as the placement vehicle (template). The attachment connector 907 may be printed with the expander (including the attachment region), such that one or more tabs 905 (e.g., removable, frangible, severable, etc. tabs) extend from the attachment region having an opening (hole) feature in the palatal expander 901 to an attachment connector. The tab in this example is a small tabs or sliver of material. The tabs will be cut/removed after bonding the attachment connector 707 to the teeth. The tabs be made of a dissimilar material than the palatal expander (or of the same material) and/or the attachment connector 907 may be made of the same or a different material as the expander and/or the tabs. The attachment connector may be designed with a custom buccal surface contour to make the buccal fit more precise.

FIG. 32 illustrates another example of an apparatus including an attachment region that is an opening or hole feature in the palatal expander 1001; this example may also act as a bond template for a preformed attachment connector 1005, which in this example is not attached to the expander/template with tabs. In this example, the attachment connector(s) may be fabricated separately (out of another material and/or process, or out of the same material and/or process) but the expander may include a customized connector region (hole feature) that includes a positioning feature to orient the attachment connector 1005 so that the patient's buccal surface contour lines up. The attachment connector may be designed so that the buccal surface contour and positioning feature align for accurate placement.

Once the series of palatal expanders is designed, including digitally (or in some variations, manually), the individual devices forming the series may be fabricated. Described herein are a variety of fabrication methods that may be used. Any of these fabrication methods may be combined or modified in view of the other fabrication methods or parts of these fabrication methods. Different expanders in a patient series may be fabricated by the same method or by different methods.

Figure 4A:
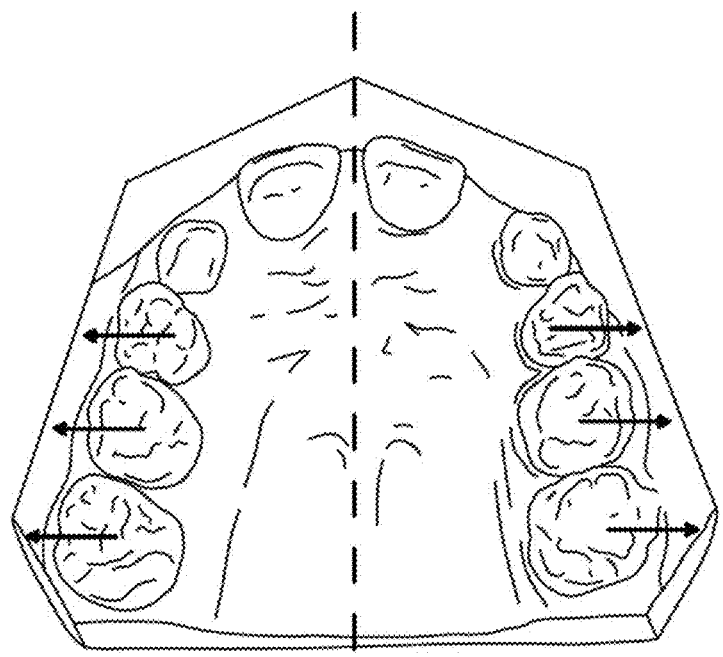
FIG. 4A shows translational forces that may be applied to a patient's palate (arrows) to expand the palate, braking and separating the palatal midline suture (e.g., median palatine suture, etc.).

FIGS. 1A-1G illustrate an example of a palatal expander 150, shown from different perspectives. These or similar palatal expanders may include any of the features described herein, separately or collectively. In this example, the palatal expander is configured as a removable, e.g., patient-removable (with or without the use of a removing tool) that may be formed of any appropriate material, including, e.g., a biocompatible nylon material. The examples shown in FIGS. 1A-1G were 3D printed. A series of palatal expanders may be used and incrementally staged to expand a patient's palate. In particular, the methods and apparatuses described herein may be configured for treatment of children and young adults. The palatal expanders may be configured so that the transpalatal arch region 152 balances the load deflection for patient comfort. For example, transverse forces may be distributed across three posterior teeth on each side, as shown in FIG. 4A, and or on a lateral side of the palate. The occlusal surface 154 thickness may be optimized for structural integrity and patient comfort. The palatal expander apparatus may include a plurality of attachments (not visible in FIGS. 1A-1D). The attachments may be configured to allow easy appliance insertion and retention. As will be described in greater detail herein, the palatal expanders may also include one or more removal features to allow the patient to remove the apparatus once attached.

As mentioned above in the additional detail below, the forces applied by the apparatus to expand a patient's palate may be applied to the teeth (e.g., the lingual side of the D, E or 6 teeth, as in FIG. 16A) and/or the palate, and particularly the lateral side of the palate, above gingival line but below the midline, either uniformly along the anterior-to-posterior direction (typically symmetrically on either side of the midline) or at different regions along the anterior-to-posterior direction.

In any of the palatal expanders described herein, openings or holes formed through the palatal expander may be included. For example, in some variations the region of the palatal expander otherwise covering the occlusive surface of the patient's teeth may be removed. For example, allowing a more natural bite. In some variations, the anterior (front region) of the palatal region extending between the opposite sides of the upper arch (e.g., the opposite tooth-receiving portions of the apparatus) may be removed or curved inward, so as to avoid interfering with speech. Alternatively or additionally, the poster (e.g., back) end of the palatal expander may be removed or curved in, anteriorly, to minimize or reduce invoking a gag reflex. In any of these variations the thicknesses may also be adjusted in addition or alternatively. For example, the thickness in the posterior region (e.g., the back 10%, 20% 30%, etc.) of the palatal expander may be thinner than the more anterior regions.

Figure 2A:
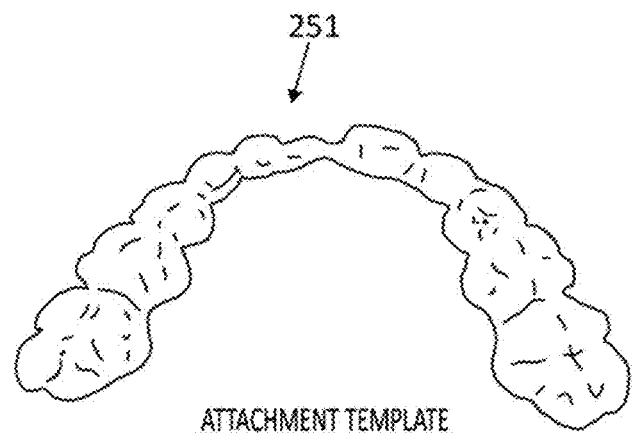
FIGS. 2A-2C illustrate a system for expanding a patient's palate, including an attachment template (shown in a perspective view in FIG. 2A), series of progressive palatal expanders (shown in FIG. 2B) and a passive holder (e.g., retainer shown in FIG. 2C).
Figure 2B:
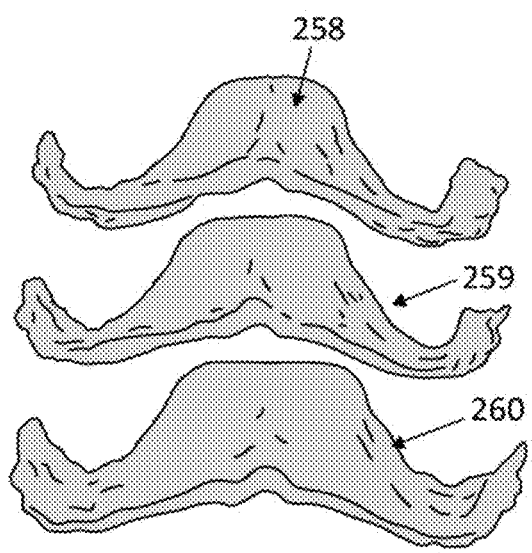
Figure 2C:
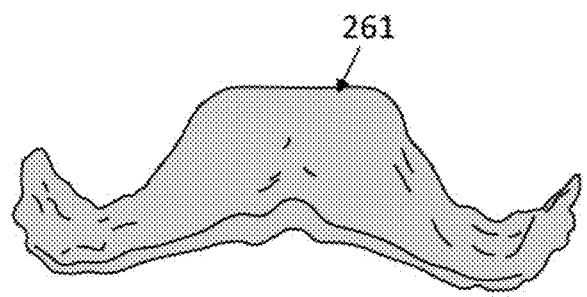

The apparatuses described herein may be configured as a system including attachments and an attachment template for positioning the attachments on the teeth, a series of palatal expanders that progressive expand the patient's palate, and a passive holder (e.g., retainer) to be worn after the series has widened the palate. For example, FIG. 2A-2C illustrate these components of such a system. FIG. 2A shows an example of an attachment template 251; a plurality of attachments (not shown in FIG. 2A) may be attached to the patient's teeth at predetermined locations that may correspond to the locations of receiving sites on each of palatal expanders. FIG. 2B shows an example of a series of palatal expanders that get progressively broader. For example, the upper palatal expander 258 is narrower than the intermediate palatal expander 259 and a final palatal expander 260. FIG. 2C illustrate and example of a passive holder (e.g., retainer) 261 that may be worn after the series has completed expanding the patient's palate. In this example, the palatal expander retainer 261 is similar or identical to the last of the palatal expanders in the sequence, although it may have a different configuration.

Any of the examples described herein may be configured to include, for example: a detachment region (e.g., removal tab, slot, etc.), for example at the gingival edge gap and/or an extension to assist with appliance removal, a palatal expander identification marking (e.g., an expander identification number), etc.

Figure 5A:
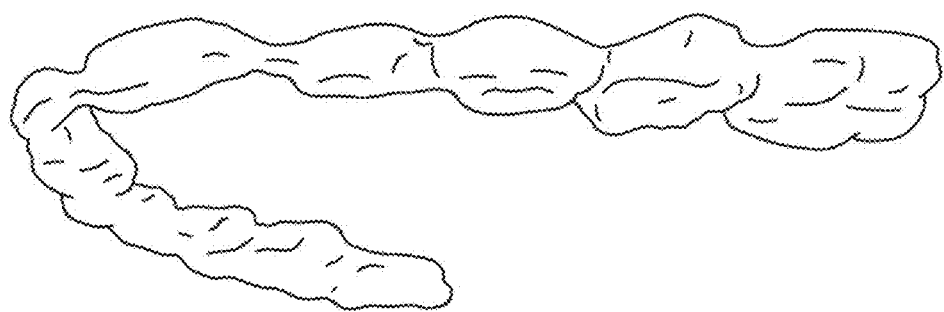
FIG. 5A is an example of a template for applying attachments (shown attached to the teeth in FIG. 5B) to the appropriate region of the teeth to mate with the palatal expanders so that the palatal expander will remain in the correct position on the teeth.
Figure 5B:
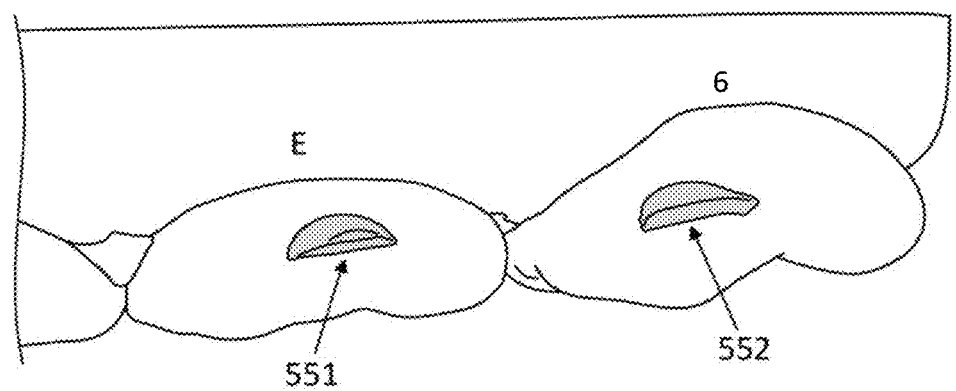
FIG. 5B shows two attachments attached to the patient's teeth in predetermined positons; in this example, four attachments may be used to secure each palatal expander to the teeth during treatment.

FIGS. 5A-5B illustrate an enlarged view of the attachment template and attachments. In this example, the attachments may be placed on the patient's teeth, for example, FIG. 5B shows two attachments 551, 552, one on the E's (center of crown) molar and another on the 6's (Mesial Cusp) molar region. The template may fit over the patient's teeth, and the attachments (which may be preloaded into the template and/or applied through the template, may be bonded to the teeth. In this example, four attachments are used.

Figure 4B:
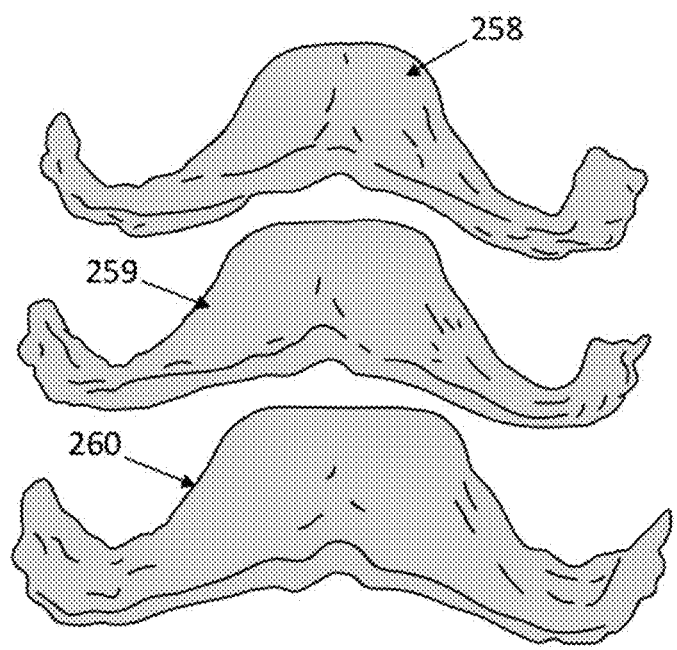
FIG. 4B illustrates a series of palatal expanders that are configured to progressively expand the suture (e.g., the expanders shown in FIG. 4B may be examples taken from an entire sequence, e.g., of 8 or more expanders, and do not necessarily represent three immediately sequential expanders).

In the exemplary active palatal expanders illustrated in FIGS. 2B and 4B, the expanders are configured for daily wear (e.g., 23-24 hours of wear). In these examples, the palatal expanders may be configured to provide a predetermined amount of total arch width activation per stage (e.g., approximately 0.15 mm, 0.20 mm, 0.25 mm, etc.) similar to screw activation expanders.

The holder or retainer (e.g., FIG. 2C and FIG. 6) may be provided to the patient to be worn after completing the sequence. For example, a pair of similar holders may be provided (one to be worn, and another that is a spare). The holder may be marked as descried herein to indicate that it is the retainer. For example either or both the palatal expanders and the holder(s) may be marked with an alphanumeric code, such as a nine-digit number key, that may uniquely identify the device. For example, a nine digit expander number key may be "981WWXYZZ", where WW is a numeric 01 to 99 corresponding to a patient number, X is A to Z (corresponding to a revision), Y is E or H (expanding device or holding device), and ZZ is a number between 01 to 99 corresponding to a stage of treatment.

As described above, FIGS. 2C and 6 illustrate example of holders, e.g., passive palatal expanders. In general, each of the palatal expanders in a series maybe worn for up to two weeks; similarly a holder may be worn for up to two weeks holding device. During treatment, a dental professional (e.g., doctor) may order the default or request any stage in the treatment as the holding device. If the expansion goal is not achieved, the physician may request further expansion with a new scan, as described below.

Figure 3:
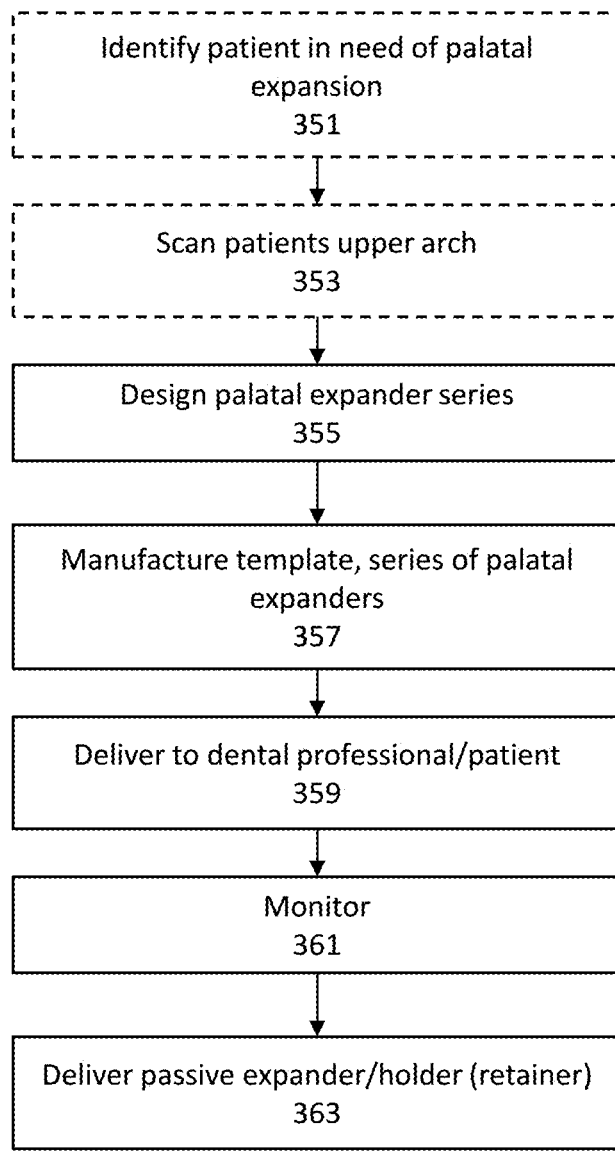
FIG. 3 illustrates a method of treating a patient to expand the patient's palate using the palatal expanders described herein.

FIG. 3 illustrates an exemplary method for treating a patient to expand the patient's palate. The first step illustrated may include identifying a patient in need of palatal expansion 351. The patient may be a child, teenager, young adult or adult. Once the patient is identified, the dental arch, including the palate, teeth, and at least a portion of the gingiva may optionally be digitally scanned 353. Alternatively, the upper dental arch may be modeled manually (e.g., using a dental impression). When scanning is used, any appropriate scanner may be used, including, but not limited to an intraoral scanner that can directly scan the teeth, gingiva and palate. Described below in reference to FIG. 18A-20C are guidelines for scanning the patient's upper arch so that the sequence of palatal expanders maybe formed, including the template for placing attachments.

Once the upper arch has been modeled (e.g., scanned, manually modeled, etc.), the palatal expanders may be designed 355. Typically, these designs may be configured to include any of the features described herein. The design process may include planning the final position of the teeth and/or palate, and designing intermediate palatal expanders to achieve the final configuration. The design process may include providing the location of the attachments on the teeth in order to provide both secure attachment as well as to move the teeth, and/or prevent substantial tipping of the teeth during expansion. The design process may be digitally performed using the digital model of the patient's upper arch. The design process may be automated or semi-automated.

Once designed, the series of palatal expanders may be fabricated 357, and the template may be manufactured at the same time. Any appropriate fabrication technique may be used. For example, the method may include 3D printing, and/or lamination. Examples of these methods are provided below. The manufactured palatal expanders may then be sent 359 to the patient and/or to the dental professional who may instruct the patient in applying and removing the palatal expanders. The treatment may then be optionally monitored 361 to track the palatal expansion, including taking periodic (e.g., daily, weekly, bi-weekly, etc.) scans of all or a portion of the upper arch (palate, teeth, gingiva, etc.). The treatment may be adjusted to increase or decrease the rate of expansion, e.g., by redesigning the series of palatal expander and/or refabricating the palatal expanders. Once the sequence of palatal expanders has been worn, the patient may then wear the holder (e.g., retainer) to prevent relapse of the palate; the holder may be worn until the palatal suture has healed. The holder may be provided to the patient with the series of palatal expanders, or it may be (optionally) sent during the treatment or immediately after treatment 363.

Figure 7A:
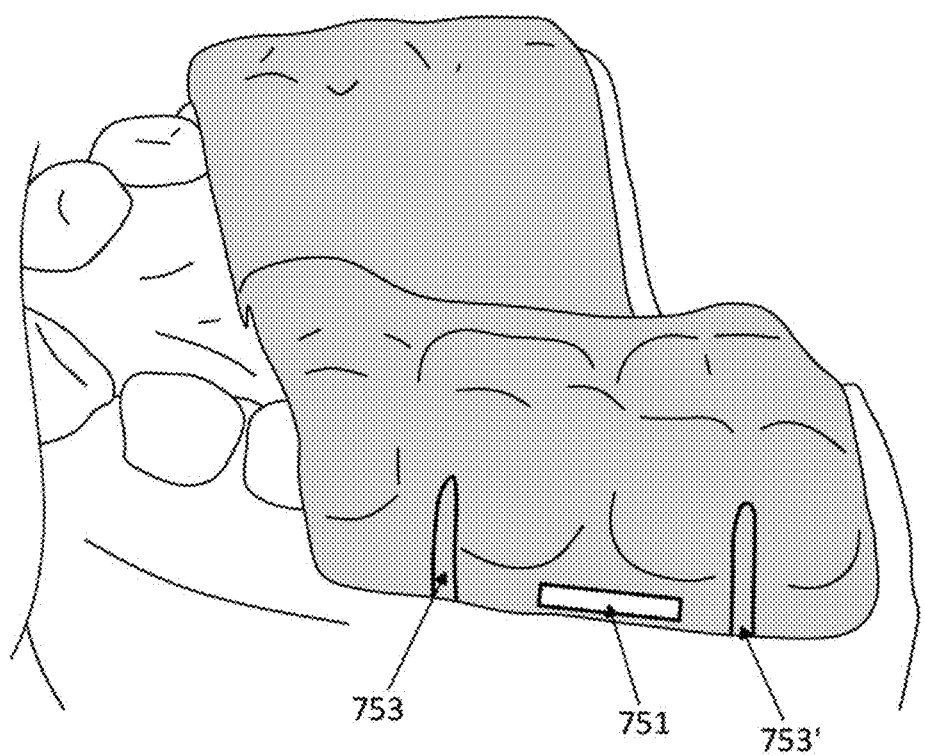
FIG. 7A is an example of a palatal expander including a detachment region (e.g., a removal grip or tab) and two or more lateral hinge region(s) (e.g., slot, cut-out, slit, flex region, etc.) extending from the lateral edge (e.g., the edge of the buccal side) towards the occlusal surface, which may be used to help remove the apparatus from the subject's mouth.

As mentioned above, any of these methods and apparatuses may include palatal expanders with one or more removal/release features. FIGS. 7A-8C illustrate examples of various removal/release features that permit a patient to manually detach and disengage the palatal expander from the teeth once it has been applied. In FIG. 7A, the palatal expander includes both a detachment region (configured as a removal tab 751). The detachment region in this example is a tab or protrusion extending along or near the bottom (e.g., bottom side) of the lateral (buccal) outer side of the palatal expander. The detachment region 751 may include a slot or opening into which the patient's fingernail may be inserted, to allow the buccal side of the palatal expander to be separated and pulled away from the teeth, so that any attachment(s) on the palatal expander may be disengaged. The device may then be pulled down off of the teeth.

In FIG. 7A, the design also includes a pair (though one or more may be used) of slits, slots, cut-out regions, etc. 753, 753' extending from the bottom edge of the buccal side up towards the occlusal surface. These slots, slits, etc. may provide a region for separating the palatal expander, and particularly the attachment(s) from the teeth to remove it. The one or more slit(s) on an outside of the attachment cavities of the device may allow a lifting out step to begin the disengagement process (e.g., a smaller edge length with a gap, as described below, may minimize food trapped and may eliminate the need for gingiva elongation).

As descried above, the design (size, shape, prominence and location) of the attachments on the teeth and/or the apparatus may be configured to assist with insertion and still be highly retentive. Similarly, the detachment (release) features may be configured to allow retention until release is manually triggered by the patient.

In general, any of these apparatuses may include a hinge region, particularly before the occlusal surface that allows bending in order to disengage the apparatus from the teeth. For example, a hinge design with a finger access may be included to allow disengaging the device from the retention attachment for easier removal.

In some variations, the release mechanism may include a lock or other region that may require activation (e.g., by deforming, squeezing, etc.) before it can be released. For example, the palatal expander may be squeezed or deformed (e.g., by biting down on the palatal expander first) before pulling at a release on the palatal expander (e.g., using a fingernail) to release the aligner when also releasing the biting down onto the palatal expander. Thus, another part of the device may be modified or deformed begin disengaging the device from the retention attachment.

Figure 7B:
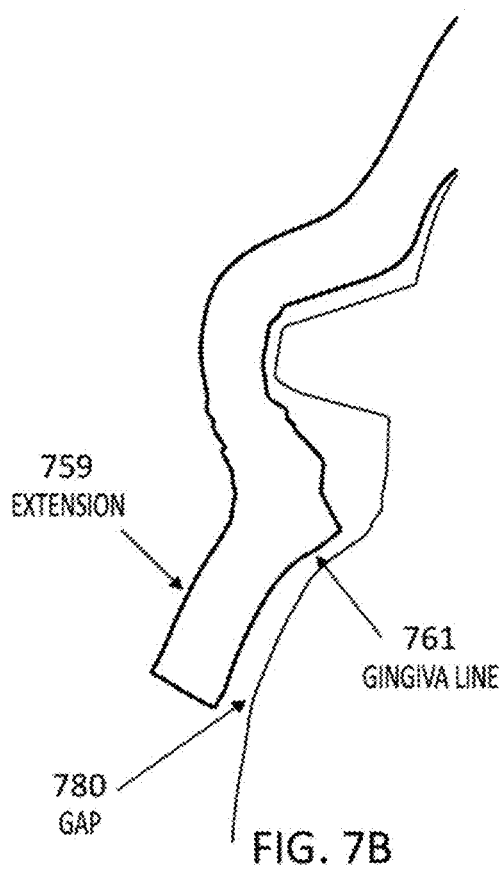
FIG. 7B shows a section through a portion of a palatal expander that is configured to include a detachment region in which the outer (e.g., buccal) edge of the palatal expander is formed with a gap separating it from the teeth and/or gingiva sized and configured so that the patient's fingernail and/or a removal device may be inserted to pull the apparatus off of the teeth, including off of the attachment on the teeth.

Any of the apparatuses described herein may include a release (e.g., detachment region) that is formed at least in part by a lip or ledge forming a finger gap that can be manipulated by a patient's finger (e.g., fingernail). In some variation the gap may be formed as an outwardly extending buccal edge of the apparatus, as shown in the sectional view of FIG. 7B. In FIG. 7B, as well as in FIGS. 13A-13C, a gap or separation between the palatal expander and the gingiva along all or a portion of the bottom of the palatal expander may be sized to permit the patient's finger/fingernail to engage and pull the palatal expander away from the palate. The palatal expander may include an extension 759 at the bottom edge of the buccal side of the palatal expander. The extension may be specifically designed to leave a gap between the palatal expander and the gingiva, e.g., up to the gingival line 761. The extension of the buccal section below the gingival line by the extension, as well as the separation between the gingiva and the palatal expander may provide for better removal. See, e.g., FIGS. 13A-13B.

Figure 8A:
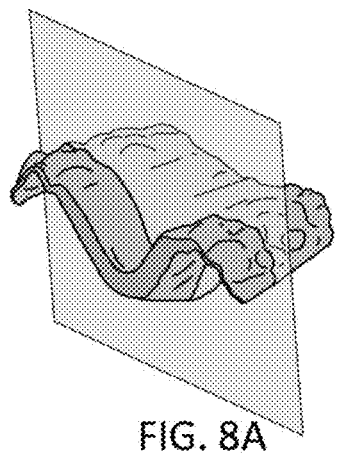
FIG. 8A shows an example of a palatal expander sectioned through an xy (sagittal) plane, showing (in FIG. 8B) regions of different thicknesses.
Figure 8B:
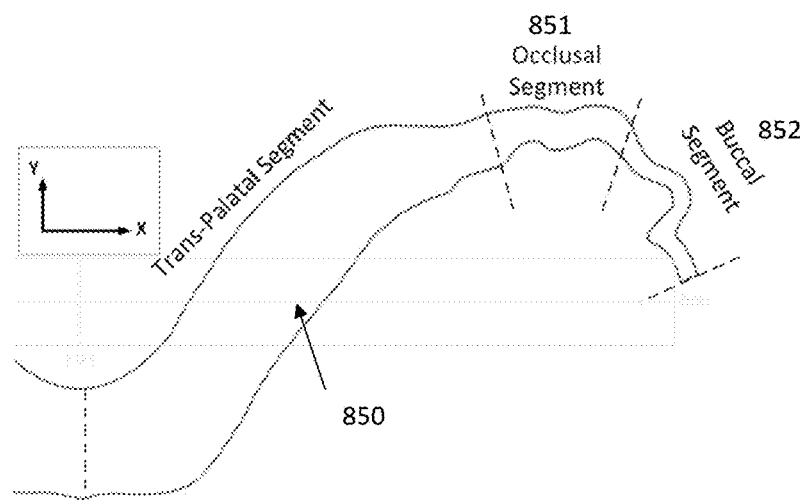
FIGS. 8B and 8C show the thicknesses of the trans-palatal segment, the occlusal segment and the buccal segment.
Figure 8C:
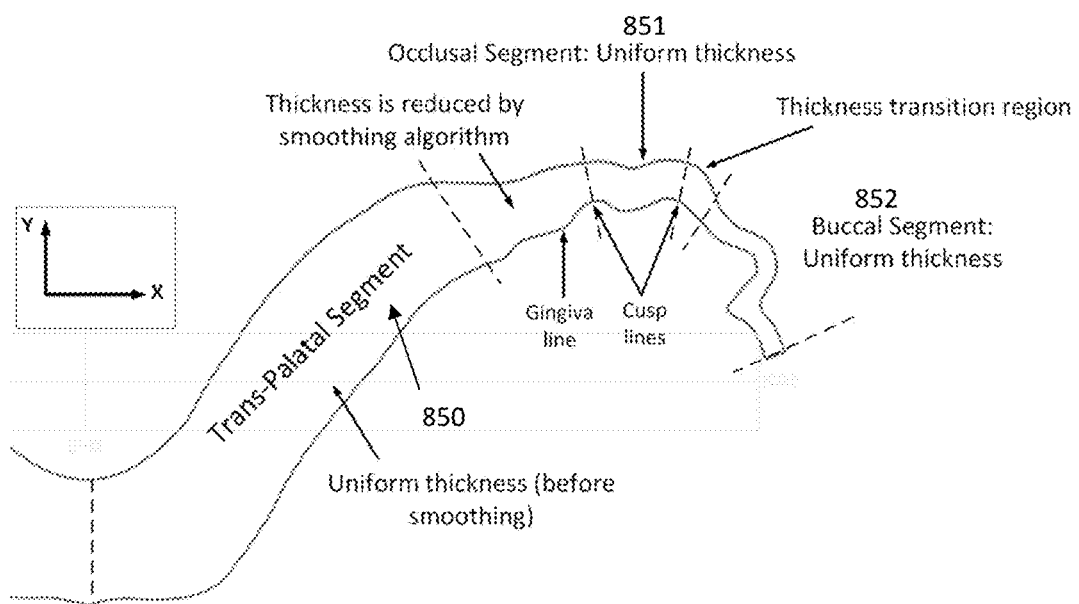
Figure 11A:
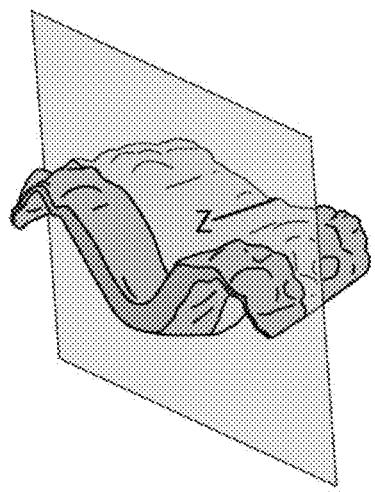
FIG. 11A is an example of a palatal expander with another section through the zy plane, off of the midline of the palatal expander.
Figure 11B:
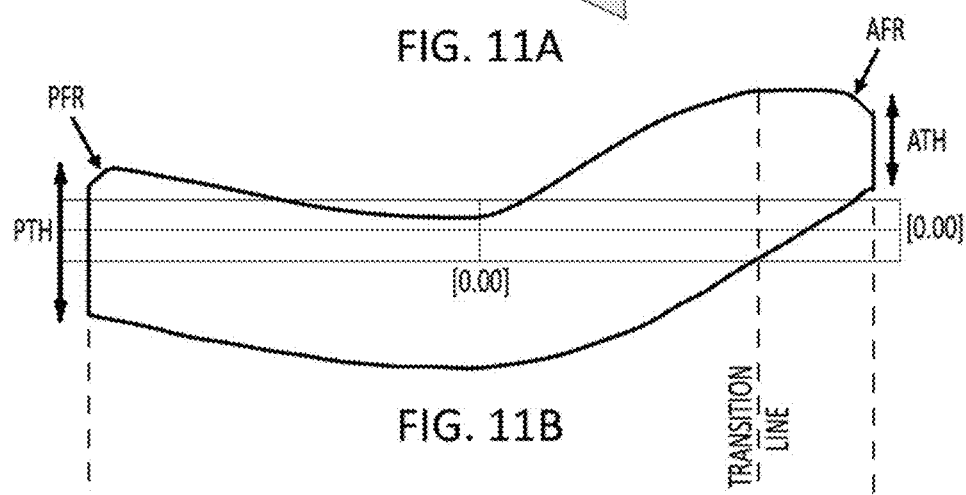
FIG. 11B shows the cross-section of the palatal expander through the zy plane of FIG. 11A.
Figure 11C:
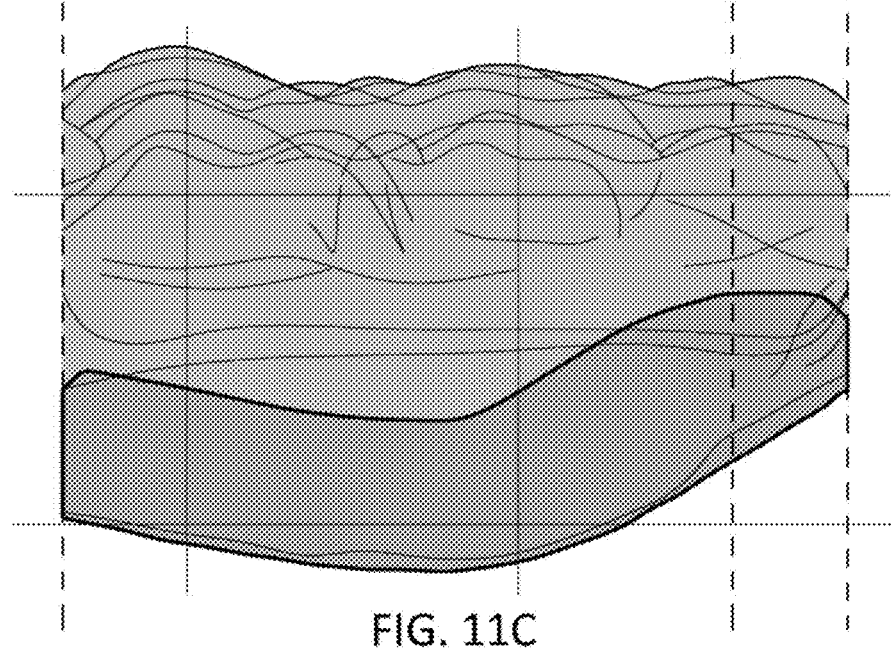
FIG. 11C is a 3D model of the palatal expander, sectioned as shown in FIGS. 11A and 11B.
Figure 13A:
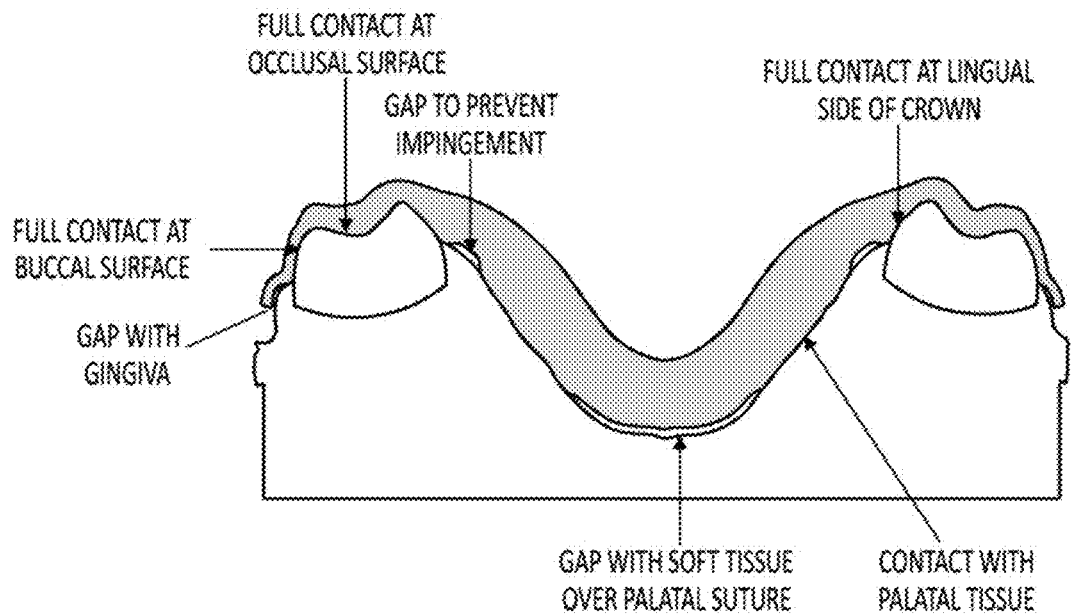
FIG. 13A is a section through a palatal expander, showing gap regions that may be included; specifically, gap regions between the palatal expander and the upper arch, including a concave channel or region before the lingual surface of the palatal expander to prevent impingement of the gingiva, and a gap between the soft tissue and the palatal region.
Figure 13B:
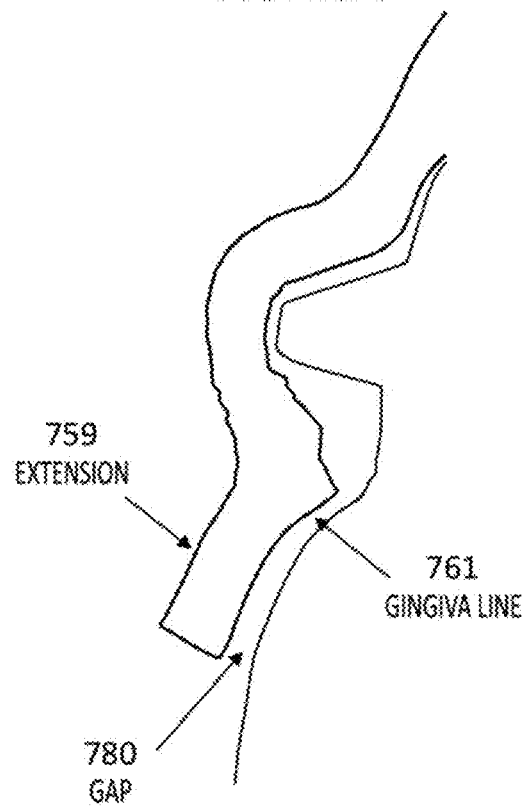
FIG. 13B, like FIG. 7B, shows a section through a portion of a palatal expander including the edge region that may include a gap and/or may act as a removal tab (or portion of a removal tab) for removing the palatal expander.

To provide enough mechanical advantage (or moment) for ease of removal the device, the extension region (e.g., "trim line") may be extended 1-3 mm lower than gingiva line, as shown in FIG. 7B and FIGS. 13A-13B. In this example, a gap 780 of between about 0.25-1 mm between the extension and gingiva is provided to facilitate hooking of patient/parent's finger/nail for removal of the palatal expander. Any of these examples may also include a hinge region that is thinner than the other, adjacent regions, such as the occlusive surface. For example, see FIGS. 8A and 8B. In FIG. 8A, an exemplary palatal expander shows an xy plane through the palatal expander; FIG. 8B shows a portion of the profile of the palatal expander in this xy plane. In FIG. 8B, the palatal expander includes a central trans-palatal segment 851 on either side of the midline of the apparatus. This transpalatal region may be configured as described herein to apply force to open the suture of the palate when worn, as shown in FIG. 4A. The force may be applied to the lingual side of the teeth (e.g., molars) and/or to the lateral side of the palate. The lateral side(s) of the trans-palatal segment may be configured to align with the lingual side of the teeth. An occlusal segment 851 may be positioned over the bite surfaces of the teeth. Finally a buccal segment 852 may extend down the buccal side of the teeth and may include the release (e.g., detachment region) portion. FIG. 8C shows additional detail on the thicknesses of these different regions. For example, in this example, the trans-palatal segment may have a uniform thickness (or nearly uniform thickness; this thickness may vary after smoothing the outer, tongue-facing surface, as described in more detail below). The occlusal segment may have a different (e.g., smaller) uniform thickness, and may transition between the trans-palatal segment thickness and the occlusal segment thickness either uniformly, as a step, or as some function.

Thus, in general, the thickness of the palatal expander in different regions may be adjusted to permit different stiffnesses and expansion properties of the palatal expander. For example, in FIG. 9B, the trans-palatal segment (also referred to as the palatal region) in this example may be about 3-4.5 mm thick to provide a high level of stiffness. The occlusal segment may have a thickness of about 1-2 mm, which may be thick for enough mechanical rigidity and wear resistance due bite and chewing. In this example, the buccal segment and buccal extension have a thickness of about 0.75 mm (e.g., between about 0.25 and 1 mm) which may provide flexibility. Flexibility may decrease with thickness by the order of three. In this example, the transition between occlusal and buccal regions may happen from the buccal cusp line to about 0.75 mm lower height, as shown in FIG. 8C. The transition between the trans-palatal and occlusal regions happens from about the buccal gingiva line level up to buccal cusp line.

The thickness and/or shape of the transpalatal segment can be focally modified to provide uniform stiffness across the palate and/or a location for the application of force, including to the lingual side of the teeth (e.g., D, E, 6 teeth) or one or more regions of the palate, including in particular, regions laterally offset from the midline of the palate. For example, the thickness of the transpalatal segment finite element modeling.

The thickness may be determined for any point on the bottom surface of the apparatus (e.g., the bottom of the transpalatal segment or region) by finding the minimum distance to the opposite upper surface of the apparatus (e.g., the same region of the apparatus). The influence of thickness on the force applied by the device may be estimated by modeling the transpalatal segment as a curved beam. In this approximation, the force may be estimated using Castiglano's theorem. This analysis may be simplified and may allow the estimation of force for any width, thickness, and radius of curvature. The compressive extension may also be estimated. A desired range of stiffnesses (e.g., between 50-90 N/mm, between 60-90 N/mm, between 70-90 N/mm, between 80 and 100 N/mm, etc.) may be targeted. The stiffness may therefore be equivalent to a compressive force within a desired range (e.g., 8 N at between 0.15 mm to 0.30 mm, 9 N at between 0.15 mm to 0.30 mm, 10 N at between 0.15 mm to 0.30 mm, 15 N at between 0.15 to 0.30 mm, 20 N at between 0.15 to 0.30 mm, 25N at between 0.15 to 0.30 mm, 30 N at between 0.15 to 0.30 mm, etc.), providing a targeted expansion for each stage (expander) worn. The material forming the expander may retain approximately half (e.g., between 45-60%, etc.) of its mechanical properties under stress relaxation when worn by a patient (e.g., at 37 degrees C. when worn in compression for the treatment time, e.g., 24 hours. For example, a minimum of 40N force (e.g., minimum of 35 N, minimum of 40, minimum of 45, etc.) at between about 0.15 to 0.30 mm (e.g., between 0.20 to 0.25 mm, etc.) compression may be used as a design criterion.

Similarly, the buccal side may be considered as a cantilever beam while it is deflected under a removal force. The thickness and height may be customized based on this type of modeling.

Figure 60:
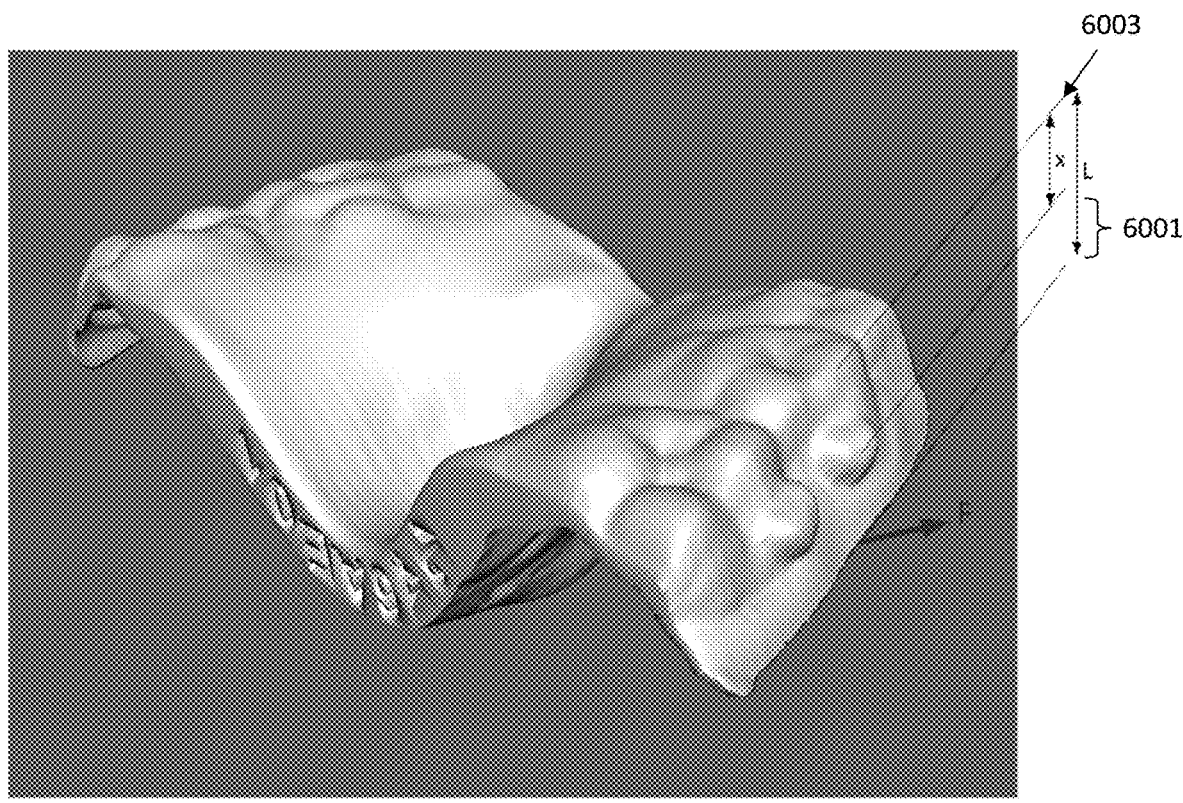
FIG. 60 illustrates an example of a palatal expander including an extension region to aid in removal of the device from the patient.

As mentioned above, in any of these variations, the buccal side of the apparatus may include an extension extending from the buccal side that is configured to extend adjacent and away from the patient's gingiva to form a gap of (e.g., between about 0.2 and 2 mm, e.g., between 0.25 and 1 mm, etc.) when the apparatus is worn by a patient. The patient or a caregiver may use this extension to remove the apparatus by uncoupling it from one or more attachments. In general, removal of a palatal extension, particularly those having attachment regions that couple to attachments bonded to the teeth, may require a lot of force. A patient or caregiver may not be able to readily disengage the device from the attachment. The force, F, required it typically applied perpendicularly to the buccal side of the device, as shown in FIG. 60. Thus, an extension region 6001 may be help disengage any attachment(s) and remove the device. Specifically, the extension region 6001, which may be the portion of the buccal side extending below the bottom of the attachment region (e.g., L-x in FIG. 60), may be designed to help the buccal region hinge around the cusp line 6003, at the top of position x, where the buccal side becomes the occlusal side over the cusp of the crowns. This portion of the device may be 'hinged' around this line, as mentioned above, allowing it to act similarly to a cantilever beam. The deflection when force F is applied at any location at any distance from the fixed line of the cantilever beam may be estimated from the geometry of the apparatus (including the size and position of the attachment site). For example, if the height of the attachment is 1.25 mm (e.g., y=1.25 mm) and x is the distance to the top of the attachment from the cusp line, when the attachment is in the middle of the buccal side (e.g., x=½L) the force needed to detach may be estimated and can be set (F) to be about the same as the amount of force that a typical user's finger could apply. Given the boundary (upper and lower) of x, and this typical force range, from a user's finger (F), when the attachment height is constant, the length of the buccal side can be estimated, e.g., from the gingival edge (e.g., 2 mm lower than gingival side). Thus, the length of the extension region 6001 may be estimated. For the typical force of removal of the device, this length may be between 1 and 5 mm, e.g., between 2 and 4 mm, etc. The length may be adjusted to avoid contact with the soft tissue. The amount of force (F) needed to generate enough deflection in the buccal segment of the device can be determined from the geometry and the module of elasticity the (E) of the material forming the buccal side, as well the second moment of area (I), which is a function of thickness and width.

Figure 4C:
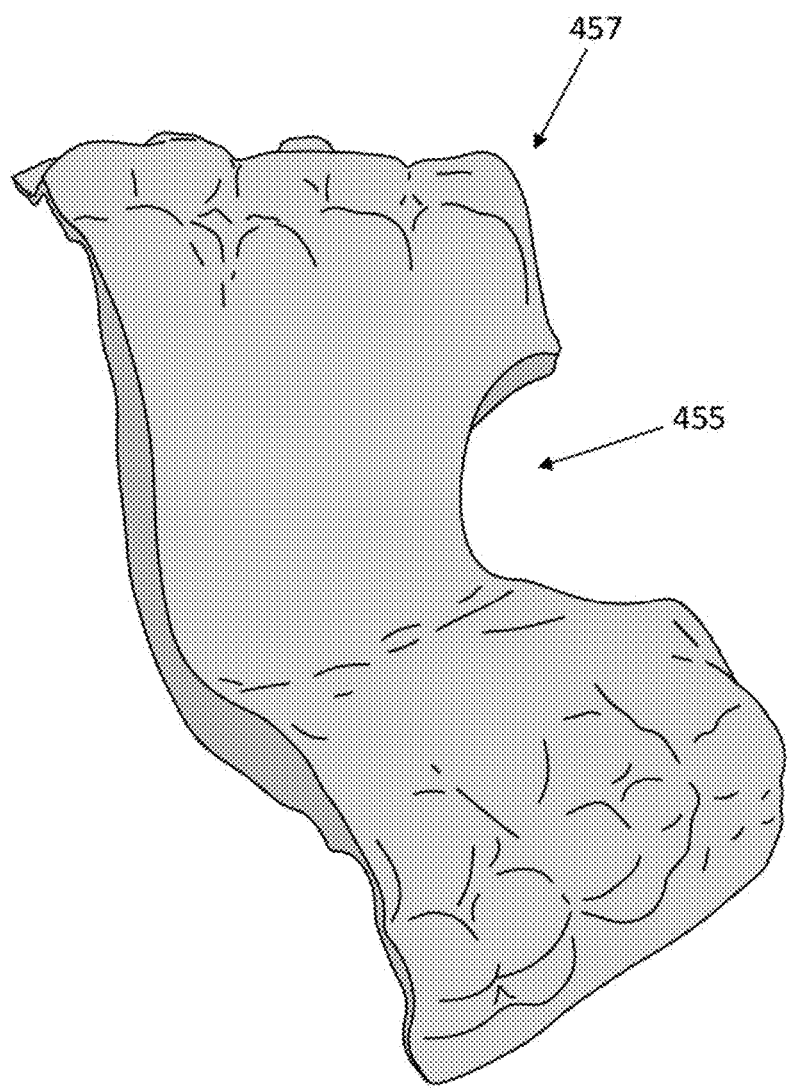
FIG. 4C illustrates an example of a palatal expander in which a portion of the palatal region has been removed from the anterior region; similarly, other regions of the apparatus, e.g., from the posterior region may be removed. Alternatively or additionally, any of these apparatuses may have a hole cut in other regions, including in the center region.

Thus, the thickness of the trans-palatable region (also referred to herein as the "palatal region") may be non-uniform, particularly where the outer surface of the palatal expander has been adjusted, e.g., by smoothing. Smoothing may provide more space for a patient's tongue and may improve speech lisp issue for particular letters. However, thickness of this region may change non-linearly to meet tangent conditions at the both boundaries and maintain the thickness more close to that of trans-palatal segment to prevent deformation and hinging of device prior to the cusp line. In addition, the apparatus 457 may include one or more cut-out regions 455, including regions from the anterior (e.g., see, e.g., FIG. 4C) or posterior, which may enhance comfort, prevent problems with speech, or the like.

FIG. 13A-13B illustrate gaps/offsets between the palatal expander segments and the patient's tissues. For example, in FIG. 13A-13B, the minimum gap at the soft palate (e.g., the mid-line region) may preferably be ~0.5 mm (e.g., between 0.01 mm and 1 mm, between 0.1 mm and 0.75 mm, etc.) to prevent any touch. Larger gaps may cause food entrapment. The gap between the palatal surface of a trans-palatal segment and the palate may be controllable across the palate. Extension of the buccal section below the gingival line; as mentioned above, to provide enough mechanical advantage (or moment) for ease of removal, the device trim line may be extended 1-3 mm lower than gingiva line. A gap of 0.25-1 mm between the extension and gingival may be provided to facilitate hooking of patient/parent's finger/nail for removal, as shown in FIGS. 7B and 13B.

In FIG. 13A, the palatal expander may also include a no touch region at the gingival line on the lingual side of the palatal expander. In this example, a gap linearly reduces from 0.5 mm at mid-line to zero at gingiva line. All the force in this example, may be applied on teeth (e.g., a tooth-borne palatal expander). A partial touch (tissue-borne palatal expander) may include control points that determine at what region gap is zero or larger than zero. In this case, force may be applied on both teeth and palate. Control points can be determined as percentage of the palate width. Other variations may include full contact (e.g., no gap) at the lingual side of the crown, which may fully transfer expansion force/displacement to both teeth and at least a portion of the sides of the palate. For example, a full contact (no gap) may include +/−0.1 mm preferred for occlusal surface; a full contact (not gap) +/−0.1 mm may be preferred for buccal side of crowns except in attachment well. A gap of 0.25-1 mm between the extension and gingival may be provided to facilitate hooking of patient/parent's finger/nail for removal.

Figure 13C:
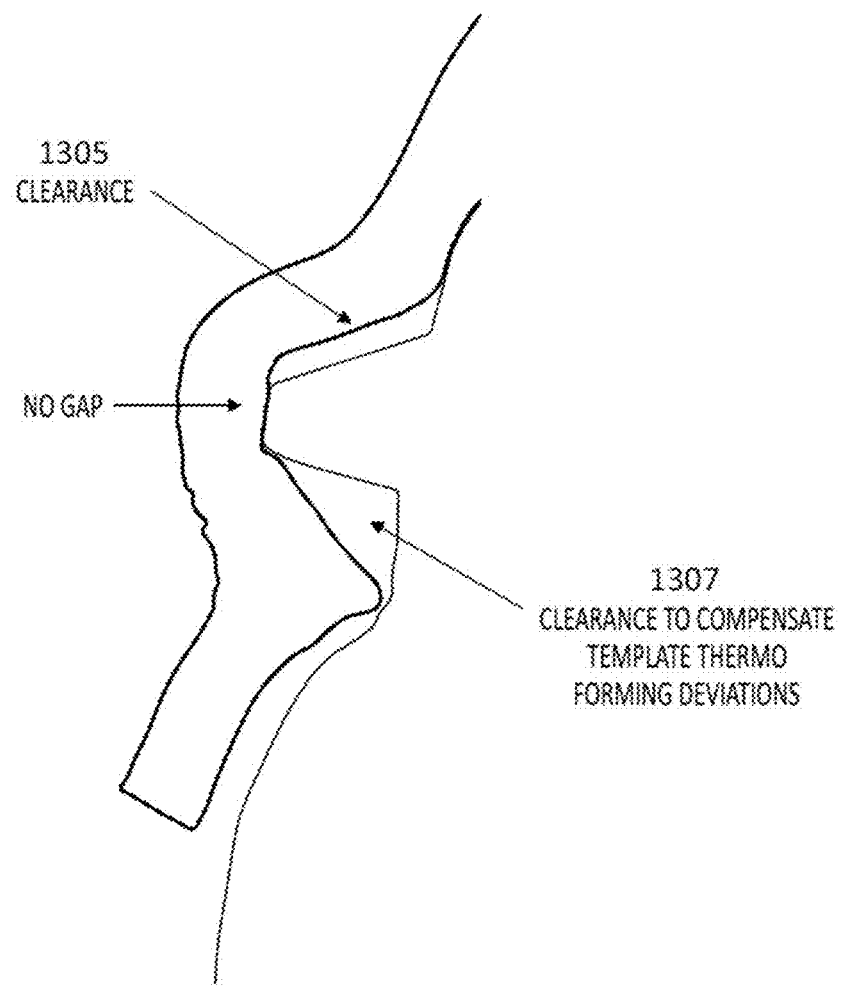
FIG. 13C is another, alternative section, through a portion of a palatal expander including a removal tab region forming a gap between the palatal expander buccal end/edge and the patient's gingiva and/or teeth.

For example, FIG. 13C shows an example in which the palatal expander apparatus includes a region of clearance 1305 above and below 1307 the attachment mating site, e.g. the attachment well may include clearance from attachment top surface of ~0.25 mm. This may provide for clearance to compensate for deviations of attachment template manufacturing and attachment formation.

As mentioned, the thickness of different regions of the palatal expander may be controlled and may be non-uniform. For example, the trans-palatal segment extending from across the palate up to lingual gingiva line may have a first thickness or range of thicknesses. The occlusal segment may extend from across the crown surface from lingual gingival line to buccal cusps connecting line, and may have a different thickness. The buccal segment may extend from across the buccal side of crown and buccal gingiva, and may be thinner, and may also include a hinged region before the occlusive segment.

In general, the palatal expander rigidity may be balanced with space for the patient's tongue. For example, any of these apparatuses may include a thin cross section towards the anterior and a thick or thicker cross-section towards the posterior The trans-palatal segment may be defined in an XY plane cross section, as shown in FIGS. 9A-9B. In the example shown in FIG. 9B, a uniform thickness of about 4.5 mm was used for trans-palatal segment for EFS. This thickness may change or be varying across the palate as described above. The tolerance of the trans-palatal thickness can deviate from default thickness for smoothness purposes (describe below in reference to FIGS. 14A-14C, by, e.g., ~+0.5 mm on the lingual (tongue-facing) surface of the palatal expander. In FIG. 9B, the transition line may be defined in a separate item, and the apparatus may include a uniform thickness from the posterior facet up to the transition line. In some variations, the apparatus may include a non-linear transition from posterior thickness (PTH) to anterior thickness (ATH) from transition line to anterior facet with tangent condition at the transition line the posterior thickness (PTH), for example, may be between 3-4.5 mm (can be dependent of patient-specific palate shape). The anterior thickness (ATH) may be in the range of occlusal thickness (e.g., ~1.5 mm). The posterior fillet radius (PFR) may be ~0.5 mm, and the anterior fillet radius (PFR) may be ~0.5 mm. The transition line may be adjusted to secure desired transition region. For example, it may be preferable for the palatal expander to cover molars #6 and #E area full thickness so that transition happens in #D area (see, e.g., FIG. 16A-16B).

As mentioned, the lingual surface of any of the palatal expanders described herein may be 'smoothed' to reduce the troughs (or in some variations, troughs and/or peaks) that would otherwise appear on the lingual surface if the thickness were uniform across the palatal region of the palatal expander. For example, FIG. 14A shows an example of a palatal region having a sharp bend or transition along the surface reflecting a similar bend/channel in the patient's palate. In FIG. 14B, this bend/channel has been smoothed in the palatal expander to fill in or reduce the rate of change in the surface of the palatal expander. In FIG. 14C, this is shown in cross-section. The original surface 1404 includes a number of sharply changing grooves or troughs and one major ridge 1406, particularly when compared with a completely smooth surface 1407 projected against the actual surface. Although the smooth surface (which fills in the grooves) may be used, in some variations the ridge 1406 may be kept in the final surface 1409. This smoothed surface may be both more comfortable for the patient, and may also provide sufficient strength while increasing the comfort to the patient. The smoothing may result in a non-uniform thickness of the trans-palatal segment. Smoothing may also help improve speech, as these grooves/ridges may cause speech issues. The lingual surface smoothness of the trans-palatal segment may be increased (e.g., smoothened) to provide comfort in contact with tongue. In some variations, the smoothing may provide a variation of thickness in this region between +/−0.5 mm. The palatal surface of a trans-palatal segment typically does not need smoothing, as it may match with the patient's palate (similarly, the surfaces in contact with teeth may not need smoothing). The occlusive surface may be smoothed (e.g., between +/−0.2 mm); the buccal surface may also be smoothed between +/−0.2 mm.

In any of the palatal expander apparatuses described herein, the inter-proximal region may include a virtual filler. The virtual filler may be used for the interproximal regions to design the palatal expander. For example, all three teeth on both sides may move translationally in an X direction. Each side may move half amounts in expansion for each incremental stage. Typically, anterior teeth are not treated and their movements are not controlled by the palatal expanders. The ratio of movement may be estimated/predicted based on the suture opening.

Occlusal cross sectional thickness may be controlled with cusp matching or with additional surface features, such as flat planes, ramps, etc. For example, the occlusive surface may include added thicknesses for structural integrity, which may be useful for opening the anterior bite.

Figure 12:
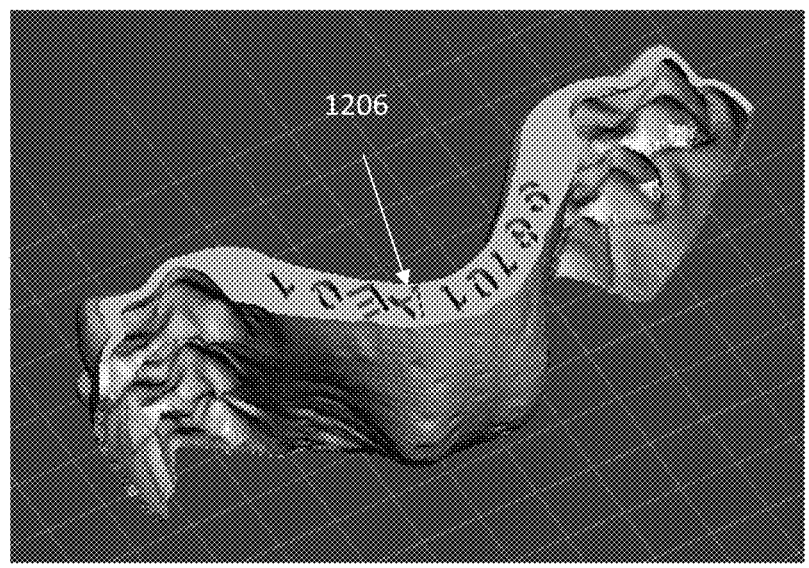
FIG. 12 illustrates one example of an identification or part number marking on a palatal expander, shown on a flat surface formed on the posterior end of the palatal expander. The identifying marking may include a sequence identifier/number (e.g., indicating the number of the palatal expander in a sequence), a patient-associated identifier/number, etc. The identifying mark may be printed sufficiently large and distinctly so that it may be read by the patient.

Any of the palatal expanders and holders described herein may include one or more markings, as described above. For example, FIG. 12 illustrates one example of an identification or part number built into a palatal expander, shown on a posterior surface between the occlusal and lingual sides of the palatal expander. For example, a flat surface may be created (e.g., by 3D printing) and an identification or part number 1206 may be printed thereon. For example, as shown in FIG. 12, the marking may be printed on a back flat side (e.g. posterior surface), and may be sized to fit at least 9 digits (e.g. oriented upward) that may be read by a patient or may be automatically read. For example, the digits may be sized between 8 point and 16 point font.

Alternatively or additionally to the engraved markings described above, the markings may be or include a machine-readable code, such as a QR code, a bar code, or the like. The marking may be embedded within the apparatus and visible through the apparatus. The markings may be florescent or visible when viewed in certain conditions, e.g., under UV light, in the dark, etc. Although the markings in the example of FIG. 12 are shown on the posterior edge, in practice, markings may be placed in any region of (or within) the apparatus.

Figure 15:
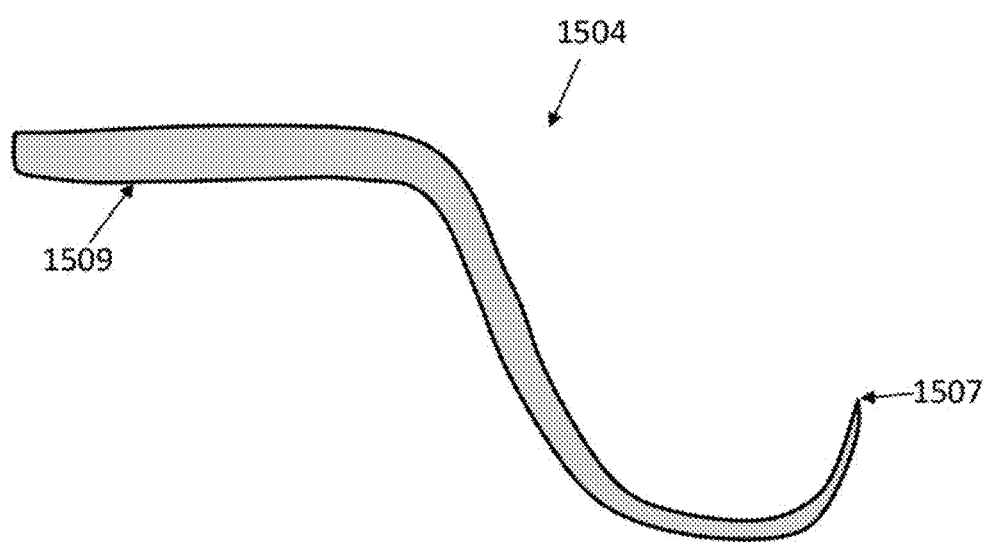
FIG. 15 is an example of a tool that may be used to remove a palatal expander, including a proximal grip region and a distal palatal expander engaging region.

Any of the apparatuses (e.g., systems) described herein may include a removal tool, such as the removal tool 1504 shown in FIG. 15. For example, a removal tool may be a metal (e.g., stainless steel) apparatus that is shaped for easy access into the disengagement gap of the palatal expander. As shown in FIG. 15, one end 1507 may be configured to enter the gap and execute the disengagement hinge. The apparatus may also include a gripping region 1509 to allow easy control of the tool. In general, the detachment region (or removal grip, etc.) may be configured for use with a tool such as the removal tool shown in FIG. 15.

Figure 16A:
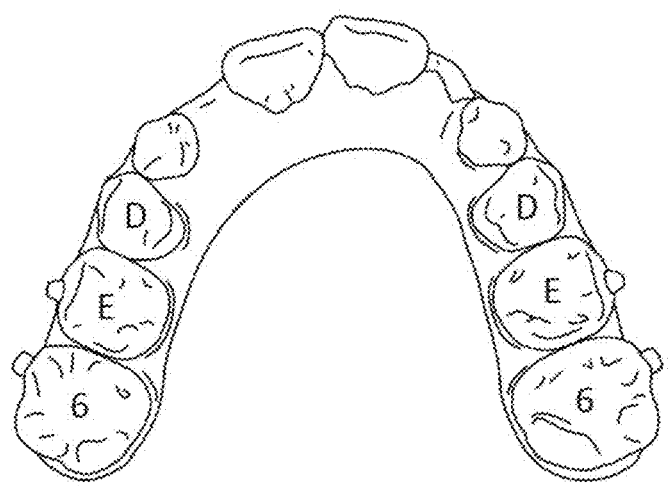
FIG. 16A is an example of a bottom view of the upper palate, showing attachments that may be made to some or all of the teeth at various positions, in order to secure the palatal expander to the subject's teeth.

As mentioned above, FIGS. 16A-16B illustrate coverage of the teeth by the palatal expanders and also show possible attachment sites for attachments on the teeth. In FIG. 16A, the figures shows all D, E and 1st molar (#6) are shown fully erupted. The teeth: #6s, Es and Ds on both sides (alternative numbered: T2, T3, T4 and T13, T14, T15) may be completely or partially covered by the apparatus, and some or all of them may include one or more attachments.

Figure 16B:
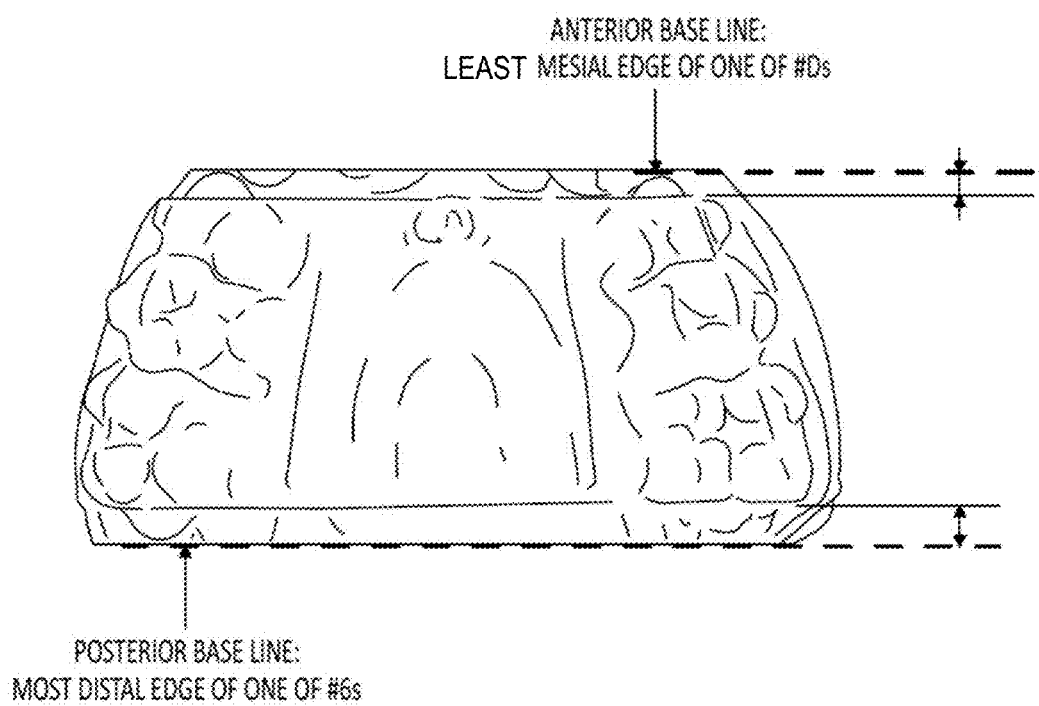
FIG. 16B is an example of a bottom view of a palatal expander.

For example, the extent of coverage of these teeth may include an anterior border that is between 0-2 mm offset from the anterior base line (as shown in FIG. 16B). The posterior border may be between 1-3 mm offset from the posterior base line (as shown) to eliminate posterior curves of teeth.

FIG. 17A-17E illustrate an exemplary attachment, shown as a semi-cylindrical attachment that includes a ramp having a pitch angle of approximately 55 degrees. In FIG. 17A-17E, the length of the attachment (shown as "length" 1703 in FIG.

Figure 17A:
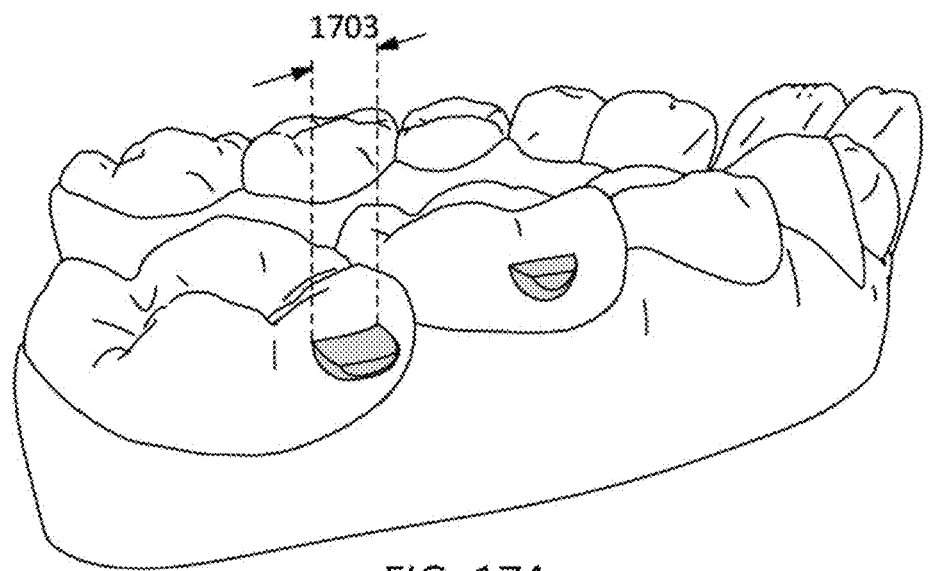
FIGS. 17A-17E illustrate attachments on a model of a patient's teeth.
Figure 17B:
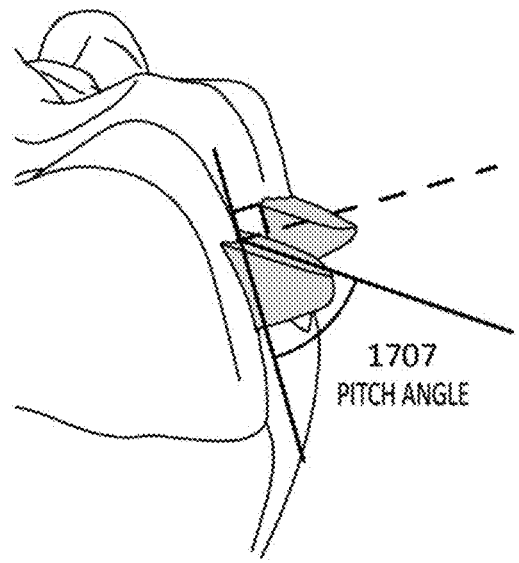
Figure 17C:
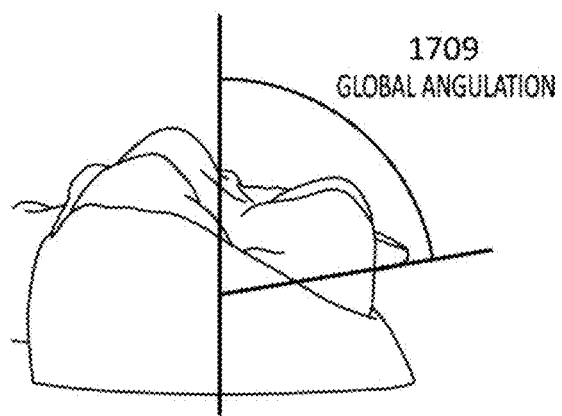
Figure 17D:
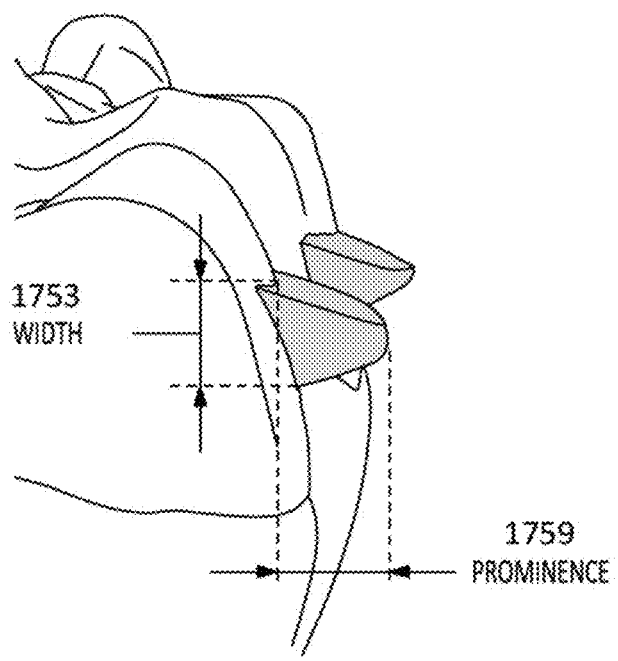
Figure 17E:
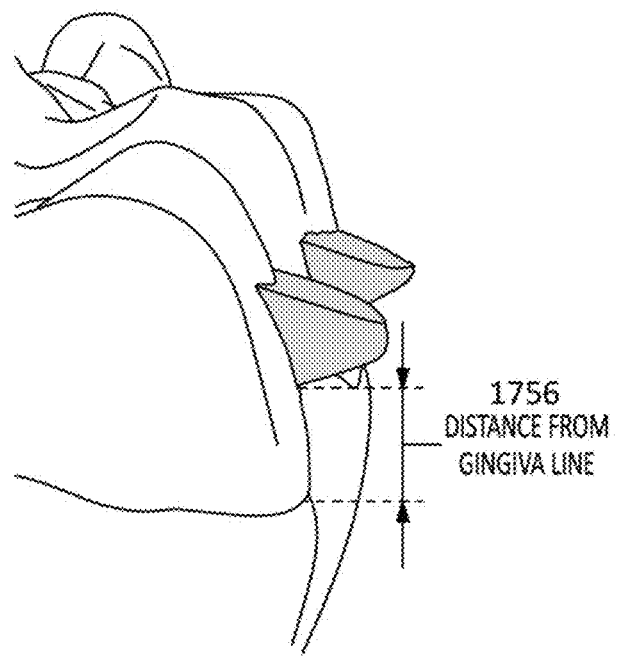

17A) along the side of the teeth is between about 1 mm and 4 mm (e.g., between 1.5 and 3 mm, between 2 and 3 mm, etc.), and the width 1753 (shown in FIG. 17D) tapers as the attachment extends from the tooth, but may have a maximum of between about 0.5 and 4 mm (e.g., between about 1 and 2 mm, etc.) at the tooth surface. The attachment is sloped downward to reduce the width at an angle of between about 45 and 65 degrees (e.g., between about 50 and 60 degrees, etc.), referred to herein as the pitch angle 1707. The attachment may extend, e.g., have a prominence 1759, of between about 0.5 mm and 3 mm (e.g., between about 0.75 mm and 1.75 mm, between about 1 mm and about 1.5 mm, etc.) from the tooth. The attachment may be spaced from the patient's gingiva by between about 1 mm and 0.25 mm (e.g., between about 0.5 and about 0.95 mm) 1759, as shown in FIG. 17E. The overall global articulation angle may be less than 90 degrees (e.g., less than about 85 degrees, less than about 80 degrees, less than about 75 degrees, etc.). The attachments may be shaped like a semi-cylinder with an angled cut as shown in FIGS. 17A-17E. This design may provide a slope for easy insertion and rounded bottom side to reduce stress concentration. It might also help template removal from mold and attachments in patient mouth.

Figure 19A:
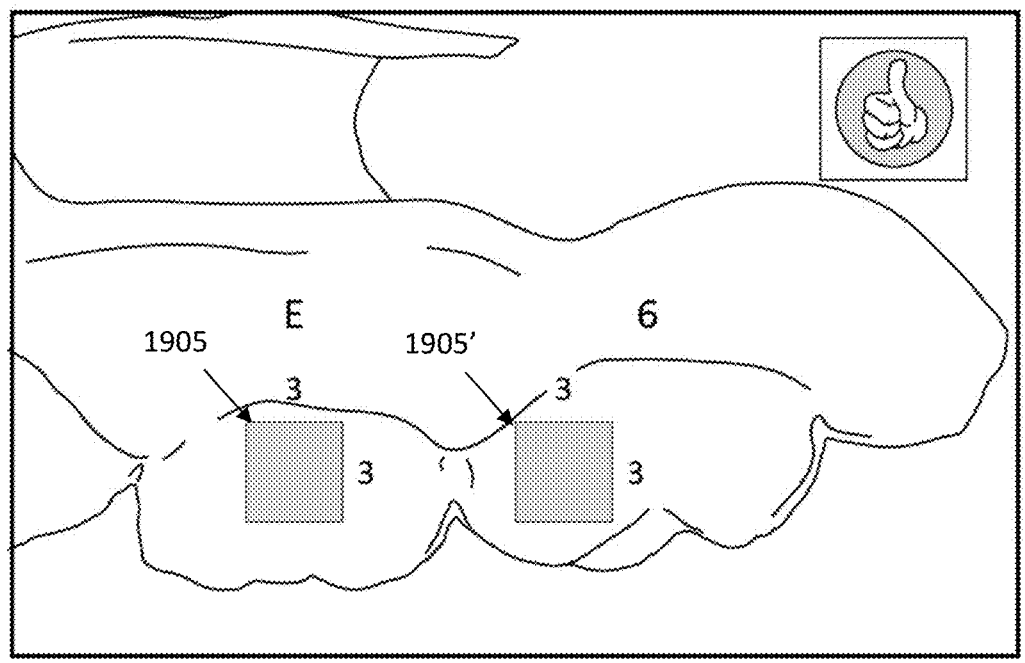
FIGS. 19A and 19B illustrate exemplary guidance for scanning a patient's dental arch, including scanning sufficient space (e.g., 3×3 mm) on the lateral side of the patient's molars.

In particular, the attachments described herein may be shaped and sized to distribute the forces applied by the palatal expander and teeth on the attachment over a large region of the tooth surface without extending beyond a predetermined buccal region on the teeth (e.g., the E and 6 teeth, see, e.g., FIG. 19A). As described in the context of FIG. 16A, above. For example, the attachment size and shape may be configured to distribute the force within the center of the crown region of the E's, and/or the mesial cusp of the crown on the 6's.

Figure 18A:
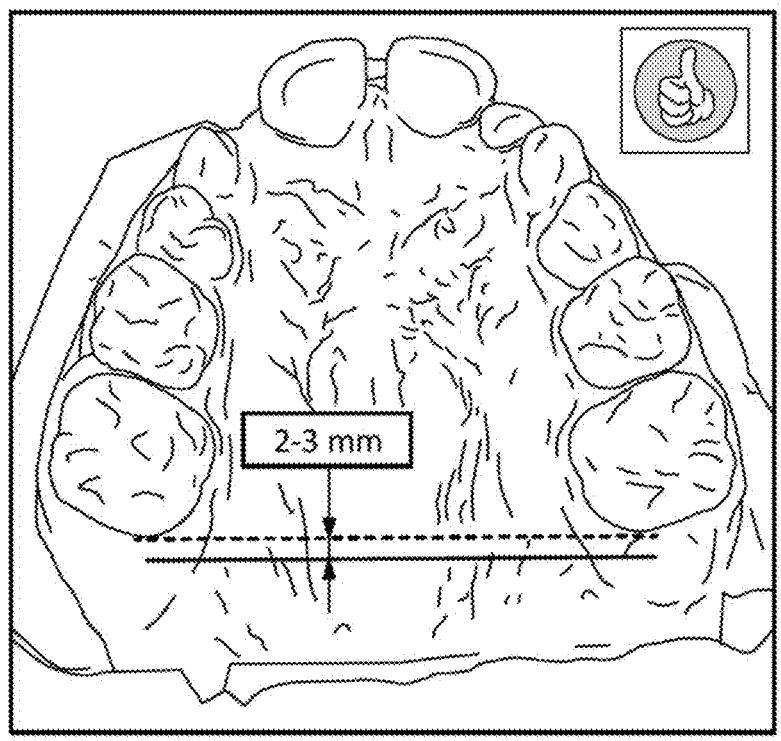
FIGS. 18A and 18B illustrate guidance for scanning a patient's upper arch to form a series of palatal expanders, as described herein.
Figure 18B:
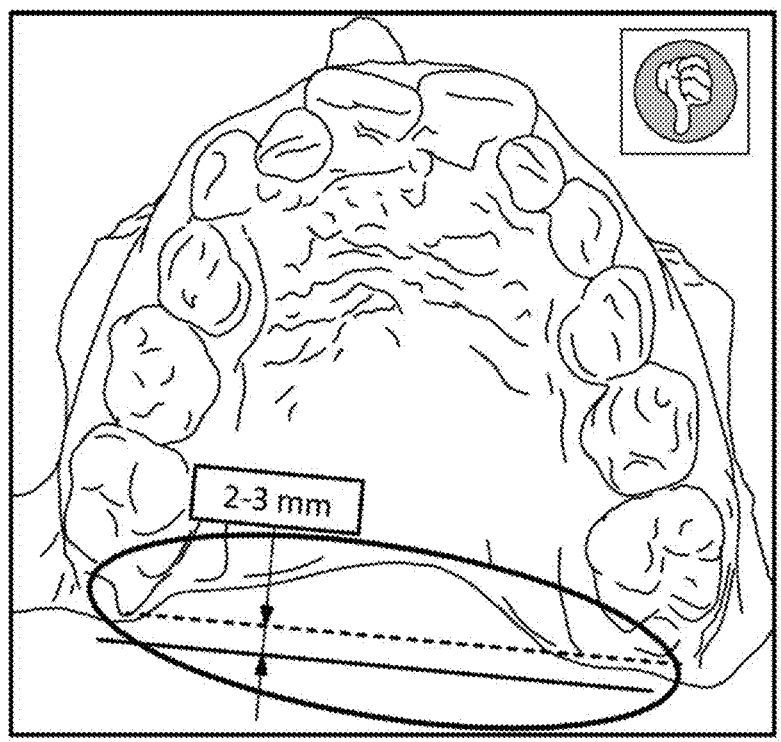

Preparing a palatal expander for a patient optionally may include initially scanning the patient's upper arch. Digital scans may also be used to monitor/track progress of the palatal expansion. When scanning the patient's upper arch for making a palatal expander apparatus for the patient, it may be helpful to scan a larger-than usual area, including the teeth, the gingiva and the palate in a single scan (or combined scan). For example, FIGS. 18A-20B provide examples of scanning requirements that may be used. For example, FIG. 18A-18B illustrate sufficient (FIG. 18A) and insufficient maxillary arch scans.

Figure 19B:
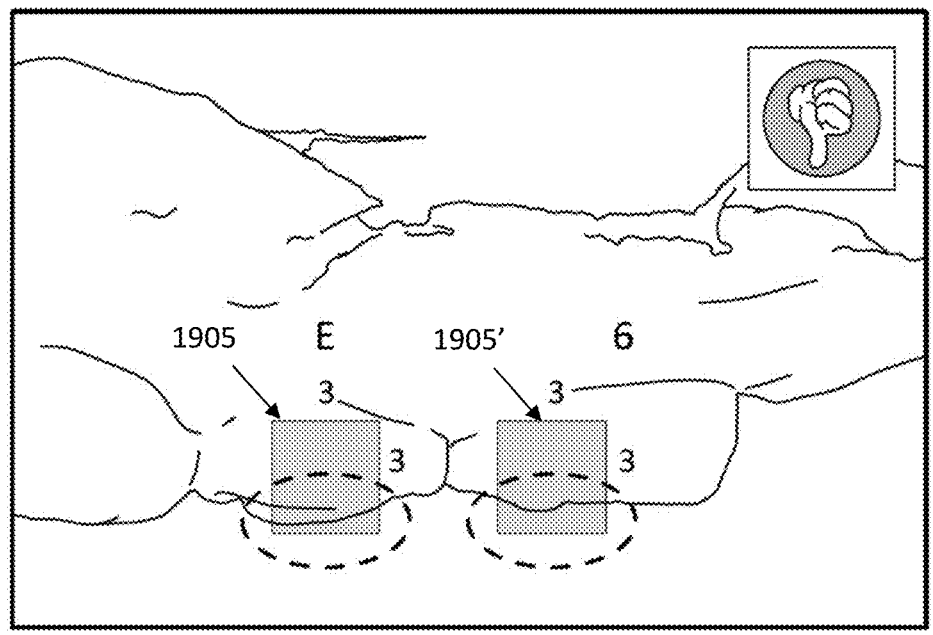
Figure 20A:
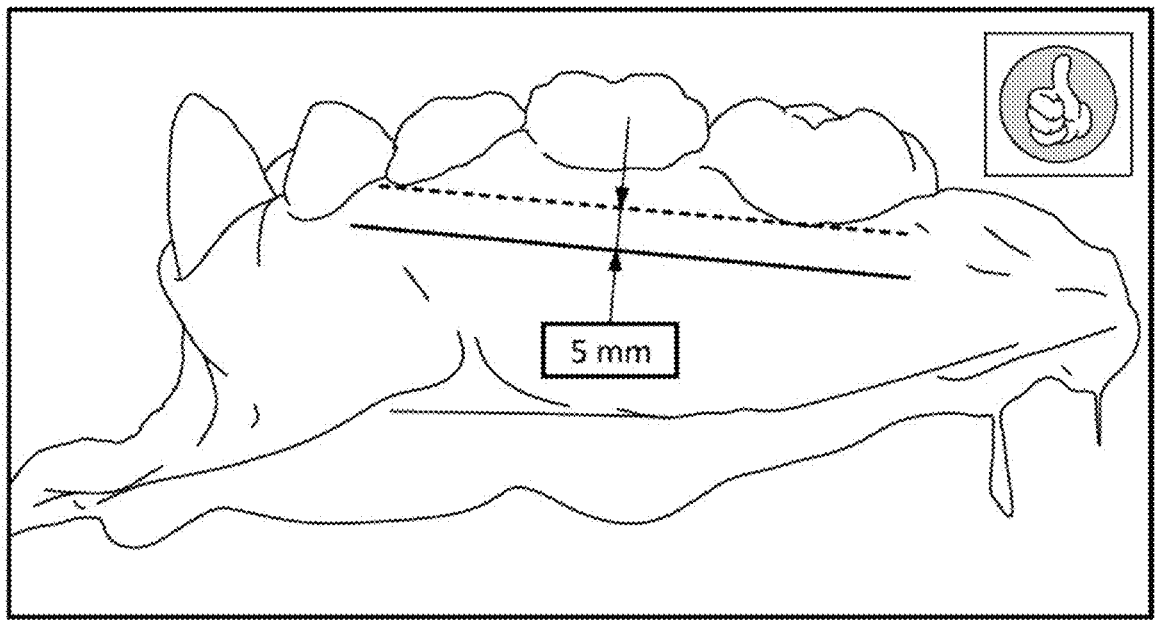
FIGS. 20A and 20B illustrate additional exemplary guidance for scanning a patient's upper dental arch.
Figure 20B:
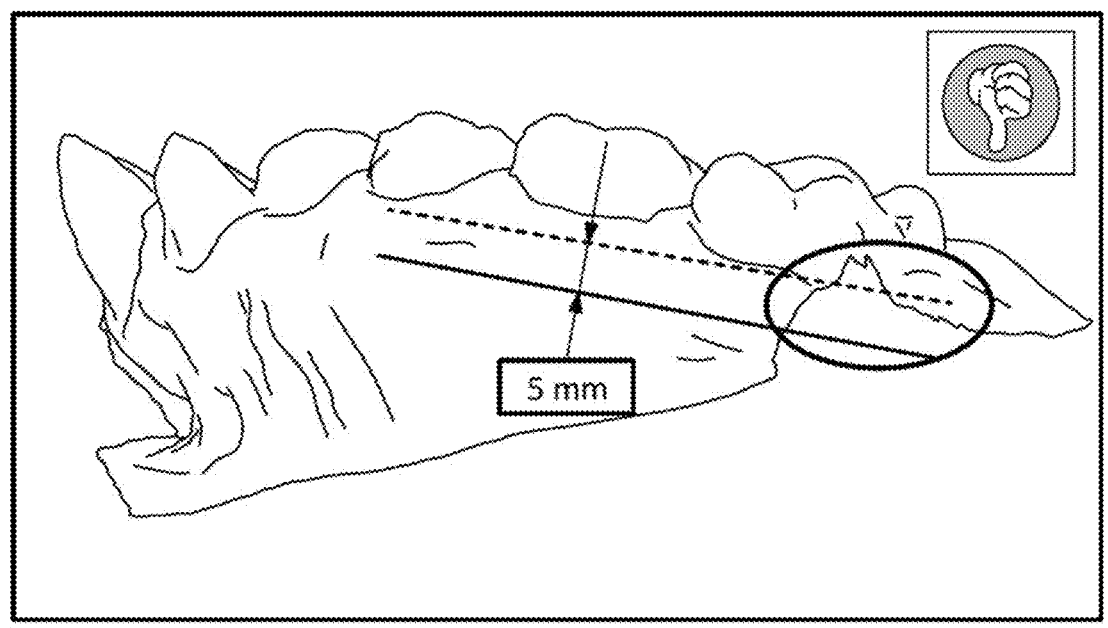

When scanning the upper (maxillary) arch, the scan should include palatal coverage, including coverage of the D's, E's and 6's (see FIG. 16A, above). The scan must provide sufficient crown height and extended gingiva coverage. For example, for palatal coverage, the palatal scan may capture between about 2-3 mm beyond distal surface of the D, E and 6 (e.g., permanent molar) teeth, as shown in FIG. 16A. The crown height must for these teeth must be scanned to about a 3 mm×3 mm square footprint on the side of these teeth for placement of retention attachments on the E's and 6's. For example, on the E's, attachments will be located in center of crown. On the 6's, attachments may be located on the mesial cusp of crown. This is illustrated in FIG. 19A-19B, showing sufficient (FIG. 19A) and insufficient (FIG. 19B) scanning (e.g., in a lateral 3×3 or other dimensioned region 1905, 1905'). The scanned gingival coverage should capture the gingival around the D's, E's and 6's, to within 5 mm below the CEJ line, as shown in FIG. 20A. FIG. 20B shows insufficient coverage.

Figure 21A:
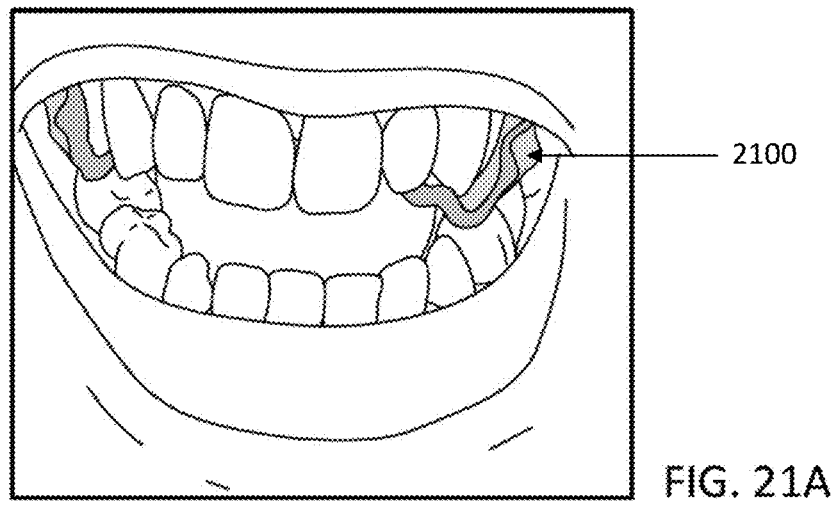
FIGS. 21A-21C illustrate a method of inserting a palatal expander 2100 in a patients teeth including, placing the device in the patient's mouth on the upper dental arch (FIG. 21A), and biting down on the palatal expander apparatus (FIGS. 21B and 21C) to seat the device and secure it over the teeth, including in some examples, onto the attachments.
Figure 21B:
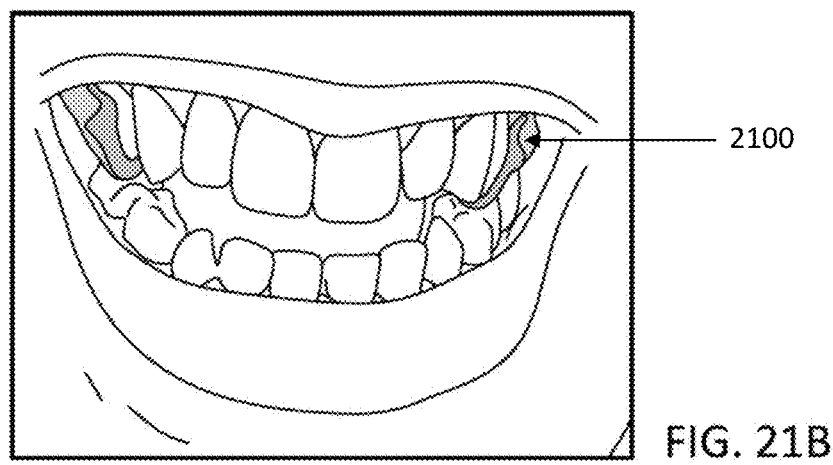
Figure 21C:
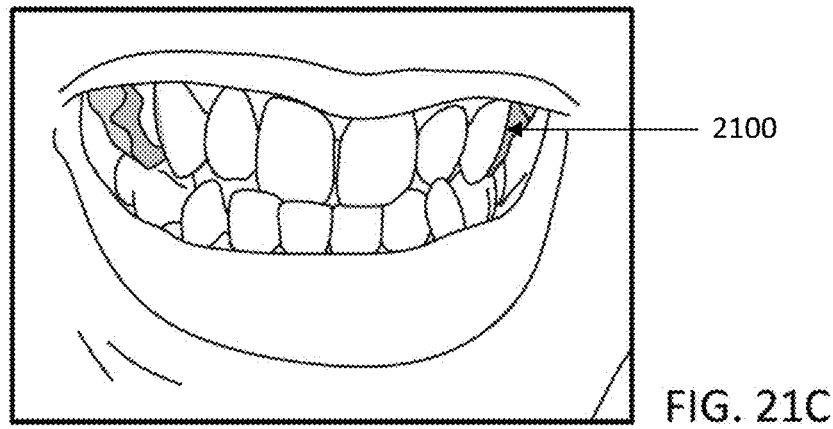

In use, any of the apparatuses described herein may be inserted by the patient, and/or by a dental professional. For example, a patient may be provided with instructions for inserting a palatal expander including first brushing and flossing the teeth. The patient may also confirm (e.g., by reading the markings on the palatal expander) that it is the correct device. The palatal expander may then be cleaned, e.g., with a soft bristle toothbrush, water and a small amount of toothpaste) and rinsed (e.g., with cold tap water). As shown in FIG. 21A, the device 2100 may then be inserted into the mouth, and, as shown in FIGS. 21B and 21C, the palatal expander may be fully engaged on one side of expander first, then applied over the teeth of the other side. The patient may then bite down to fully seat the device.

Figure 22C:
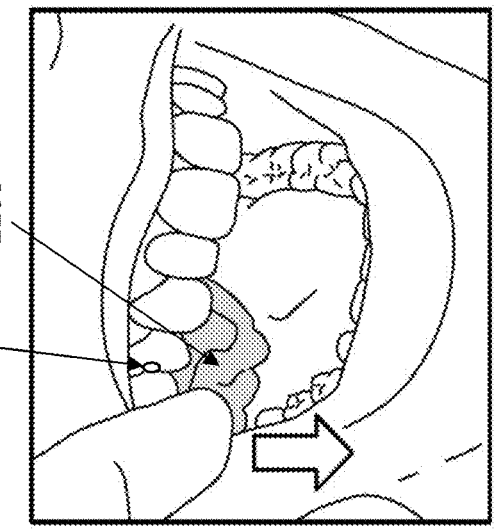
FIGS. 22A-22C illustrate removal of a palatal expander apparatus including a detachment region by inserting a fingernail into the detachment region (FIG. 22A), pulling buccally away from the teeth (FIG. 22B) to disengage from any attachments, and then pulling down (FIG. 22C) to remove the apparatus from the teeth.
Figure 22B:
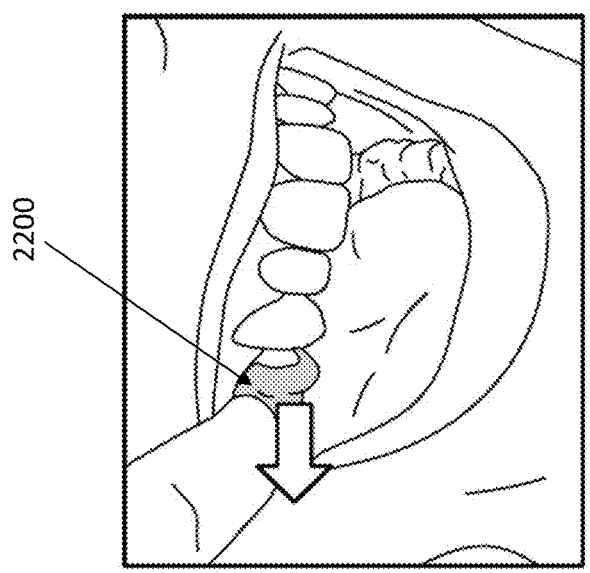
Figure 22A:
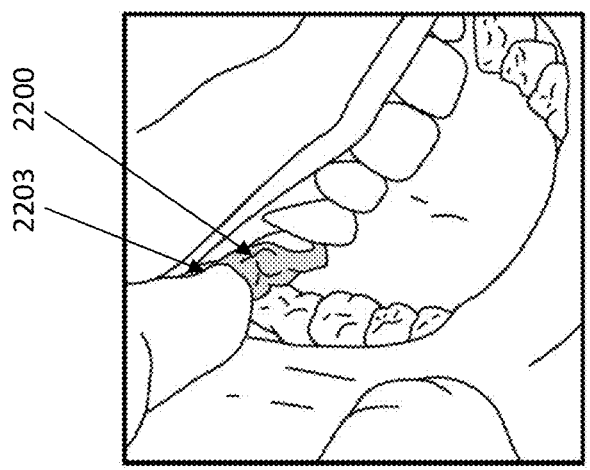

Similarly, the patient may be instructed to remove the device, as shown in FIGS. 22A-22C. To remove the device, the patient may insert a fingernail 2203 or other device (see, e.g., FIG. 15, above) inside of the gap (FIG. 22A) at the gingival edge above the attachments, and may then pull out buccally to disengage the palatal expander 2200 from the attachments 2205 on at least one side (FIG. 22B) then pull down (FIG. 22C). Once removed, the palatal expander may be cleaned with a soft bristle toothbrush, water and a small amount of toothpaste. When moving to the next stage (palatal expander), the used palatal expander may be stored or discarded.

Example 1

Treatment to Expand a Patient's Palate

The methods an apparatuses described herein may be used to treat young pre-pubertal subjects when a child's mouth has grown sufficiently to address the structure of the jaw and teeth while the primary teeth are still in the mouth. Palatal expansion may be used prior to aligner treatment; during this treatment, arch development occurs by increasing arch width or depth via dental or palatal expansion to create space for more permanent teeth to erupt. Typically aligners may not produce the required minimum transverse force needed for skeletal palatal expansion.

The palatal expander systems described herein may assist in skeletal and dental arch development. An example system may consist of a series of transpalatal arch feature that is intended to produce palatal expansion. The feature is designed to move/expand the palate by expanding the maxillary arch outwards buccolingually for transverse palatal size increases by exerting force on the maxillary posterior teeth. There will be no planned treatment for lower arch for the early feasibility clinical study. The expander wear time will be full-time. There are a series of expanders that are exchanged daily, with an expansion rate of 0.25 mm/day. The number of expanders is determined by the amount of expansion desired. This also determines the amount of time the expansion will be performed. The device is manufactured after obtaining digital impression scans of the child's teeth and palate.

The patient may be provided the same rate of treatment, where the length will depend on the amount of expansion, which will be determined by the dentist or dental practitioner. The palatal expander may be changed once a day with an expansion rate of 0.25 mm per day. The amount of expanders provided to patient may be based on the desired expansion amount. Following the expansion period, there will be a "holding period" that the patient may be held in. The holding period may have a duration of between 1-3 months. After the holding period, the patient may use a series of aligners to align the teeth.

The patient may have stable 6s, Ds and Es, and typically has a need of maxillary expansion. The patient may have clinical crown surface for attachment placement (3 mm H, 3 mm V) and may have at least ½ roots present confirmed by x-rays. The patient may be screened before beginning treatment, including a standard dental history exam, and an intraoral scan. An intraoral scan may include a 3-dimensional optical digital scan of subjects dentition and palate which is captured, e.g., using an iTero™ scanner. In addition, radiographs and/or a CBCT Scan (which captures data using a cone-shaped X-ray beam) may be taken. This data may be used to reconstruct a three-dimensional (3D) image of the patient's dentition and maxillofacial region, offering an undistorted view of the dentition that can be used to accurately visualize both erupted and non-erupted teeth, tooth root orientation and anomalous structures.

Patients are recommended to wear the device for a 24-hour period each day. Each device is recommended to wear for 1 day. The patient is requested to eat with the device as normally would. It is suggested that the patient remove the device before bedtime, brush their teeth before placing the next device.

The potential benefits of this treatment may include expansion of palate and arches, potentially correcting harmful and detrimental malocclusals. Expanding the palate may allow more space for permanent teeth to erupt, due to the space provided. Because the expanders are removable, patient hygiene may be improved. Because the expanders are made to the patient's anatomy, comfort may be improved without requiring the use of metal screws or brackets to irritate the tongue or palate. Expansion of the palate may improve the ability for the patient to breathe, increasing airway in nasal and areas.

The methods of treatment described herein may include a series of doctor-prescribed, custom manufactured, plastic removable orthodontic appliances that are designed for the expansion of the skeletally narrow maxilla (upper jaw, dental arch and/or palate) during early interceptive treatment of malocclusal. These apparatuses may be intended for use to expand the skeletally narrow maxilla (upper jaw, dental arch and/or palate).

Any of the apparatuses described herein may be used with (e.g., in conjunction with) a fixed skeletal expander and/or oral surgery, to correct severe crowding or jaw imbalances. If oral surgery is required, risks associated with anesthesia and proper healing must be taken into account prior to treatment.

Any of the features and methods described herein for palatal expanders may be applied to other removable orthodontic appliances, including in particular dental aligners. For example, the detachment regions, hinge regions, slots/slits, removal tools, etc., described herein may be similarly incorporated into a dental aligner or series of dental aligners.

In addition, although the examples described herein are illustrated in the context of palatal expanders for use with one or more attachments on the teeth, these apparatuses and methods may be used for apparatuses that do not include attachments. For example, detachment regions, smoothed lower surfaces, and the like may be used with palatal expanders that do not include attachment regions (for mating with an attachment on a tooth).

Fabrication Methods

Any of the palatal expanders described herein may be fabricated directly, for example by digitally designing the expander and fabricating the digital model using a 3D printer or other direct fabrication technique. Alternatively or additionally, the palatal expanders described herein may be fabricated indirectly, for example, using a physical model of the patient's dentition (e.g., a ceramic, plastic, plaster, etc. model), onto which materials are applied to form the palatal expander. Indirect fabrication methods may include lamination, in which the palatal expander is formed from laminated layers or portions. Indirect fabrication methods may also include direct fabrication of the model using a direct fabrication technique (e.g., 3D printing, etc.). Hybrid fabrication methods, in which a portion of the expander is directly fabricated, and then combined with additional elements (including layers or supports), with or without the use of a model of the patient's dentition, may also be used.

Before or at the start of nay of the fabrication methods described herein, the user (technician, engineer, dentist, dental assistant, etc.) may plan the palatal expansion series. When planning the series, the user may indicate targets for the series of palatal expanders. Targets may include the final and any intermediate palatal expansion positions, maximum and/or minimum forces to be applied, locations of forces to be applied within the mouth, separation between the palate and the palatal expander, maximum and/or minimum expansion per expander (e.g., separation between molars on opposite sides of the patient's mouth), number of palatal expanders in the series, maximum and/or minimum amount of time that each palatal expander is to be worn, etc. In some variations, the user may indicate the materials and/or thicknesses and/or curvature of the palatal expander. Any of these targets may be automatically selected or chosen, or defaults may be provided and adjusted by the user. Any of these target may be constraints or may be allowed to vary, including vary within predetermined and/or user-selected ranges.

Once the series of palatal expanders has been planned, they may be fabricated; fabrication may be performed all at once or in batches (e.g., provided as a complete or partial set, such as days 1-4) or separately, and provided to the patient. Each expander may be marked to separately identify it, including marking to indicate a preferred order (e.g., first, second, etc.).

In any of the indirect fabrication techniques described herein, the expander may be formed on a physical model that has been adjusted (e.g., by moving palate) to a desired position on the way to the final expanded position. The physical model may include attachments (buttons, etc.) for coupling to attachments (e.g., trough-holes, etc.) on the expander, as discussed above.

When a physical model is used (either manually generated from impressions of a patient's teeth or from one or more digital models), the expander may be fabricated by molding a sheet of material over the model. In general any appropriate material may be used for the expander, as long as it is sufficiently biocompatible and possesses the rigidity and physical characteristics necessary (either on its own or in combination with other materials). For example, an expander may be formed of an acrylic material that is applied in a sheet over a physical model, formed (e.g., thermoformed, set) and then cut and/or trimmed. In various examples provided herein, the material may form (including set) by temperature and/or light or other appropriate means. For example, an expander may be formed of a thermoplastic curable polymer.

Figure 33A:
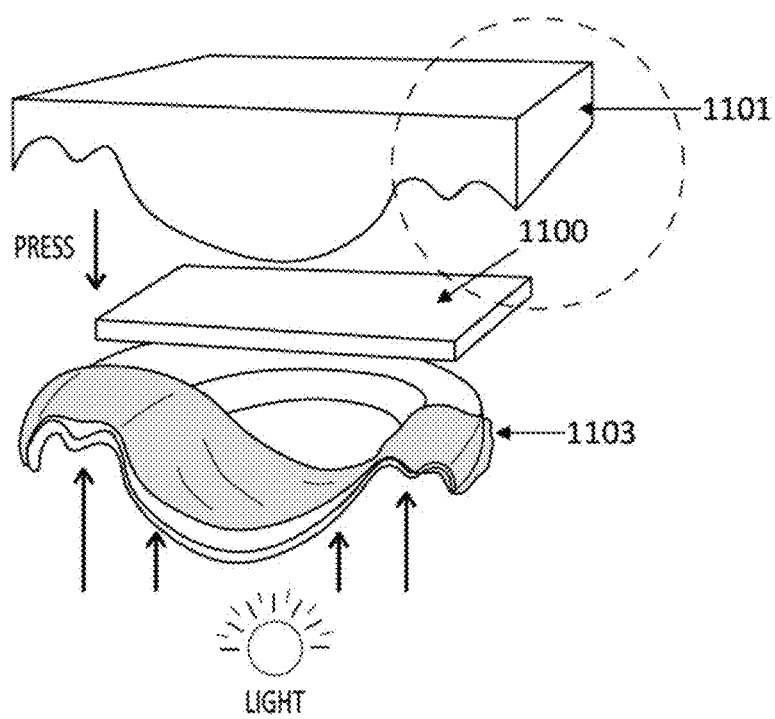
FIG. 33A illustrates one method of forming a palatal expander as described herein using a stamping process.
Figure 33B:
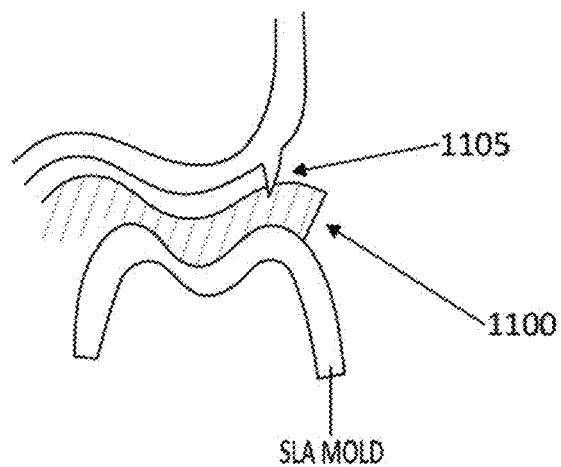
FIG. 33B shows an enlarged detail of a palatal expander formed using this method.

An expander may be formed using a stamping process. For example, FIG. 33A illustrates an example of a stamping process in which a top "male" mold 1101 is used to press a sheet of material ("triad sheet" 1100, comprising a thermoplastic material) into a bottom "female" mold 1103 of the expander. The top and bottom molds may be formed of a 3D printed material (e.g., acrylic material such as SLA) that may be generated from a digital model of the expander. This method includes a thermoforming step, as the film is first stamped, then thermoformed after or during the stamping process, as shown. The "triad sheet" 1100 in this example is an acrylic sheet having an appropriate thickness. As shown in FIG. 33B, the mold may itself include a cutting edge 1105 to help with trimming the border of the stamped sheet, or it may be trimmed separately. Further, curing of the sheet may be done after stamping (or during stamping in some variations). Post-processing may include trimming a polishing/cleaning of the appliance so that the edges are smooth. In this example the thickness of the material may be defined by the mold, and each mold is customized to the patient. The method shown in FIGS. 33A and 33B provide a sandwich technique in which a curable, pliable, acrylic sheet is pressed between male and female molds. The expander is thus thermoformed on the positive mold following a thermoforming method; the acrylic sheet may be placed on top. Excess from the pressed acrylic sheet may be trimmed off by a cutting edge 1105 which also acts as a spacer between two molds. The acrylic sheet can be cured by light which passes through the transparent mold from either positive mold side or negative mold side.

Figure 34A:
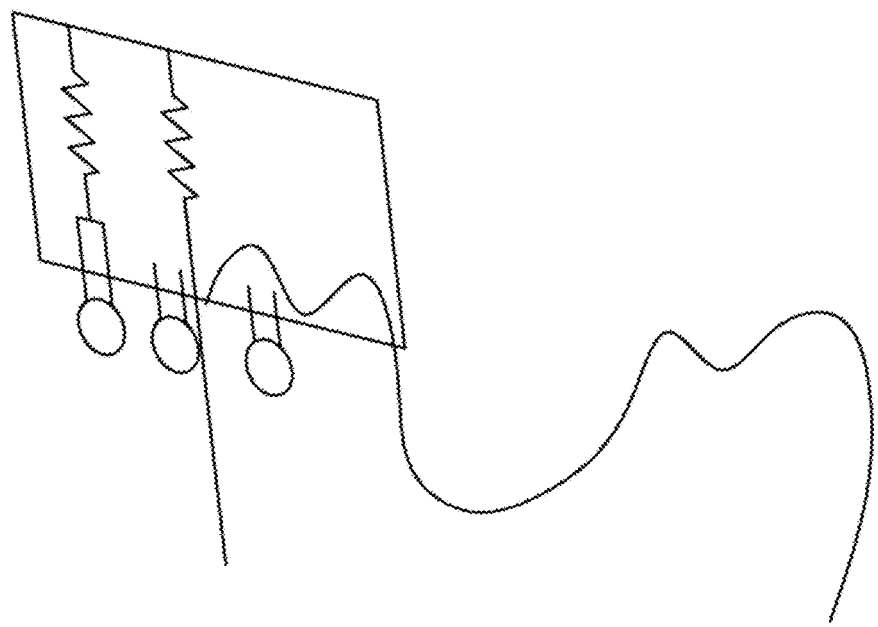
FIG. 34A illustrates a method of forming a palatal expander as described herein using a rolling (spring roller) process.
Figure 34B:
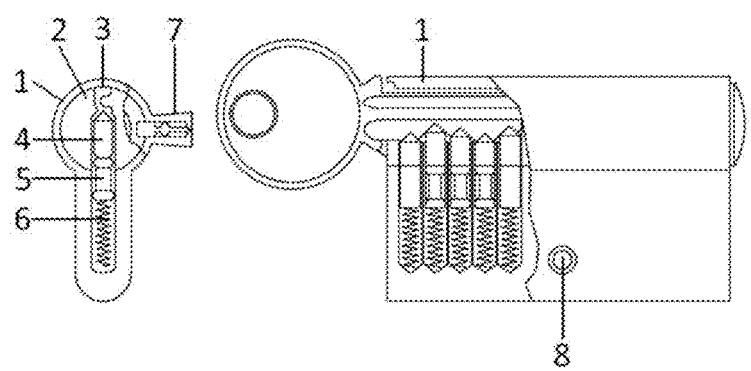
FIG. 34B is an example of a general spring rolling process that may be used.

FIG. 34A is an example of a spring rolling technique for forming an expander. In this example, a mold of the patient's jaw may be made. Next, an expander may be thermoformed on top of the mold, and an acrylic monomer resin or other adhesive may be sprayed on top of plastic sheet. Thereafter the triad sheet may be applied atop the plastic film, and a roller may be used to press the triad sheet on top of the plastic sheet. As illustrated in FIG. 34B, this roller technique may use a similar principle to that of mechanical lock, with multiple pins slotted inside holes, with spring that can push pin out. When the roller is moved on top of Triad sheet, the pins may be pushed in, and may thus conformed to the shape of the tooth crown; sufficient force may press the triad sheet on the crown surface tightly. The force can be controlled by the spring strength for best result. Thereafter, a UV light may be used to cure the Triad sheet.

Figure 35:
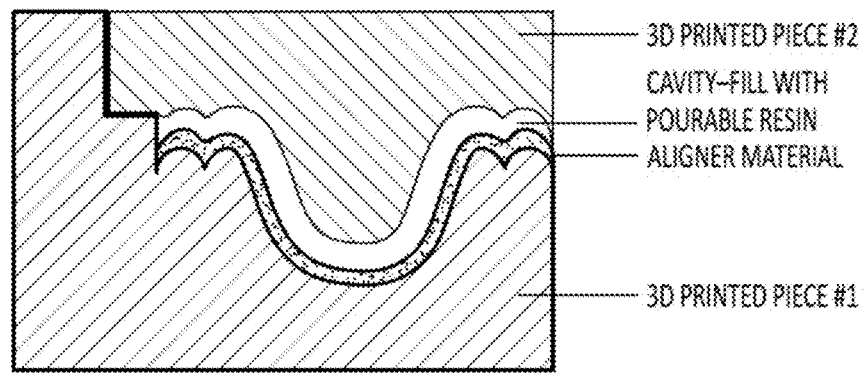
FIG. 35 shows a method of forming a palatal expander as described herein using a casting process.

FIG. 35 illustrates an example of a casting technique. In this example, the material is formed first forming the mold (e.g., by 3D printing). The material may then be thermoformed and the acrylic to form the expander may be placed on it within the cavity (by filing with resin) for casting. Once cured, the two molds (top and bottom) may be removed and the appliance cut off of the mold.

In this example there are two molds (piece #1 and piece #2). When the expander to be formed of two materials (e.g., a first material and a pourable resin), the first material may be thermoformed to the positive mold (e.g., as described above), and the positive mold may be fixed to the negative mold. The molds may be designed such that there is a cavity in which the thickness is optimized for device stiffness. The pourable resin may then be poured into the cavity and cured. The molds can then be separated again.

Figure 36:
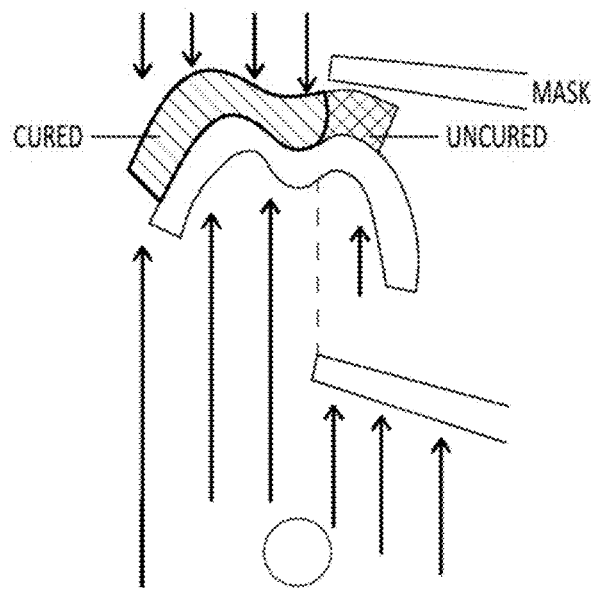
FIG. 36 is another example of a method of forming a palatal expander as described herein using a curing mask.

FIG. 36 shows another variation of a fabrication technique in which a mask may be used to limit or prevent curing as the device is formed. In this example, areas that should remain uncured (e.g., for removal) may be masked; this may allow a precise cut line of the acrylic sheet of the device. This technique may be applied to any of the methods described herein. A thermal mask for thermal curing process may be used; for light/UV curing techniques, an optical mask may be used.

Figure 37:
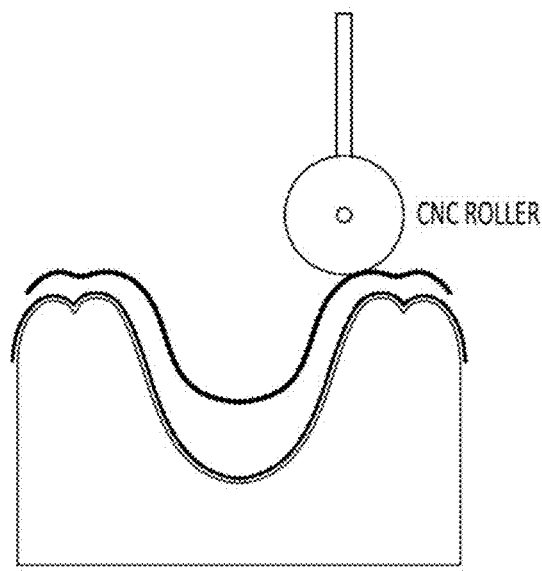
FIG. 37 shows a method of forming a palatal expander as described herein using a CNC (computer numerical control) roller.

FIG. 37 illustrates an example of a method of fabrication of an expander in which a roller (e.g., "CNC roller") is used. In this example, an expander material may be thermoformed to the mold. For example, an uncured, pliable, acrylic sheet may be placed on the expander material (e.g., mold). A roller controlled by CNC (computer numerical control) may then be used to flatten the acrylic sheet to the desired thickness, which may be non-uniform (e.g., variable).

Figure 38:
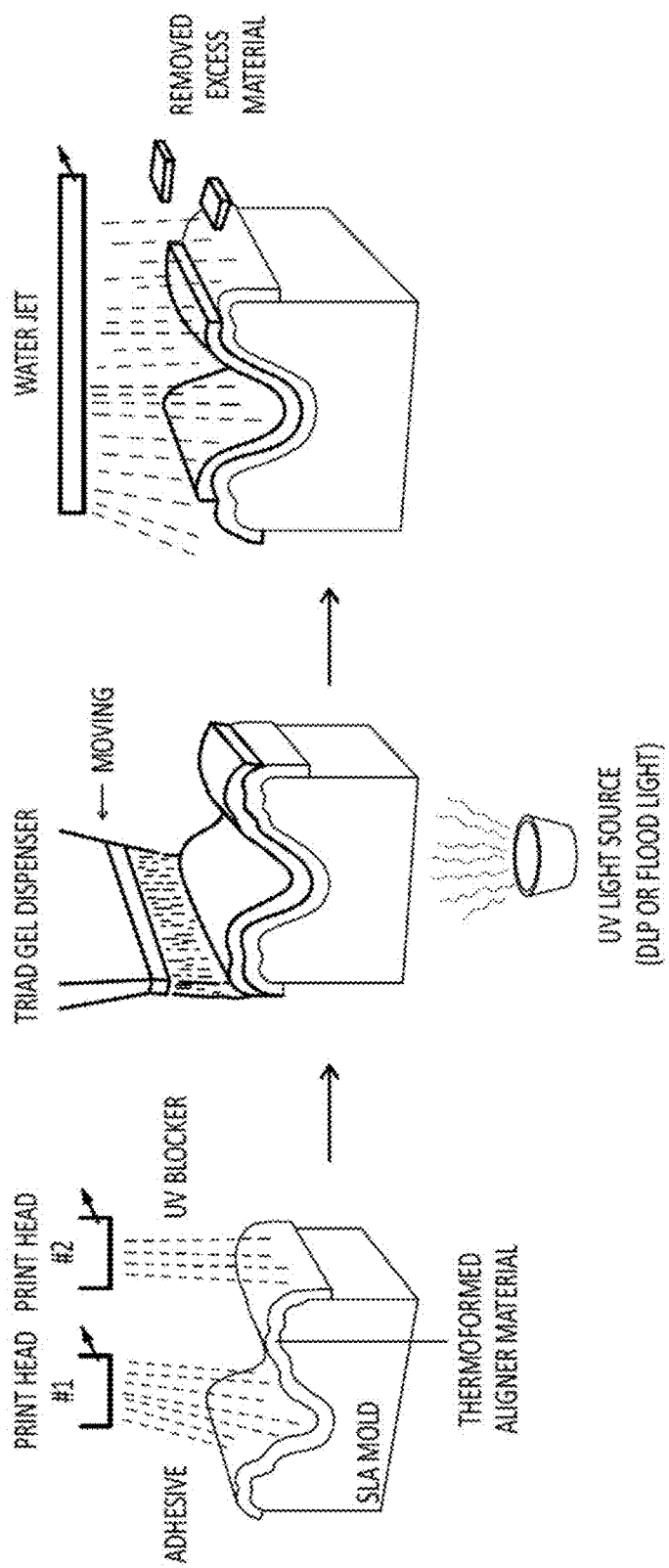
FIG. 38 illustrates a method of forming a palatal expander as described herein using a deposited adhesive and mask.

FIG. 38 is another example of a fabrication technique in which multiple layers may be deposited, using masks to control the final shape/dimensions. For example, as a first step, the expander material may be thermoformed onto a mold, such as an SLA mold, as shown on the far left. Thereafter an adhesive binder solution may be printed on one or more specific areas, e.g., by inkjet printing. Thereafter, a UV blocker solution may be printed on a specific area, e.g., using a second injection print head (or the same print head using the second solution). Thereafter an acrylic resin (e.g., triad gel) may be disposed on top of this, or a triad sheet may be pressure formed on top. Thereafter a UV light may be used to cure the triad material and to activate the UV adhesive binder material (see FIG. 38, middle). The form may then be cleaned and cut, for example, by applying a high-pressure water jet to wash away uncured material (gel), cleaning the entire device (FIG. 38 right side). Finally the device may be laser cuts, to trim the expander on a trim line.

Figure 39:
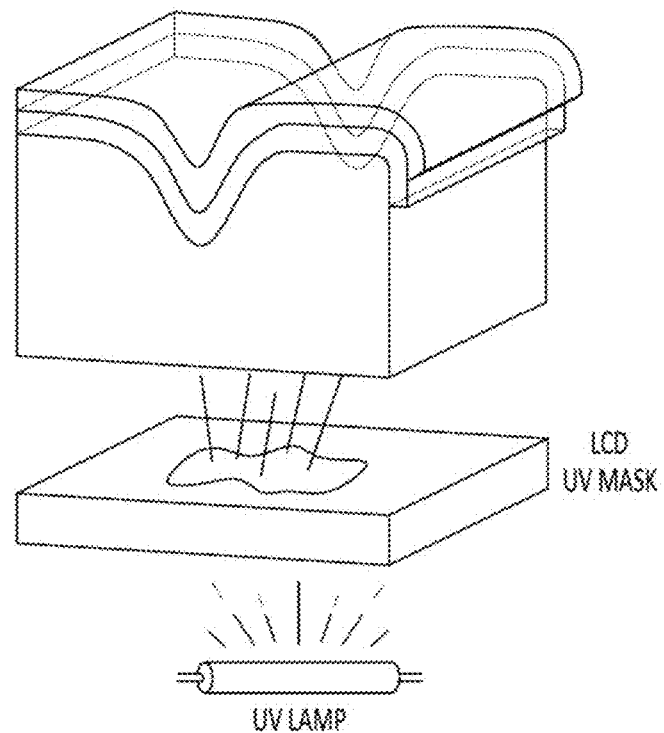
FIG. 39 illustrates a method of forming a palatal expander as described herein using an LCD mask.

FIG. 39 illustrates and alternative method to use a UV blocker, in which a dynamic UV mask (like a LCD mask) can be used. As an alternative for a UV blocker, a UV DLP or LCD projector can be used instead of general UV lamp. This may allow more precise positioning. Similarly, optical masks (such as those used during photolithography) may be used, along with any other lithographic process.

Figure 40:
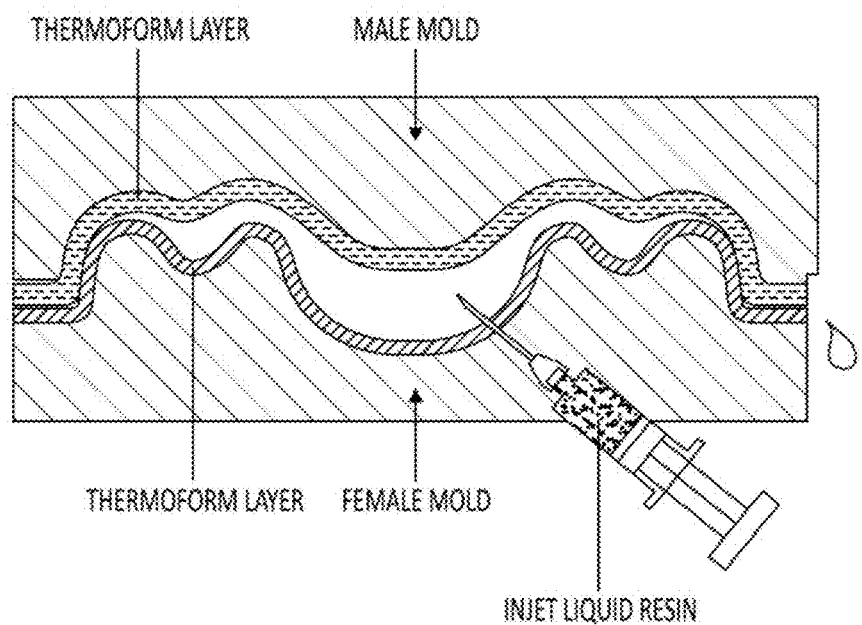
FIG. 40 illustrates a method of forming a palatal expander as described herein using injection molding (e.g., showing an expander top and bottom injection mold).

In FIG. 40, an injection molding method that may be used is described. In this example, the mold may first be created including a top (e.g., male) and bottom (e.g., female) mold, including the tooth crowns, with a gap included there between. The gap may form the shape of the expander device. A thin plastic sheet may be placed on both top and bottom mold halves for thermoforming, and the mold pieces may be clamped together. Thereafter, fluid may be injected/filled into the mold; the fluid may be a liquid resin that is injected into the gap/cavity between the two molds. Excess resin may be made to flow out of the gap through holes/exit ports. Light may then be used to cure the resin. The final device may be removed, trimmed, cleaned and polished, as mentioned.

Figure 41:
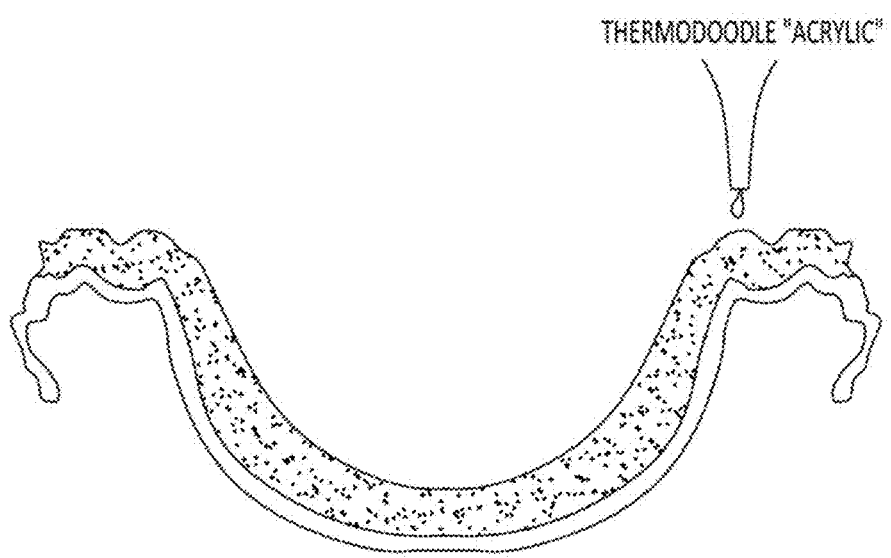
FIG. 41 is an example of a method of forming a palatal expander by a thermal dispensing ("thermo-doodle") method.

FIG. 41 illustrates another method for printing all or a portion of an expander. For example, in FIG. 41, the expander is formed by printing a thermosetting material onto a base. In FIG. 41, core material (e.g., acrylic) is deposited by heating and dispensing onto a thermoformed base layer. A variable thickness can be applied, as needed, and controlled by the digital design of the expander. Automated equipment may be used to dispense and apply the material. After cooling, the core material may be laminated to the base layer. Additional layers may be selectively applied.

Figure 42:
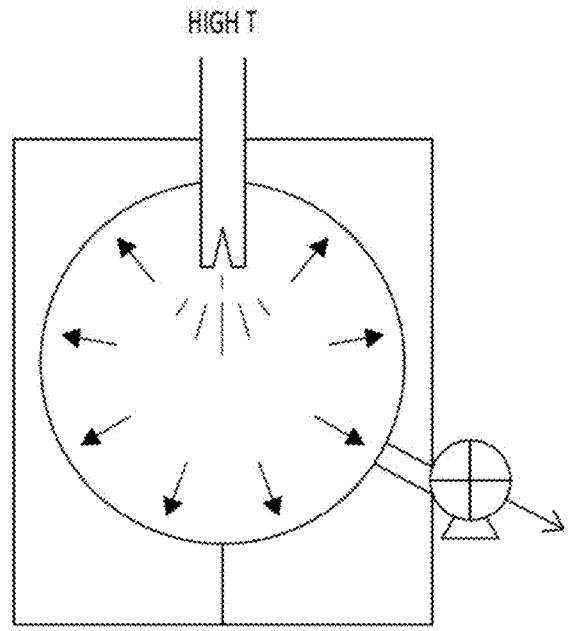
FIG. 42 illustrates a method of forming a palatal expander as described herein using blow-molding.

All or part of an expander may be formed by blow-molding, as shown in FIG. 42. In this example, blow molding may be used to make a hollow transpalatal arch (TPA), similar to the manner in which PET beverage bottles are made. The hollow TPA can be filled with solid materials at subsequent steps. The molding block may be formed and used in standardized sizes like small, medium, and large; customization may occur in downstream steps.

Figure 43:
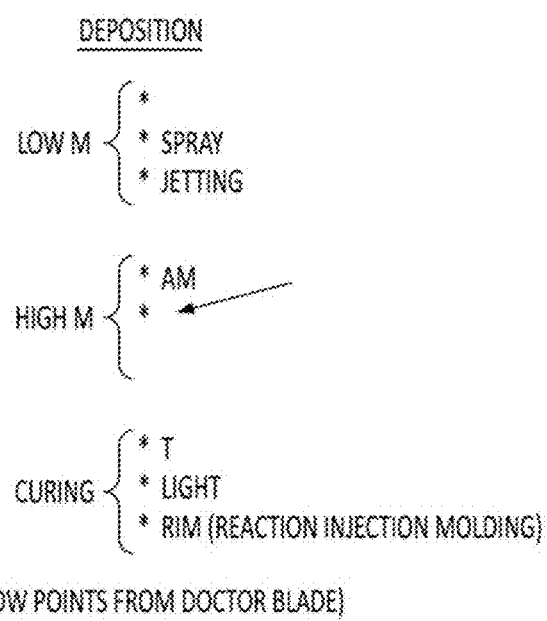
FIG. 43 shows a general method of forming a palatal expander as described herein by deposition.

As already described, deposition may be used to form any of the expanders described herein. FIG. 43 shows an example of a generic method for using deposition. Any combination of dispensing or deposition methods and systems can be utilized for particular steps of the fabrication processes described herein, based on the material properties and raw format of the expander. For instance, for low viscous solutions, a dispensing mechanism can be used, while for high viscous solutions, extrusion and deposition mechanism used. For example, pneumatic pressurized nozzles, Auger valves, solenoid valves, ultrasonic print heads, thermal print heads, piezo print heads and etc. can be used.

Figure 44:
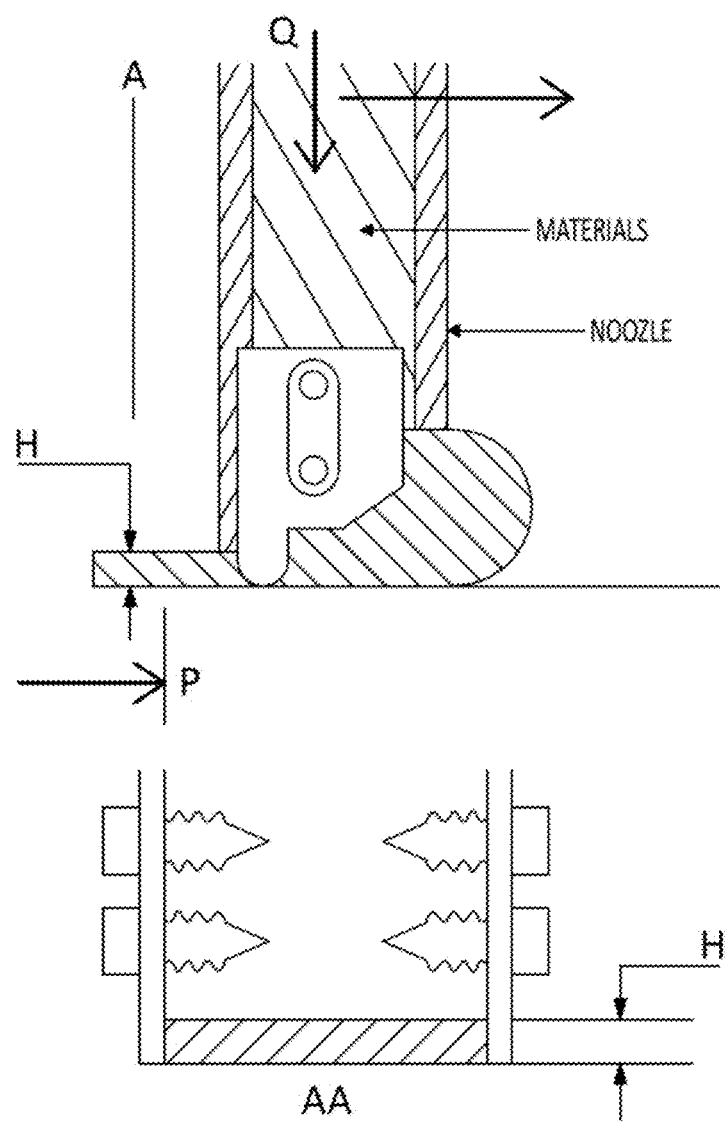
FIG. 44 is an example of forming a palatal expander by applying stiffening material (referred to herein as a "doctor blade" method).

FIG. 44 illustrates another method of forming an expander in which a nozzle is used to apply a heated acrylic material (e.g., triad gel), and one or more mechanical shapers/cutters ('blades') may be used to cut the material. In this method, stiffening materials may be applied on a curved expander surface to a well-defined thickness. The thickness of the material can be tuned by adjusting the legs of the applicator as the material is laid down. The apparatus forming the thickness can be heated for thermal responsive materials.

Figure 45:
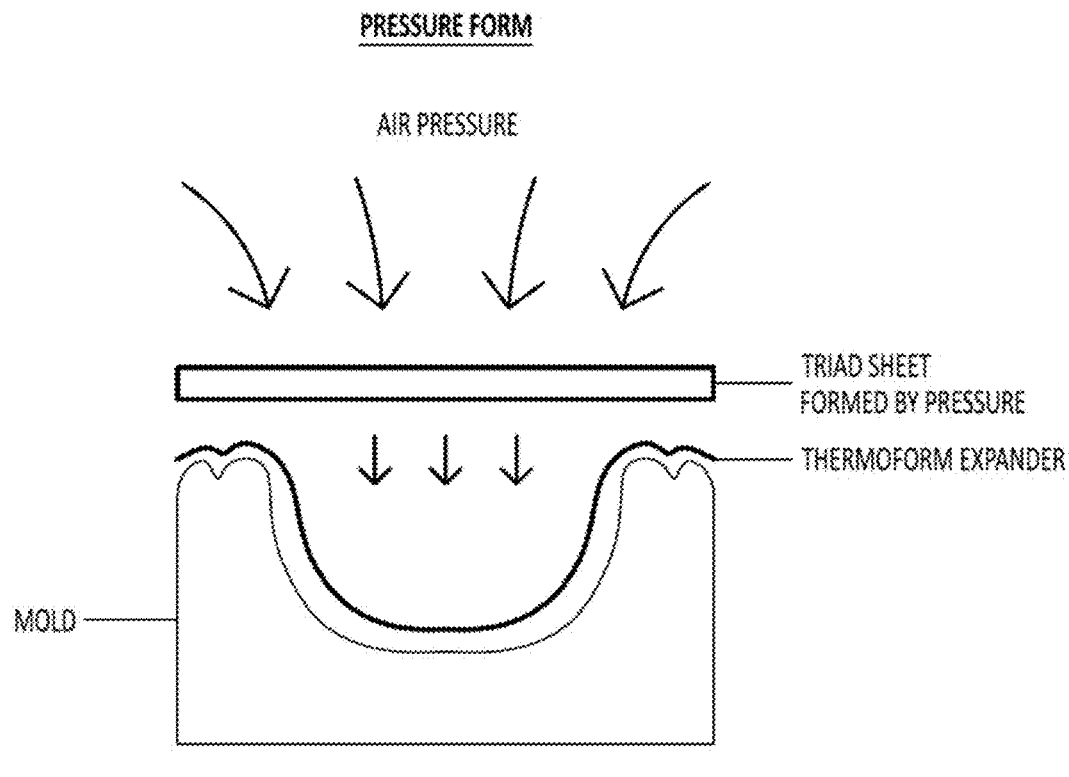
FIG. 45 show a method of forming a palatal expander as described herein using pressure-forming.

FIG. 45 shows another example of a pressure forming method for forming an expander. In this example, air pressure may be used to mold/conform the material (e.g., a triad sheet) to the expander. Initially a sheet of material may be thermoformed onto the mold (forming the "thermoform expander" on the mold, as shown in FIG. 45). An adhesive may then be added onto the mold using air pressure, but not heat, to "press" the triad sheet onto the expander. This may be used to select and modify the thickness of the device. Next, CNC may be used to cut off the excess expander, and the material may be cured.

This pressure forming technique may be performed using a pliable acyrlin sheet that is placed onto a thermoplastic material, for example. The positive mold is used to form the thermoplastic on, and pressure is applied at different pressures from different locations. An intermediate material (such as a rubber sheet) may be used to help capture the sheet onto the mold (e.g. by placing the rubber sheet that between the mold and the mold and sheet (or between the air pressure source and the triad sheet.

Direct Fabrication

As discussed above, direct fabrication may be used to make any of the expanders described directly, using as input a digitally designed expander (e.g., a digital file specifying the geometry. Thus, these apparatuses may be formed without the need for a physical model of the patient's teeth/gingiva/palate. Direct fabrication may include 3D printing or additive manufacturing (e.g., extrusion type, light polymerization type, powder bed type, lamination type, powder fed type, etc.).

Figure 46:
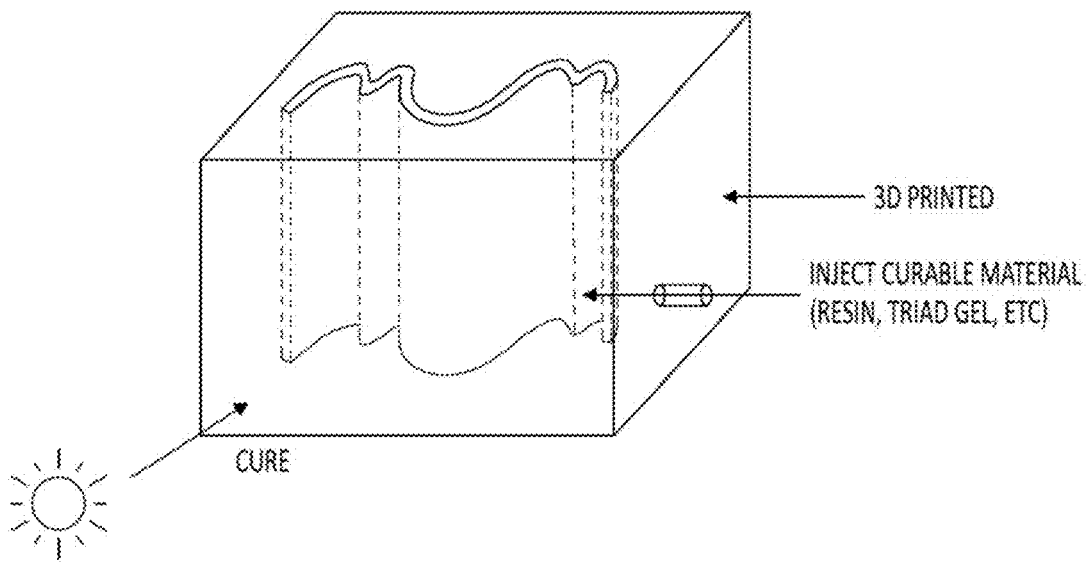
FIG. 46 is an example of a direct fabrication method of forming a palatal expander as described herein by injection molding.

For example, FIG. 46 illustrates one example of a direct fabrication process involving injection molding. In this example, the mold can be 3D printed (the entire casting mold) and injection molded. For example, the entire casting block may be made by 3D printing, and the block may have a negative shape of the final design. The block may have an injection port, which allows injection of the thermal or light curable materials to fill the cavity. After the injected material is cured, the mold may be cracked and opened.

Figure 47:
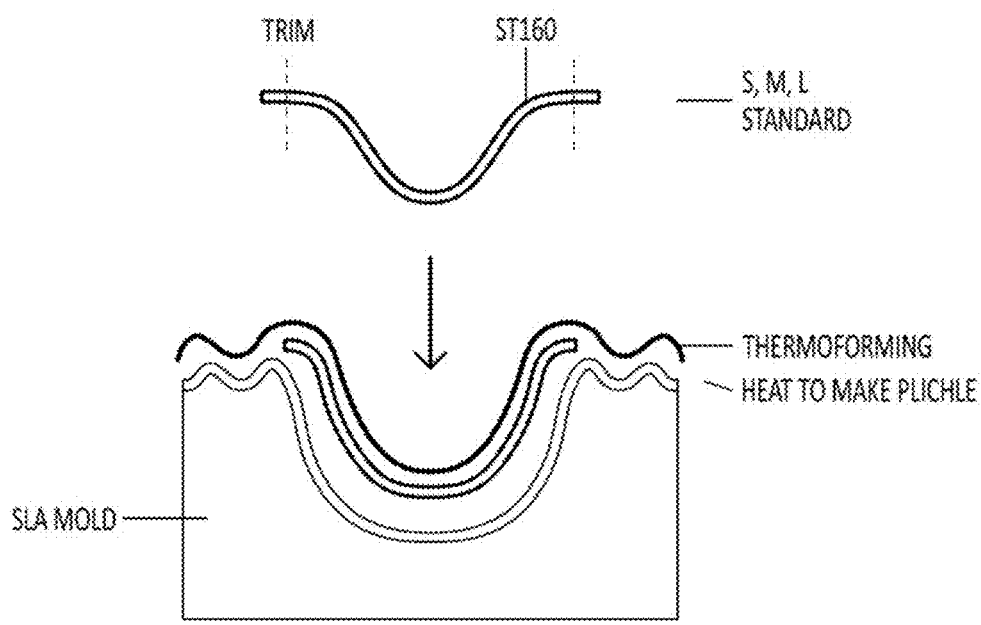
FIG. 47 is another example of a direct fabrication method of forming a palatal expander as described herein.

Another example is shown in FIG. 47, illustrating a standard method comprising a dual layer system of direct thermoforming. This design entails fabricating only a few standard TPA geometries with the aim of forming standardized components with minimum customization requirements. The standard TPA (base) may be milled to the custom shape of the patient's occlusal line. The TPA stiffener may then be attached to an expander by a thermoforming sandwich (e.g. a top and bottom layer are expander material), with the top and bottom being attached by an adhesive and/or mechanical interlock.

Figure 48A:
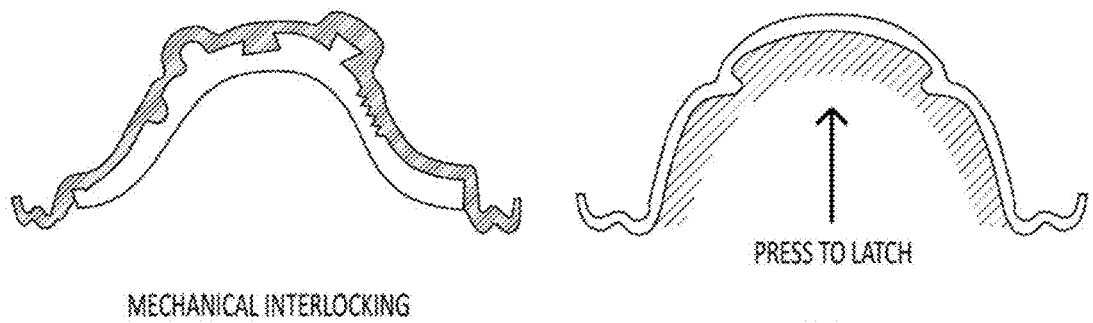
FIGS. 48A and 48B illustrate another example of a method of forming a palatal expander as described in which the expander includes a mechanical interlock/latch.
Figure 48B:
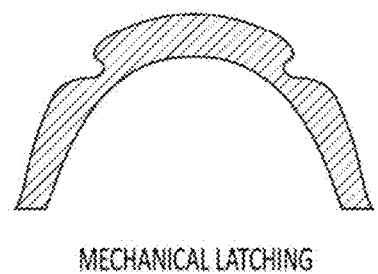

FIG. 48A illustrates an example of a mechanical interlock or latch. In this example, the device is formed by including a mechanical interlock between the two components (e.g., an upper and lower layer). For example, the device may include some positive and/or negative features on stiffener and thermoform expander on top. To two layers (including the stiffer layer and the more pliable layer) may then interlock together. Similarly, in FIG. 48B, the two layers may mechanically latch together. Features of the layer may grab or interlock, for example a more pliable layer may interlock with a stiffener component after a press fit.

Figure 49A:
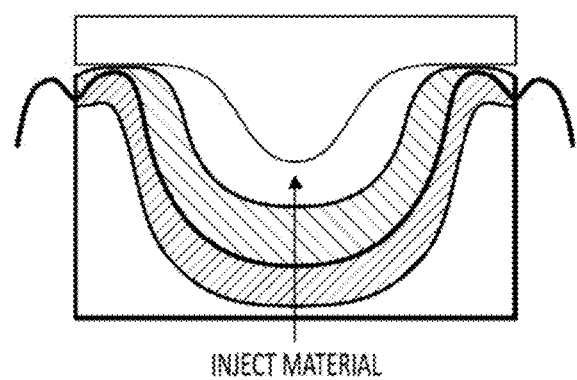
FIGS. 49A and 49B show another example of a method of forming a palatal expander as described herein by injection molding (insert injection molding).
Figure 49B:
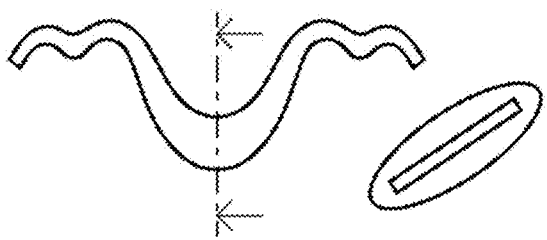

FIGS. 49A and 49B illustrate a method of insert injection molding to form an expander. In this example, the device may be formed by applying a thermoplastic material onto a mold (e.g., a 3D printed mold that is customized to the patient's mouth), then removing that piece and placing it into a custom-designed 3D printed mold so that there is space on the bottom and top into (e.g., between the 3D formed surface and the more generic surface), and then injecting resin into this space to form the expander. In general, some flexibility needed for the device to snap over the crowns and engage retention attachments while rigidity is needed from the transpalatal arch to generate transverse force and stiffness; the combination of flexible and rigid areas can be achieved by this method, for example, by inserting a thermoformed expander with a TPA into a mold where the rigid material can be injected on top of or around the TPA section of the expander.

Lamination

Any of the expanders described herein may be formed by one or more lamination processes in which multiple layers are sequentially or simultaneously attached together to form the expander. A lamination method may generally include using thermoplastic layers of various thicknesses and combining them to form various layers.

Figure 50:
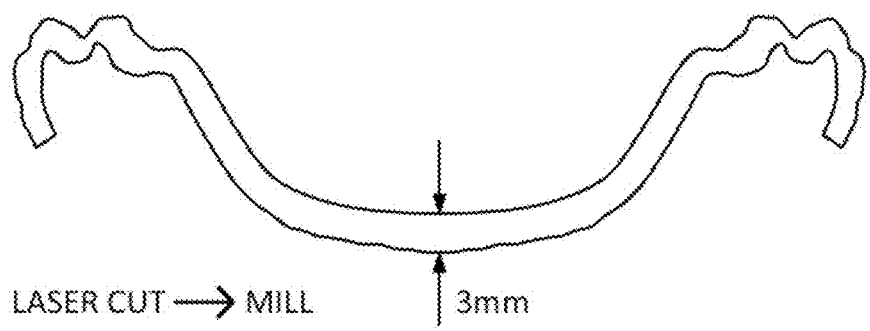
FIG. 50 illustrates a lamination fabrication process for forming a palatal expander.

For example, FIG. 50 illustrates a method of forming an expander having a single layer (a "one piece" expander). In this example, a one-layer thick sheet of thermoplastic may be used to thermoform the entire device, over a mold. An automated laser or mill process may then be used to cut the gingiva line and TPA sections out of the molded device.

Figure 51:
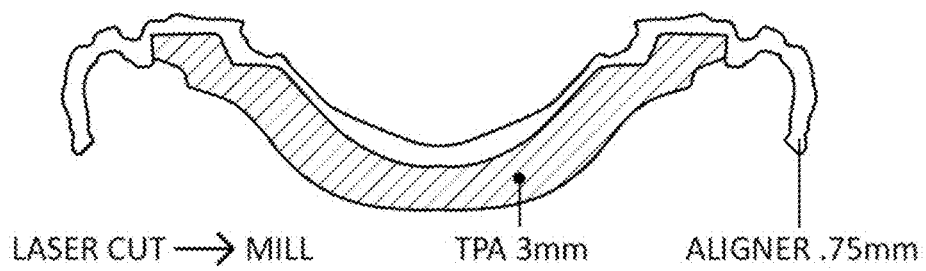
FIG. 51 shows an example of a lamination method using two lamination layers.

FIG. 51 illustrates a two-piece (two layer) apparatus. In this example, more flexibility may be achieved (e.g., on the crowns, to engage retention attachments, etc.) when the device is made by lamination. For example, the device may be formed by using a one layer thick sheet of thermoplastic to thermoform the TPA (transpalatal arch). As in FIG. 50, an automated laser or mill process may be used to cut TPA out. Once formed, the TPA may be placed into a mold and another layer may be thermoformed/laminated on top of the TPA; this layer may be the flexible layer that may extend over the crown and engage the retention attachments (e.g., attachment regions discussed above).

Figure 52:
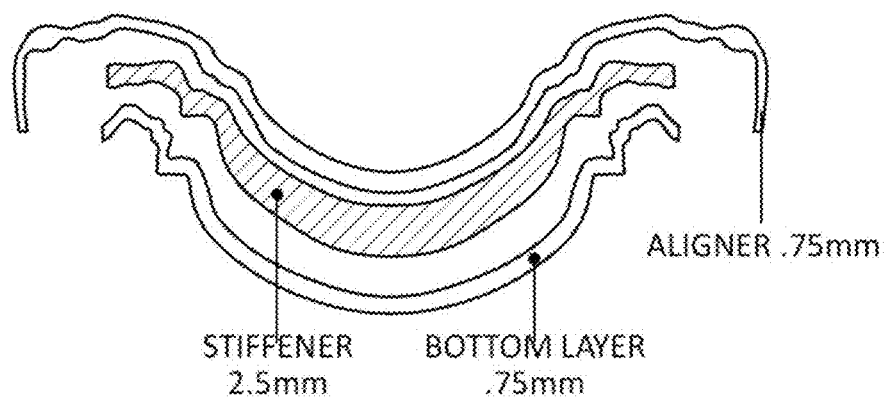
FIG. 52 shows an example of a lamination method using a lamination encapsulation method.

As many additional layers as necessary and helpful may be applied. See, e.g., FIG. 52. The layers may be laminated by an adhesive or by thermoforming. Note laser weld could be used to seal around the (middle) stiffening layer, which could be made by various fabrication methods with biocompatible material, to encapsulate it.

In general, lamination may use thermoplastic layers of various thicknesses that may be combined.

Figure 53:
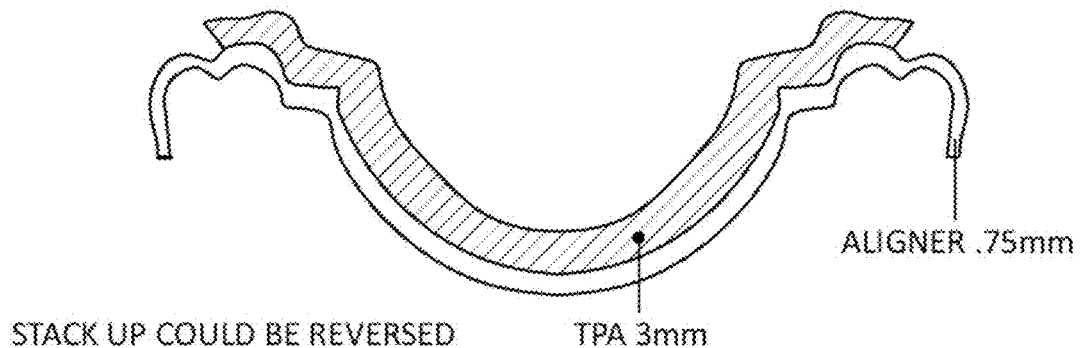
FIG. 53 is an example of a lamination method of forming a palatal expander using laser welding.
Figure 54:
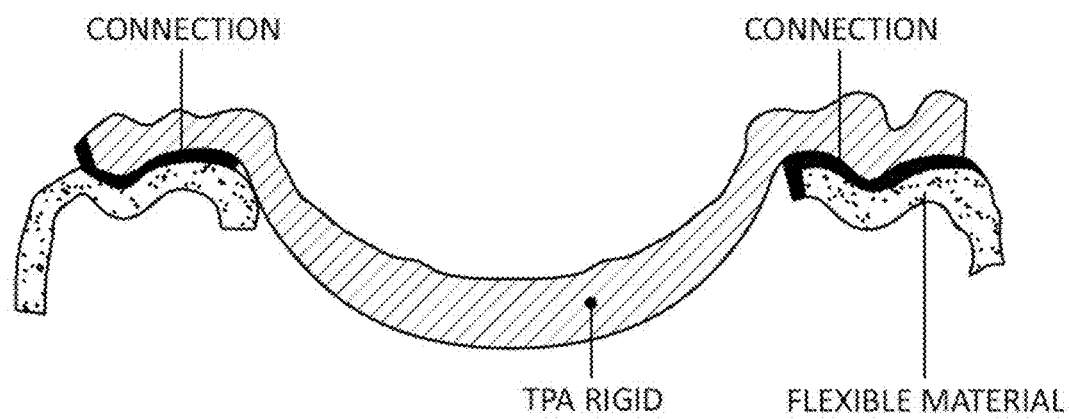
FIG. 54 is an example of a method of forming a palatal expander by lamination using separate regions (e.g., separate crowns).

For example, FIG. 53 illustrates another example of a method of lamination two (or more) layers by laser welding. In this example, a thick TPA region may be made by various fabrication methods with a biocompatible material, as described here, and laser welded onto the thermoformed base expander. Alternatively or additionally other adhesive methods could be used, including chemical adhesives. In FIG. 54, a separate tooth engaging region ("crown region") may be attached or laminated separately. For example, the TPA region may be laser welded onto a flexible section covering the crowns and engaging the retention attachments (the tooth engagement region).

Figure 55:
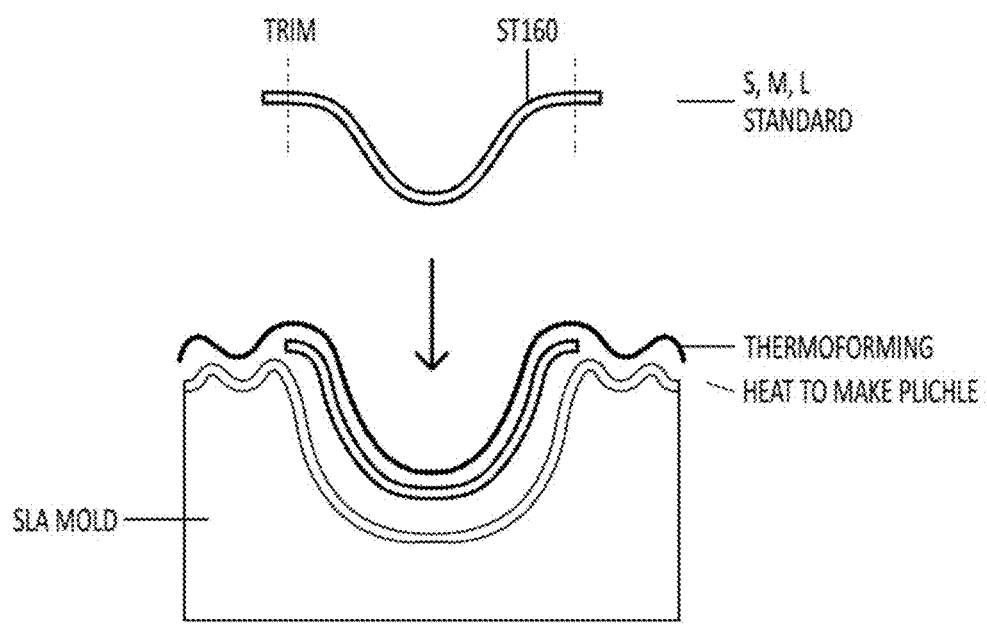
FIG. 55 illustrates a method of forming a laminated palatal expander using standard thermoformed material for the TPA (transpalatal arch).

FIG. 55 illustrates a method of thermoforming a specific "standard" TPA region to a custom portion to form an expander. This design may involve fabricating only a few standard TPA geometries (such as small, medium, and large) and using a thermoformed material to customize the other portions. The use of the thermoforming layer enables in-situ contouring of the standard TPA shape to the palatal shape of the patient by apply heat and pressure. Concurrently, a thin expander layer can be thermoformed onto the occlusal surface and laminated to the thicker TPA.

Figure 56:
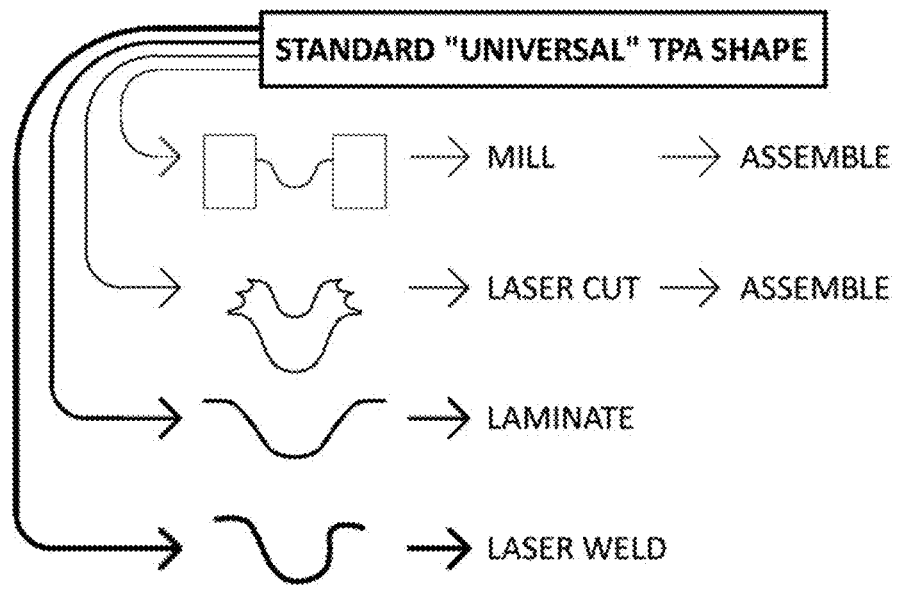
FIG. 56 is an example of a general fabrication process using a standard shape (e.g., "standard universal shape").

Similarly, FIG. 56 schematically illustrates various standard/universal shapes that may be used as part of an expander. For example, in an of these methods as appropriate the method may include the design of an injection molded "blank" (i.e. two large blocks joined by a "universal" TPA) in which the blocks (the tooth engaging regions) may be customized by milling the patient crown shape from the blocks or (2) Milling the entire device out of a single block.

In any of these variations, an injection molded "blank" (i.e. two blocks joined by a "universal" TPA) may be customized by milling a connecting geometry and use an adhesive to join it to an expander, and/or by welding (e.g., laser welding), as described above. Alternatively or additionally, an injection molded "blank" (i.e. two blocks joined by a "universal" TPA) may be customized by milling a mechanical feature that will be used to join to an expander. In any of these examples, an injection molded "blank" (i.e. two blocks joined by a "universal" TPA)—may be customized by milling a connecting geometry and laminate an expander shape over it for customization.

Any of the processes for injection mold customized may be used for making these devices. In general, using any method of direct fabrication or another technique, these devices may incorporate two or more materials as part of a rapid palatal expander. The transpalatal arch (TPA) region, also referred to as the palatal region, may be made from a stiffening material. Through covalent bonding or adhesives, the device may seamlessly transition from the stiffer palatal region into a more elastic material of the tooth retaining region to enable the device to be retained over crowns. The full device may look smooth.

Figure 57:
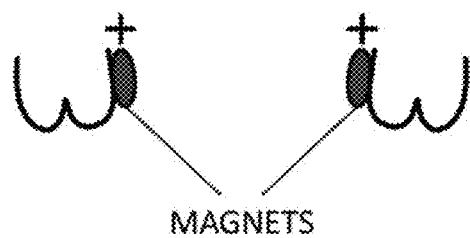
FIG. 57 is an example of a palatal expander that includes magnets.

Other variations of expanders described herein may include devices with additional force-applying elements, including magnetic elements, as shown in FIG. 57. In this example, magnets are placed on the left and right sides of the upper, posterior, lingual arch. The magnets have similar charges, such that they repel each other. This magnetic force provides the force to expand the palate. The magnets can then be inserted or adhered to an aligner, connected to metal bands, or can be adhered directly to the teeth or palate.

Figure 58:
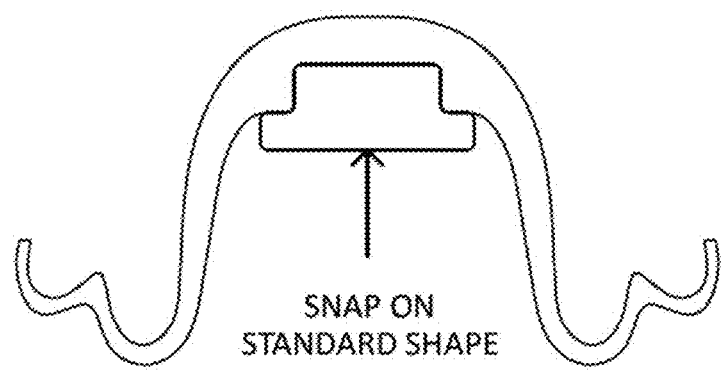
FIG. 58 is an example of a palatal expander using multiple snap-on elements.

In FIG. 58 the expander includes an occlusal surface and certain portion of palatal expander that may be are bonded on the patient crowns. A separate piece that applies an expansion force may be snapped on and placed between both the left and right bonded components and secured a certain distance between those two halves. The snap on component may provide the force expanding the palate and may be incrementally larger for each of the next stages of treatment. In this example, the occlusal surface and certain portion of palatal expander may be formed via any of above mentioned fabrication techniques including 3D printing, CNC milling, injection molding, or the like. The snap-on component can also be 3D printed, milled or molded.

Figure 59:
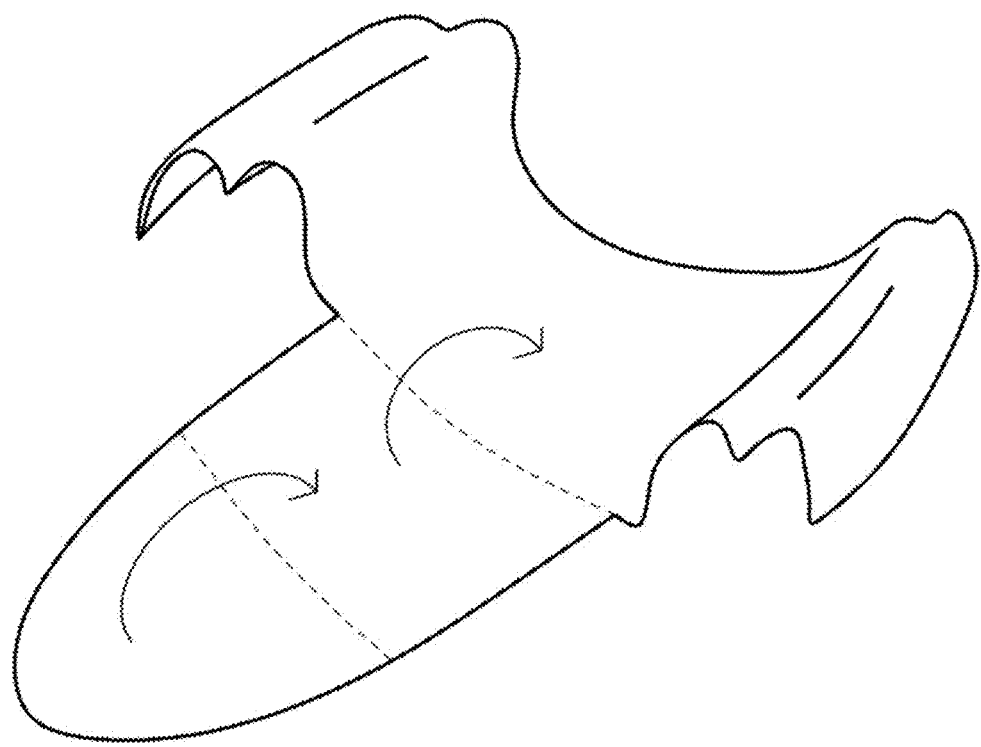
FIG. 59 is an example of a palatal expander that includes folds ("origami" design).

In general, the stiffness of the arch may be adjusted as described herein by using one or more different materials, and/or by increasing or decreasing the thickness. As shown in FIG. 59, the stiffness may also be adjusted by folding or creasing the palatal region.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A palatal expander apparatus for expanding a patient's palate, the apparatus comprising:
    a pair of tooth engagement regions connected by a palatal region, wherein the palatal region is configured to apply between 8 and 160 N of force between the pair of tooth engagement regions when the apparatus is worn by the patient;
    wherein the tooth engagement regions each comprises an occlusal side and a buccal side, wherein for at least one of the tooth engagement regions:
        the occlusal side is thinner than the palatal region, the buccal side is thinner than the occlusal side, and a transition region between the occlusal side and the buccal side decreases in thickness from the occlusal side to the buccal side; and
        a hinge region on the buccal side is configured to flex to release the apparatus from the patient's teeth when force is applied to pull the buccal side away from the patient's teeth or gums.

2. The apparatus of claim 1, wherein the palatal region is configured to have a clearance ranging from 0.1 mm to 10 mm from the patient's mid-palatal region when the apparatus is worn by the patient.

3. The apparatus of claim 1, wherein the buccal side of the at least one of the tooth engagement regions includes two or more attachment regions each configured to couple to an attachment bonded to the patient's teeth.

4. The apparatus of claim 1, wherein the palatal region is between about 1 and 5 mm thick.

5. The apparatus of claim 1, wherein the occlusal side of the at least one of the tooth engagement regions has a thickness of between about 0.5 and 2 mm.

6. The apparatus of claim 1, wherein the buccal side of the at least one of the tooth engagement regions has a thickness of between about 0.25 and 1 mm.

7. The apparatus of claim 1, wherein an anterior portion of the palatal region has a different average thickness than a posterior portion of the palatal region.

8. The apparatus of claim 1, wherein an anterior portion of the palatal region is thinner than a posterior portion of the palatal region.

9. The apparatus of claim 1, further comprising a visible identification marking on a surface of the palatal expander apparatus, wherein the identification marking encodes one or more of: a patient number, a revision indicator, and a stage of treatment.

10. The apparatus of claim 1, further comprising a visible identification marking on a flat posterior surface of the palatal expander apparatus, wherein the identification marking encodes one or more of: a patient number, a revision indicator, and a stage of treatment.

11. The apparatus of claim 1, wherein the buccal side of the at least one of the tooth engagement regions is configured to extend adjacent and away from a patient's gingiva to form a gap of between about 0.25 and 1 mm from the patient's gingiva when the apparatus is worn by a patient.

12. The apparatus of claim 1, further comprising a plurality of vertical slots or slits extending from a bottom of the buccal side toward the occlusal side of the at least one of the tooth engagement regions.

13. The apparatus of claim 1, wherein the palatal region comprises an upper convex surface having a first surface curvature; further wherein the palatal region comprises a lower, concave surface having a second surface curvature that is smoother than the first surface curvature.

14. The apparatus of claim 1, wherein the palatal region comprises an upper convex surface having a first surface curvature comprising a plurality of grooves and ridges that align with grooves and ridges in the patient's palate; further wherein the palatal region comprises a lower, concave surface having a second surface curvature that is smoother than the first surface curvature.

15. The apparatus of claim 1, wherein the buccal side of the at least one of the tooth engagement regions include a slot, cut-out or slit for lifting a region of the buccal side from one or more attachments on the patient's teeth.

16. The apparatus of claim 1, wherein a second transition region between the palatal region and the at least one of the tooth engagement regions decreases in thickness from the palatal region to the at least one of the tooth engagement regions.

17. A palatal expander apparatus for expanding a patient's palate, the apparatus comprising:
   a pair of tooth engagement regions connected by a palatal region, wherein the palatal region is configured to apply between 8 and 160 N of force between the pair of tooth engagement regions when the apparatus is worn by the patient, wherein the palatal region is configured to have a clearance ranging from 0.1 mm to 10 mm from the patient's mid-palatal region when the apparatus is worn by the patient, further wherein each of the tooth engagement regions comprises an occlusal side and a buccal side, wherein for at least one of the tooth engagement regions:
      an extension extends from the buccal side, wherein the extension is configured to extend adjacent and away from the patient's gingiva when the apparatus is worn by the patient to form a gap of between about 0.25 mm and 1 mm;
      the occlusal side is thinner than the palatal region, the buccal side is thinner than the occlusal side, and a transition region between the occlusal side and the buccal side decreases in thickness from the occlusal side to the buccal side; and
      a hinge region on the buccal side is configured to flex to release the apparatus from the patient's teeth when force is applied to pull the buccal side away from the patient's teeth or gums.

18. A palatal expander apparatus for expanding a patient's palate, the apparatus comprising:
   a pair of tooth engagement regions connected by a palatal region and two or more attachment regions each configured to couple to an attachment bonded to the patient's teeth, wherein the tooth engagement regions each comprises an occlusal side and a buccal side, wherein for at least one of the tooth engagement regions:
      the occlusal side is thinner than the palatal region, the buccal side is thinner than the occlusal side, and a transition region between the occlusal side and the buccal side decreases in thickness from the occlusal side to the buccal side;
      a hinge region on the buccal side is configured bend to disengage at least one of the attachment regions from a corresponding attachment on the patient's teeth when force is applied to pull the buccal side away from the patient's teeth or gums.

19. The apparatus of claim 18, further comprising a detachment region comprising one or more of a slot, ledge, notch, lip, or gap on or adjacent to a lower edge of the buccal side of the at least one of the tooth engagement regions.

20. The apparatus of claim 18, further comprising an extension extending from the buccal side of the at least one of the tooth engagement regions, the extension configured to provide a gap between the extension and the patient's gingiva when the apparatus is worn by the patient that is between 0.25 and 1 mm.

21. The apparatus of claim 18, further comprising a visible identification marking on a surface of the palatal expander apparatus, wherein the identification marking encodes one or more of: a patient number, a revision indicator, and a stage of treatment.

22. The apparatus of claim 18, wherein the palatal region comprises an upper convex surface having a first surface curvature; further wherein the palatal region comprises a lower, concave surface having a second surface curvature that is smoother than the first surface curvature.

23. A palatal expander apparatus for expanding a patient's palate, the apparatus comprising:
   a pair of tooth engagement regions connected by a palatal region and at least one attachment region configured to couple to an attachment bonded to the patient's teeth, wherein the tooth engagement regions each comprises an occlusal side and a buccal side, wherein for at least one of the tooth engagement regions:
      the occlusal side is thinner than the palatal region, and the buccal side is thinner than the occlusal side, and a transition region between the occlusal side and the buccal side decreases in thickness from the occlusal side to the buccal side; and
      a hinge region on the buccal side is configured to flex to disengage at least one of the attachment regions from a corresponding attachment on the patient's teeth when force is applied to pull the buccal side away from the patient's teeth or gums.

24. The apparatus of claim 23, further comprising a detachment region adjacent to a lower edge of the buccal side of the at least one of the tooth engagement regions, wherein the detachment region comprises one or more of: a slot, a ledge, a notch, and a lip.

25. The apparatus of claim 24, wherein the detachment region forms a gap when the apparatus is worn by the patient that is between 0.25 and 1 mm from the patient's gingiva.

26. The apparatus of claim 23, further comprising a visible identification marking on a surface of the palatal expander apparatus, wherein the identification marking encodes one or more of: a patient number, a revision indicator, and a stage of treatment.

27. The apparatus of claim 23, wherein the palatal region comprises an upper convex surface having a first surface curvature; further wherein the palatal region comprises a lower, concave surface having a second surface curvature that is smoother than the first surface curvature.

28. The apparatus of claim 23, wherein the palatal region is configured to apply between 8 and 200 N of force between the pair of tooth engagement regions when the apparatus is worn by the patient.

* * * * *